United States Patent
Li et al.

(10) Patent No.: US 12,124,008 B2
(45) Date of Patent: Oct. 22, 2024

(54) OPTICAL IMAGING LENS ASSEMBLY

(71) Applicant: ZHEJIANG SUNNY OPTICS CO., LTD., Zhejiang (CN)

(72) Inventors: Yang Li, Zhejiang (CN); Lingbo He, Zhejiang (CN); Fujian Dai, Zhejiang (CN); Liefeng Zhao, Zhejiang (CN)

(73) Assignee: ZHEJIANG SUNNY OPTICS CO., LTD., Ningbo (CN)

( * ) Notice: Subject to any disclaimer, the term of this patent is extended or adjusted under 35 U.S.C. 154(b) by 669 days.

(21) Appl. No.: 17/329,200

(22) Filed: May 25, 2021

(65) Prior Publication Data

US 2021/0389575 A1 Dec. 16, 2021

(30) Foreign Application Priority Data

Jun. 10, 2020 (CN) .......................... 202010524216.3

(51) Int. Cl.
| | |
|---|---|
| *G02B 13/00* | (2006.01) |
| *G02B 9/64* | (2006.01) |
| *G02B 27/00* | (2006.01) |
| *G02B 27/01* | (2006.01) |
| *G03H 1/08* | (2006.01) |
| *G03H 1/22* | (2006.01) |

(52) U.S. Cl.
CPC ........... *G02B 13/0045* (2013.01); *G02B 9/64* (2013.01); *G02B 27/0025* (2013.01)

(58) Field of Classification Search
CPC ...... G02B 13/0045; G02B 13/18; G02B 9/64; G02B 27/0025
See application file for complete search history.

(56) References Cited

U.S. PATENT DOCUMENTS

| | | | | |
|---|---|---|---|---|
| 8,184,383 | B2 * | 5/2012 | Shinohara ............ | G02B 13/004 359/773 |
| 2008/0285150 | A1 * | 11/2008 | Souma ........... | G02B 15/143105 359/683 |
| 2014/0247504 | A1 * | 9/2014 | Amano ................. | G02B 15/20 359/680 |
| 2021/0356723 | A1 * | 11/2021 | Kitada ................. | G02B 15/16 |

FOREIGN PATENT DOCUMENTS

| | | | |
|---|---|---|---|
| JP | H11231215 | A * | 8/1999 |
| KR | 20180005464 | A | 1/2018 |
| TW | I676835 | B | 11/2019 |
| TW | I693445 | B | 5/2020 |
| WO | 2012020554 | A1 | 2/2012 |

\* cited by examiner

*Primary Examiner* — Wyatt A Stoffa
*Assistant Examiner* — Samanvitha Sridhar
(74) *Attorney, Agent, or Firm* — Samson G. Yu

(57) ABSTRACT

The disclosure discloses an optical imaging lens assembly, which includes ten lenses, wherein, from an object side to an image side, the ten lenses sequentially includes a first lens with positive refractive power, a second lens with refractive power, a third lens with refractive power, a fourth lens with refractive power, a fifth lens with negative refractive power, a sixth lens with refractive power, a seventh lens with refractive power, an eighth lens with refractive power, a ninth lens with positive refractive power and a tenth lens with negative refractive power; and the lenses are independent of one another and have air spaces on an optical axis.

10 Claims, 25 Drawing Sheets longitudinal aberration curve

OPTICAL IMAGING LENS ASSEMBLY

CROSS-REFERENCE TO RELATED APPLICATION(S)

The disclosure claims priority to Chinese Patent Application No. 202010524216.3, filed on Jun. 10, 2020 and entitled "Optical Imaging Lens Assembly", the disclosure of which is hereby incorporated by reference in its entirety.

TECHNICAL FIELD

The disclosure relates to an optical imaging lens assembly, and particularly to an optical imaging lens assembly consisting of ten lenses.

BACKGROUND

Since 2018, cameras of smart phones have started a new round of digital war: 40 mega-pixel, 48 mega-pixel and 64 mega-pixel, and new ultrahigh-pixel smart phones have rapidly become popular on the market one after another, not only occupied "central positions" in flagship phones that have been launched recently and even extended the influence to the field of mobile phones worth 1,000 to 2,000 yuan. Pixel is directly proportional to the number of lenses of an imaging lens set, and if the number of the lenses is larger, the imaging quality of the lenses is higher and resolving power and the contrast may be improved greatly.

Some embodiments of the disclosure aims to provide a ten-element camera lens set with a large image surface, which may satisfy requirements of a user on high pixel and high definition well during daily photographing with a mobile phone.

SUMMARY

Based on the foregoing problem, some embodiments of the disclosure provide an optical camera lens assembly with ten lenses. Compared with a camera lens with eight or fewer lenses in an art known to inventors, the optical camera lens has the advantages that the image quality is further improved, and an aberration is controlled.

Some embodiments of the disclosure provide an optical imaging lens assembly, which includes ten lenses, wherein, from an object side to an image side, the ten lenses sequentially includes a first lens with positive refractive power, a second lens with refractive power, a third lens with refractive power, a fourth lens with refractive power, a fifth lens with negative refractive power, a sixth lens with refractive power, a seventh lens with refractive power, an eighth lens with refractive power, a ninth lens with positive refractive power and a tenth lens with negative refractive power; the lenses are independent of one another and have air spaces on an optical axis; and at least three lenses in the first to tenth lenses are made of a plastic material, so that the weight of the imaging lens is reduced, and various aberrations are balanced better.

According to some embodiments of the disclosure, an on-axis distance TTL from an object-side surface of the first lens to an imaging surface and a half ImgH of a diagonal length of an effective pixel region on the imaging surface satisfy TTL/ImgH<1.4.

According to some embodiments of the disclosure, an effective focal length f of the optical imaging lens assembly and a maximum field of view (FOV) of the optical imaging lens assembly satisfy 6.0 mm<f*tan(½FOV)<8.0 mm.

According to some embodiments of the disclosure, an effective focal length f1 of the first lens, an effective focal length f9 of the ninth lens and an effective focal length f4 of the fourth lens assembly satisfy 0.8<(f1+f9)/f4<1.5.

According to some embodiments of the disclosure, an effective focal length f3 of the third lens, an effective focal length f5 of the fifth lens and an effective focal length f10 of the tenth lens satisfy 0.9<f3/(f5+f10)<1.4.

According to some embodiments of the disclosure, a radius of curvature R11 of an object-side surface of the sixth lens and an effective focal length f6 of the sixth lens satisfy 0.4<R11/f6<1.7.

According to some embodiments of the disclosure, the maximum FOV of the optical imaging lens assembly satisfies 76°<FOV<86°.

According to some embodiments of the disclosure, a radius of curvature R8 of an image-side surface of the fourth lens, a radius of curvature R9 of an object-side surface of the fifth lens and a radius of curvature R10 of an image-side surface of the fifth lens satisfy 0.2<(R8+R9)/R10<0.6.

According to some embodiments of the disclosure, a center thickness CT3 of the third lens on the optical axis, an air space T34 of the third lens and the fourth lens on the optical axis and a center thickness CT4 of the fourth lens on the optical axis satisfy 1.0<(CT3+T34)/CT4<1.6.

According to some embodiments of the disclosure, a center thickness CT9 of the ninth lens on the optical axis and a center thickness CT10 of the tenth lens on the optical axis satisfy 1.0<CT9/CT10<1.6.

According to some embodiments of the disclosure, an effective semi-diameter DT11 of an object-side surface of the first lens and an effective semi-diameter DT41 of an object-side surface of the fourth lens satisfy 1.0<DT11/DT41<1.4.

According to some embodiments of the disclosure, a combined focal length f123 of the first lens, the second lens and the third lens, a center thickness CT1 of the first lens on the optical axis, a center thickness CT2 of the second lens on the optical axis and a center thickness CT3 of the third lens on the optical axis satisfy 5.0<f123/(CT1+CT2+CT3)<6.0.

According to some embodiments of the disclosure, an on-axis distance SAG42 from an intersection point of an image-side surface of the fourth lens and the optical axis to an effective radius vertex of the image-side surface of the fourth lens and an on-axis distance SAG32 from an intersection point of an image-side surface of the third lens and the optical axis to an effective radius vertex of the image-side surface of the third lens satisfy:

$$-1.7 < SAG42/SAG32 < -1.0.$$

According to some embodiments of the disclosure, an on-axis distance SAG51 from an intersection point of an object-side surface of the fifth lens and the optical axis to an effective radius vertex of the object-side surface of the fifth lens and an on-axis distance SAG52 from an intersection point of an image-side surface of the fifth lens and the optical axis to an effective radius vertex of the image-side surface of the fifth lens satisfy 1.0<SAG51/SAG52<1.3.

An aspect of some embodiments of the disclosure provides an optical imaging lens assembly. Lenses are independent of each other and have air spaces on an optical axis. An on-axis distance TTL from an object-side surface of the first lens in ten lenses in a direction from an object side to an image side to an imaging surface, a half ImgH of a diagonal length of an effective pixel region on the imaging surface, an effective focal length f of the optical imaging lens assembly, a maximum FOV of the optical imaging lens assembly, an effective focal length f1 of the first lens, an effective focal length f9 of the ninth lens and an effective focal length f4 of the fourth lens satisfy the following conditions:

$TTL/ImgH<1.4$;

6.0 mm$<f*\tan(0.5FOV)<8.0$ mm; and $0.8<(f1+f9)/f4<1.5$.

According to some embodiments of the disclosure, an effective focal length f3 of the third lens, an effective focal length f5 of the fifth lens, an effective focal length f10 of the tenth lens, a radius of curvature R11 of an object-side surface of the sixth lens and an effective focal length f6 of the sixth lens satisfy:

$0.9<f3/(f5+f10)<1.4$; and $0.4<R11/f6<1.7$.

According to some embodiments of the disclosure, the maximum FOV of the optical imaging lens assembly, a radius of curvature R9 of an object-side surface of the fifth lens and a radius of curvature R10 of an image-side surface of the fifth lens satisfy:

$76°<FOV<86°$; and $0.2<(R8+R9)/R10<0.6$.

According to some embodiments of the disclosure, a center thickness CT3 of the third lens on the optical axis, an air space T34 of the third lens and the fourth lens on the optical axis, a center thickness CT4 of the fourth lens on the optical axis, a center thickness CT9 of the ninth lens on the optical axis and a center thickness C10 of the tenth lens on the optical axis satisfy:

$1.0<(CT3+T34)/CT4<1.6$; and $1.0<CT9/CT10<1.6$.

According to some embodiments of the disclosure, an effective semi-diameter DT11 of the object-side surface of the first lens, an effective semi-diameter DT41 of an object-side surface of the fourth lens, a combined focal length f123 of the first lens, the second lens and the third lens, a center thickness CT1 of the first lens on the optical axis, a center thickness CT2 of the second lens on the optical axis and the center thickness CT3 of the third lens on the optical axis satisfy:

$1.0<DT11/DT41<1.4$; and $5.0<f123/(CT1+CT2+CT3)<6.0$.

According to some embodiments of the disclosure, an on-axis distance SAG42 from an intersection point of an image-side surface of the fourth lens and the optical axis to an effective radius vertex of the image-side surface of the fourth lens, an on-axis distance SAG32 from an intersection point of an image-side surface of the third lens and the optical axis to an effective radius vertex of the image-side surface of the third lens, an on-axis distance SAG51 from an intersection point of the object-side surface of the fifth lens and the optical axis to an effective radius vertex of the object-side surface of the fifth lens and an on-axis distance SAG52 from an intersection point of the image-side surface of the fifth lens and the optical axis to an effective radius vertex of the image-side surface of the fifth lens satisfy:

$-1.7<SAG42/SAG32<-1.0$; and $1.0<SAG51/SAG52<1.3$.

An aspect of some embodiments of the disclosure provides an optical imaging lens assembly. At least three lenses in first to tenth lenses are made of a plastic material. A maximum FOV of the optical imaging lens assembly, a radius of curvature R8 of an image-side surface of the fourth lens, a radius of curvature R9 of an object-side surface of the fifth lens, a radius of curvature R10 of an image-side surface of the fifth lens, a center thickness CT3 of the third lens on an optical axis, an air space T34 of the third lens and the fourth lens on the optical axis and a center thickness CT4 of the fourth lens on the optical axis satisfy the following conditions:

$76°<FOV<86°$;

$0.2<(R8+R9)/R10<0.6$; and $1.0<(CT3+T34)/CT4<1.6$.

According to some embodiments of the disclosure, an on-axis distance TTL from an object-side surface of the first lens to an imaging surface, a half ImgH of a diagonal length of an effective pixel region on the imaging surface, an on-axis distance SAG51 from an intersection point of the object-side surface of the fifth lens and the optical axis to an effective radius vertex of the object-side surface of the fifth lens and an on-axis distance SAG52 from an intersection point of the image-side surface of the fifth lens and the optical axis to an effective radius vertex of the image-side surface of the fifth lens satisfy:

$TTL/ImgH<1.4$; and $1.0<SAG51/SAG52<1.3$.

According to some embodiments of the disclosure, an effective focal length f of the optical imaging lens assembly, the maximum FOV of the optical imaging lens assembly, an on-axis distance SAG42 from an intersection point of the image-side surface of the fourth lens and the optical axis to an effective radius vertex of the image-side surface of the fourth lens and an on-axis distance SAG32 from an intersection point of an image-side surface of the third lens and the optical axis to an effective radius vertex of the image-side surface of the third lens satisfy:

6.0 mm$<f*\tan(½FOV)<8.0$ mm; and $-1.7<SAG42/SAG32<-1.0$.

According to some embodiments of the disclosure, an effective focal length f1 of the first lens, an effective focal length f9 of the ninth lens, an effective focal length f4 of the fourth lens, a combined focal length f123 of the first lens, the second lens and the third lens, a center thickness CT1 of the first lens on the optical axis, a center thickness CT2 of the second lens on the optical axis and the center thickness CT3 of the third lens on the optical axis satisfy:

$0.8<(f1+f9)/f4<1.5$; and $5.0<f123/(CT1+CT2+CT3)<6.0$.

According to some embodiments of the disclosure, an effective focal length f3 of the third lens, an effective focal length f5 of the fifth lens, an effective focal length f10 of the tenth lens, an effective semi-diameter DT11 of the object-side surface of the first lens and an effective semi-diameter DT41 of an object-side surface of the fourth lens satisfy:

$0.9<f3/(f5+f10)<1.4$; and $1.0<DT11/DT41<1.4$.

According to some embodiments of the disclosure, a radius of curvature R11 of an object-side surface of the sixth lens, an effective focal length f6 of the sixth lens, a center thickness CT9 of the ninth lens on the optical axis and a center thickness CT10 of the tenth lens on the optical axis satisfy:

0.4<R11/f6<1.7; and 1.0<CT9/CT10<1.6.

Some embodiments of the disclosure have the following positive effects. With adoption of the technical solutions provided in some embodiments of the disclosure, through the ultrahigh-definition ten-element camera lens set with an ultra-large image surface, the resolving power and the contrast are improved greatly, and requirements of a user on high pixel and high definition during daily photographing with a mobile phone is met well.

BRIEF DESCRIPTION OF THE DRAWINGS

Detailed descriptions made to unrestrictive implementation modes with reference to the following drawings are read to make the other characteristics, purposes and advantages of the application more apparent.

DETAILED DESCRIPTION OF THE EMBODIMENTS

Figure 1:
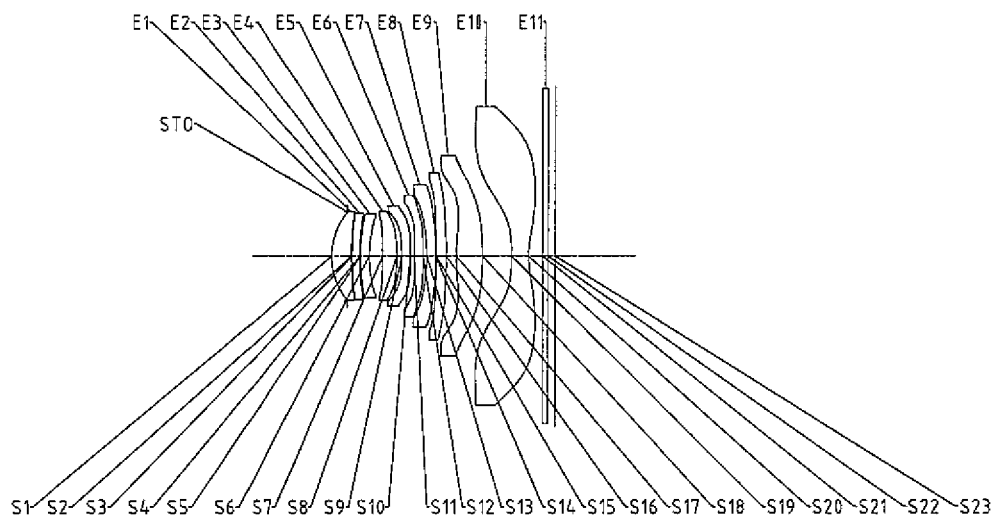
FIG. 1 illustrates a structure diagram of an optical imaging lens assembly according to embodiment 1 of the disclosure.

For understanding the application better, more detailed descriptions will be made to each aspect of the application with reference to the drawings. It is to be understood that these detailed descriptions are only descriptions about the exemplary implementation modes of the application and not intended to limit the scope of the application in any manner. In the whole specification, the same reference sign numbers represent the same components. Expression "and/or" includes any or all combinations of one or more in associated items that are listed.

It should be noted that, in this description, the expressions of first, second, third, etc. are only used to distinguish one feature from another feature, and do not represent any limitation to the feature. Thus, a first lens discussed below could also be referred to as a second lens or a third lens without departing from the teachings of the application.

In the drawings, the thickness, size and shape of the lens have been slightly exaggerated for ease illustration. In particular, a spherical shape or aspherical shape shown in the drawings is shown by some embodiments. That is, the spherical shape or the aspherical shape is not limited to the spherical shape or aspherical shape shown in the drawings. The drawings are by way of example only and not strictly to scale.

Herein, a paraxial region refers to a region nearby an optical axis. If a lens surface is a convex surface and a position of the convex surface is not defined, it indicates that the lens surface is a convex surface at least in the paraxial region; and if a lens surface is a concave surface and a position of the concave surface is not defined, it indicates that the lens surface is a concave surface at least in the paraxial region. A surface, closest to a shot object, of each lens is called an object-side surface of the lens, and a surface, closest to an imaging surface, of each lens is called an image-side surface of the lens.

It should also be understood that terms "include", "including", "have", "contain" and/or "containing", used in the specification, represent existence of a stated characteristic, component and/or part but do not exclude existence or addition of one or more other characteristics, components and parts and/or combinations thereof. In addition, expressions like "at least one in . . . " may appear after a list of listed characteristics not to modify an individual component in the list but to modify the listed characteristics. Moreover, when the implementation modes of the application are described, "may" is used to represent "one or more implementation modes of the application". Furthermore, term "exemplary" refers to an example or exemplary description.

Unless otherwise defined, all terms (including technical terms and scientific terms) used in the application have the same meanings usually understood by those of ordinary skill in the art of the application. It should also be understood that the terms (for example, terms defined in a common dictionary) should be explained to have meanings consistent with the meanings in the context of a related art and may not be explained with ideal or excessively formal meanings, unless clearly defined like this in the application.

It is to be noted that the embodiments in the application and characteristics in the embodiments may be combined without conflicts. The application will be described below with reference to the drawings and in combination with the embodiments in detail.

The features, principles and other aspects of the application will be described below in detail.

An optical imaging lens assembly according to an exemplary implementation mode of the disclosure includes ten lenses. From an object side to an image side, the ten lenses are sequentially includes a first lens, a second lens, a third lens, a fourth lens, a fifth lens, a sixth lens, a seventh lens, an eighth lens, a ninth lens and a tenth lens. The lenses are independent of one another and have air spaces on an optical axis. At least three lenses in the first to tenth lenses are made of a plastic material.

In some embodiments of the disclosure, refractive power of each optical element in a system is controlled reasonably to balance and control a low-order aberration of the system effectively. The first lens has positive refractive power and is favorable for correcting an off-axis aberration of the optical lens set and improving the imaging quality. The second lens has positive refractive power or negative refractive power. The third lens has positive refractive power or negative refractive power. The fourth lens has positive refractive power or negative refractive power. The fifth lens has negative refractive power and is favorable for optimizing a field curvature of the system, reducing a dispersion of the system and improving the phenomenon of intersection of field curvatures of the system. The sixth lens has positive refractive power or negative refractive power. The seventh lens has positive refractive power or negative refractive power. The eighth lens has positive refractive power or negative refractive power. The ninth lens has positive refractive power and is favorable for correcting the off-axis aberration of the optical lens set and improving the imaging quality. The tenth lens has negative refractive power and is favorable for sharing a large FOV effectively to obtain a larger FOV range and improving a capability of the optical system in collecting object information. The lenses are independent of one another and have the air spaces on the optical axis. At least three lenses in the first to tenth lenses are made of the plastic material, so that the weight of the imaging lens assembly is reduced, and various aberrations are balanced better.

In some embodiments of the disclosure, the optical imaging lens assembly satisfies a condition TTL/ImgH<1.4, wherein TTL is an axial distance from an object-side surface of the first lens to an imaging surface, and ImgH is a half of a diagonal length of an effective pixel region on the imaging surface. A ratio of TTL to ImgH is controlled to satisfy a miniaturization requirement of the imaging system. In some embodiments, TTL and ImgH satisfy 1.31≤TTL/ImgH≤0.36.

In some embodiments of the disclosure, the optical imaging lens assembly satisfies a condition 6.0 mm<f*tan(0.5FOV)<8.0 mm, wherein f is an effective focal length of the optical imaging lens assembly, and FOV is a maximum FOV of the optical imaging lens assembly. The expression is controlled to ensure a relatively large imaging range of the imaging lens and simultaneously ensure a relatively high aberration correction capability of the camera lens set. In some embodiments, f and FOV satisfy 6.06≤f*tan(0.5FOV)≤6.37, in some embodiments 6.10≤f*tan(0.5FOV)≤6.24.

In some embodiments of the disclosure, the optical imaging lens assembly may satisfy a condition 0.8<(f1+f9)/f4<1.5, wherein f1 is an effective focal length of the first lens, f9 is an effective focal length of the ninth lens, and f4 is an effective focal length of the fourth lens. The conditional expression is controlled in a reasonable range to reduce the tolerance sensitivity and keep the imaging system small. More specifically, f1, f4 and f9 may satisfy 0.94≤(f1+f9)/f4≤0.31, in some embodiments 1.19≤(f1+f9)/f4≤1.29.

In some embodiments of the disclosure, the optical imaging lens assembly satisfies 0.9<f3/(f5+f10)<1.4, wherein f3 is an effective focal length of the third lens, f5 is an effective focal length of the fifth lens, and f10 is an effective focal length of the tenth lens. The conditional expression is controlled in a reasonable range to reduce the tolerance sensitivity and keep the imaging system small. More specifically, f3, f5 and f10 satisfy 0.99≤f3/(f5+f10)≤1.32, and in some embodiments 0.99≤3/(f5+f10)≤1.20.

In some embodiments of the disclosure, the optical imaging lens assembly satisfies 0.4<R11/f6<1.7, wherein R11 is a radius of curvature of an object-side surface of the sixth lens, and f6 is an effective focal length of the sixth lens. A ratio of the radius of curvature of the object-side surface of the sixth lens of the camera lens set to the effective focal length of the sixth lens is controlled reasonably to ensure an adequate convergence capability of an object-side end to regulate a beam convergence position and further reduce the Total Track Length (TTL) of the system. More specifically, R11 and f6 satisfy 0.49≤R11/f6≤1.69, and in some embodiments 0.49≤R11/f6≤1.84.

In some embodiments of the disclosure, the optical imaging lens assembly satisfies 76°<FOV<86°, wherein FOV is the maximum FOV of the optical imaging lens assembly. The maximum FOV of the optical imaging lens assembly is controlled to ensure an imaging range of the system based on relatively high imaging quality. More specifically, FOV satisfies 79.9°≤FOV≤85.4°, in some embodiments 79.9°≤FOV≤81.5°.

In some embodiments of the disclosure, the optical imaging lens assembly satisfies 0.2<(R8+R9)/R10<0.6, wherein R8 is a radius of curvature of an image-side surface of the fourth lens, R9 is a radius of curvature of an object-side surface of the fifth lens, and R10 is a radius of curvature of an image-side surface of the fifth lens. The conditional expression is controlled in a reasonable range to correct a chromatic aberration of the system and simultaneously balance each aberration. More specifically, R8, R9 and R10 satisfy $0.24 \leq (R8+R9)/R10 \leq 1.51$, in some embodiments $0.30 \leq (R8+R9)/R10 \leq 1.38$.

In some embodiments of the disclosure, the optical imaging lens assembly satisfies $1.0 < (CT3+T34)/CT4 < 1.6$, wherein CT3 is a center thickness of the third lens on the optical axis, T34 is an air space of the third lens and the fourth lens on the optical axis, and CT4 is a center thickness of the fourth lens on the optical axis. The condition is met to control a space occupation ratio of the third and fourth lenses reasonably, which is favorable for ensuring an assembling process for the lenses and implementing miniaturization of the optical lens. More specifically, CT3, T34 and CT4 satisfy $1.14 \leq (CT3+T34)/CT4 \leq 1.54$, in some embodiments $1.14 \leq (CT3+T34)/CT4 \leq 1.21$.

In some embodiments of the disclosure, the optical imaging lens assembly satisfies $1.0 < CT9/CT10 < 1.6$, wherein CT9 is a center thickness of the ninth lens on the optical axis, and CT10 is a center thickness of the tenth lens on the optical axis. The condition is controlled reasonably to facilitate uniform size distribution of the lenses, ensure the assembling stability, reduce the aberration of the whole imaging system and reduce the TTL of the imaging system. More specifically, CT9 and CT10 may satisfy $1.04 \leq CT9/CT10 \leq 1.55$, in some embodiments $1.04 \leq CT9/CT10 \leq 1.08$.

In some embodiments of the disclosure, the optical imaging lens assembly satisfies $1.0 < DT11/DT41 < 1.4$, wherein DT11 is an effective semi-diameter of an object-side surface of the first lens, and DT41 is an effective semi-diameter of an object-side surface of the fourth lens. Maximum effective semi-diameters of the object-side surfaces of the first lens and the fourth lens are restricted in a reasonable range to reduce the size of the lens assembly, satisfy the miniaturization requirement of the lens assembly and improve the resolving power. More specifically, DT11 and DT41 satisfy $1.06 \leq DT11/DT41 \leq 1.21$, and in some embodiments $1.19 \leq DT11/DT41 \leq 1.21$.

In some embodiments of the disclosure, the optical imaging lens assembly satisfies $5.0 < f123/(CT1+CT2+CT3) < 6.0$, wherein f123 is a combined focal length of the first lens, the second lens and the third lens, CT1 is a center thickness of the first lens on the optical axis, CT2 is a center thickness of the second lens on the optical axis, and CT3 is the center thickness of the third lens on the optical axis. The conditional expression is controlled reasonably to ensure an adequate convergence capability of the object-side end to regulate the beam convergence position and further reduce the TTL of the camera lens set. More specifically, f123, CT1, CT2 and CT3 satisfy $5.33 \leq f123/(CT1+CT2+CT3) \leq 5.70$, in some embodiments $5.33 \leq f123/(CT1+CT2+CT3) \leq 5.50$.

In some embodiments of the disclosure, the optical imaging lens assembly satisfies $-1.7 < SAG42/SAG32 < -1.0$, wherein SAG42 is an on-axis distance from an intersection point of the image-side surface of the fourth lens and the optical axis to an effective radius vertex of the image-side surface of the fourth lens, and SAG32 is an on-axis distance from an intersection point of an image-side surface of the third lens and the optical axis to an effective radius vertex of the image-side surface of the third lens. The condition is controlled reasonably to regulate a chief ray angle of the optical imaging lens assembly, effectively improve relative luminance of the optical imaging lens set and improve the definition of an image surface. More specifically, SAG42 and SAG32 satisfy $-1.66 \leq SAG42/SAG32 \leq -1.11$, and in some embodiments $-1.47 \leq SAG42/SAG32 \leq -1.26$.

In some embodiments of the disclosure, the optical imaging lens assembly satisfies $1.0 < SAG51/SAG52 < 1.3$, wherein SAG51 is an on-axis distance from an intersection point of the object-side surface of the fifth lens and the optical axis to an effective radius vertex of the object-side surface of the fifth lens, and SAG52 is an on-axis distance from an intersection point of the image-side surface of the fifth lens and the optical axis to an effective radius vertex of the image-side surface of the fifth lens. The condition is controlled reasonably to facilitate regulation of a shape of the fifth lens and simultaneously improve the phenomenon of veiling glare generated by the fifth lens. More specifically, SAG51 and SAG52 satisfy $1.11 \leq SAG51/SAG52 \leq 1.25$, in some embodiments $1.11 \leq SAG51/SAG52 \leq 1.20$.

Each technical feature in the optical imaging lens assembly of some embodiments of the disclosure may be configured in a combined manner to achieve corresponding effects.

The optical imaging lens assembly according to some embodiments of the disclosure may adopt multiple lenses, for example, the abovementioned ten. The refractive power of each optical element of the system is controlled reasonably to balance and control the low-order aberration of the system effectively. The lenses are controlled to be independent of one another and have the air spaces on the optical axis, so that practical forming and assembling of the imaging lens assembly are ensured. At least three lenses in the first to tenth lenses are made of the plastic material, so that the weight of the imaging lens assembly is reduced, and various aberrations are balanced better. Requirements of a user on high pixel and high definition during daily photographing with a mobile phone may be met well.

Specific embodiments applied to the optical imaging lens assembly of the abovementioned embodiment will further be described below with reference to the drawings.

Embodiment 1

FIG. 1 illustrates a structure diagram of an optical imaging lens assembly according to embodiment 1 of the disclosure. As shown in FIG. 1, the camera lens component sequentially includes, from an object-side surface to an image-side surface, a diaphragm STO, a first lens E1, a second lens E2, a third lens E3, a fourth lens E4, a fifth lens E5, a sixth lens E6, a seventh lens E7, an eighth lens E8, a ninth lens E9, a tenth lens E10, an optical filter E11 and an imaging surface S23.

The first lens E1 has positive refractive power, an object-side surface S1 thereof is a convex surface, while an image-side surface S2 is a concave surface. The second lens E2 has negative refractive power, an object-side surface S3 thereof is a convex surface, while an image-side surface S4 is a concave surface. The third lens E3 has negative refractive power, an object-side surface S5 thereof is a convex surface, while an image-side surface S6 is a concave surface. The fourth lens E4 has positive refractive power, an object-side surface S7 thereof is a concave surface, while an image-side surface S8 is a convex surface. The fifth lens E5 has negative refractive power, an object-side surface S9 thereof is a concave surface, while an image-side surface S10 is a convex surface. The sixth lens has positive refractive power, an object-side surface S11 thereof is a convex surface, while an image-side surface S12 is a concave surface. The seventh lens has negative refractive power, an object-side surface S13 thereof is a concave surface, while an image-side surface S14 is a convex surface. The eighth lens has positive refractive power, an object-side surface S15 thereof is a concave surface, while an image-side surface S16 is a convex surface. The ninth lens has positive refractive power, an object-side surface S17 thereof is a convex surface, while an image-side surface S18 is a convex surface. The tenth lens has negative refractive power, an object-side surface S19 thereof is a concave surface, while an image-side surface S20 is a concave surface. The optical filter E11 has an object-side surface S21 and an image-side surface S22. Light from an object sequentially passes through each of the surfaces S1 to S22 and is finally imaged on the imaging surface S23.

Table 1 shows basic parameters of the optical imaging lens assembly of embodiment 1, and units of the radius of curvature, the thickness and the focal length are all millimeter.

TABLE 1

| Surface number | Surface type | Radius of curvature | Thickness | Focal length | Refractive index | Abbe number | Conic coefficient |
|---|---|---|---|---|---|---|---|
| OBJ | Spherical | Infinite | Infinite | | | | |
| STO | Spherical | Infinite | −0.6031 | | | | |
| S1 | Aspherical | 2.6774 | 0.7546 | 6.24 | 1.55 | 56.1 | −1.3220 |
| S2 | Aspherical | 11.2359 | 0.0329 | | | | 5.9517 |
| S3 | Aspherical | 18.0183 | 0.2950 | −147.45 | 1.67 | 20.4 | 69.6830 |
| S4 | Aspherical | 15.1242 | 0.0200 | | | | 82.7556 |
| S5 | Aspherical | 6.7848 | 0.3300 | −26.49 | 1.68 | 19.2 | 5.1901 |
| S6 | Aspherical | 4.8271 | 0.4963 | | | | −3.0669 |
| S7 | Aspherical | −40.9259 | 0.5375 | 16.72 | 1.55 | 56.1 | 95.7783 |
| S8 | Aspherical | −7.4992 | 0.1926 | | | | 0.4409 |
| S9 | Aspherical | −7.5189 | 0.3150 | −15.28 | 1.67 | 20.4 | 2.3268 |
| S10 | Aspherical | −29.3262 | 0.1518 | | | | 70.9363 |
| S11 | Aspherical | 19.8686 | 0.3302 | 39.23 | 1.65 | 23.5 | 26.2841 |
| S12 | Aspherical | 92.7251 | 0.1331 | | | | 89.8314 |
| S13 | Aspherical | −7.0489 | 0.3400 | −25.08 | 1.65 | 23.5 | 2.7608 |
| S14 | Aspherical | −12.7512 | 0.0305 | | | | 9.4275 |
| S15 | Aspherical | −28.2664 | 0.3800 | 43.19 | 1.65 | 23.5 | 70.0363 |
| S16 | Aspherical | −14.0874 | 0.3723 | | | | −27.0133 |
| S17 | Aspherical | 9.9554 | 0.9931 | 9.44 | 1.55 | 56.1 | 0.0466 |
| S18 | Aspherical | −10.3004 | 1.0877 | | | | −0.2048 |
| S19 | Aspherical | −14.9438 | 0.6400 | −4.77 | 1.54 | 55.7 | 4.5837 |
| S20 | Aspherical | 3.1330 | 0.5313 | | | | −8.1469 |
| S21 | Spherical | Infinite | 0.2100 | | 1.52 | 64.2 | |
| S22 | Spherical | Infinite | 0.2710 | | | | |
| S23 | Spherical | Infinite | | | | | |

In embodiment 1, for an on-axis distance TTL from the object-side surface of the first lens to the imaging surface and a half ImgH of a diagonal length of an effective pixel region on the imaging surface, TTL/ImgH=1.31, and a relational expression TTL/ImgH<1.4 is met.

In embodiment 1, for an effective focal length f of the optical imaging lens assembly and a maximum FOV of the optical imaging lens assembly, f*tan(0.5FOV)=6.37 mm, and a relational expression 6.0 mm<f*tan(½FOV)<8.0 mm is met.

In embodiment 1, for an effective focal length f1 of the first lens, an effective focal length f9 of the ninth lens and an effective focal length f4 of the fourth lens, (f1+f9)/f4=0.94, and a relational expression 0.8<(f1+f9)/f4<1.5 is met.

In embodiment 1, for a radius of curvature of the object-side surface of the sixth lens and an effective focal length f6 of the sixth lens, R11/f6=0.51, and a relational expression 0.4<R11/f6<1.7 is met.

In embodiment 1, for the maximum FOV of the optical imaging lens assembly, FOV=85.4°, and a relational expression 76°<FOV<86° is met.

In embodiment 1, for a radius of curvature R8 of an image-side surface of the fourth lens, a radius of curvature R9 of an object-side surface of the fifth lens and a radius of curvature R10 of an image-side surface of the fifth lens, (R8+R9)/R10=0.51, and a relational expression 0.2<(R8+R9)/R10<0.6 is met.

In embodiment 1, for a center thickness CT3 of the third lens on the optical axis, an air space T34 of the third lens and the fourth lens on the optical axis and a center thickness CT4 of the fourth lens on the optical axis, (CT3+T34)/CT4=1.54, and a relational expression 1.0<(CT3+T34)/CT4<1.6 is met.

In embodiment 1, for a center thickness CT9 of the ninth lens on the optical axis and a center thickness CT10 of the tenth lens on the optical axis, CT9/CT10=1.55, and a relational expression 1.0<CT9/CT10<1.6 is met.

In embodiment 1, for an effective semi-diameter DT11 of the object-side surface of the first lens and an effective semi-diameter DT41 of the object-side surface of the fourth lens, DT11/DT41=1.06, and a relational expression 1.0<DT11/DT41<1.4 is met.

In embodiment 1, for a combined focal length f123 of the first lens, the second lens and the third lens, a center thickness CT1 of the first lens on the optical axis, a center thickness CT2 of the second lens on the optical axis and the center thickness CT3 of the third lens on the optical axis, f123/(CT1+CT2+CT3)=5.70, and a relational expression 5.0<f123/(CT1+CT2+CT3)<6.0 is met.

In embodiment 1, for an on-axis distance SAG42 from an intersection point of the image-side surface of the fourth lens and the optical axis to an effective radius vertex of the image-side surface of the fourth lens and an on-axis distance SAG32 from an intersection point of the image-side surface of the third lens and the optical axis to an effective radius vertex of the image-side surface of the third lens, SAG42/SAG32=−1.66, and a relational expression −1.7<SAG42/SAG32<−1.0 is met.

In embodiment 1, for an on-axis distance SAG51 from an intersection point of the object-side surface of the fifth lens and the optical axis to an effective radius vertex of the object-side surface of the fifth lens and an on-axis distance SAG52 from an intersection point of the image-side surface of the fifth lens and the optical axis to an effective radius vertex of the image-side surface of the fifth lens, SAG51/SAG52=1.20, and a relational expression 1.0<SAG51/SAG52<1.3 is met.

In embodiment 1, both the object-side surface and image-side surface of any lens in the first lens E1 to the ninth lens E9 are aspherical surfaces, and a surface type x of each aspherical lens may be defined through, but not limited to, the following aspherical surface formula:

$$x = \frac{ch^2}{1+\sqrt{1-(k+1)c^2h^2}} + \Sigma Aih^i,$$

wherein x is a distance vector height between a position of the aspherical surface at a height h along a direction of the optical axis and an aspherical surface vertex; c is a paraxial curvature of the aspherical surface, c=1/R (namely, the paraxial curvature c is a reciprocal of the radius of curvature R in Table 1); k is the cone coefficient (given in Table 1); and Ai is an correction coefficient of the i-th order of the aspherical surface.

The following Table 2 shows higher-order coefficients A4, A6, A8, A10, A12, A14, A16, A19 and A20 applied to each of the aspherical mirror surfaces S1-S20 of the aspherical lenses in embodiment 1 of the disclosure.

Figure 2:
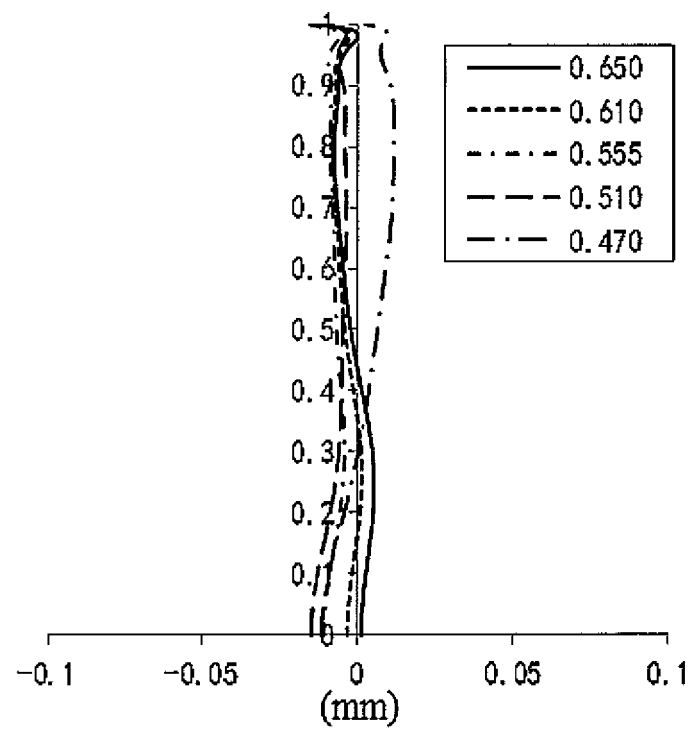
FIG. 2 to FIG. 5 illustrate a longitudinal aberration curve, astigmatism curve, distortion curve and lateral color curve of an optical imaging lens assembly according to embodiment 1 of the disclosure.
Figure 3:
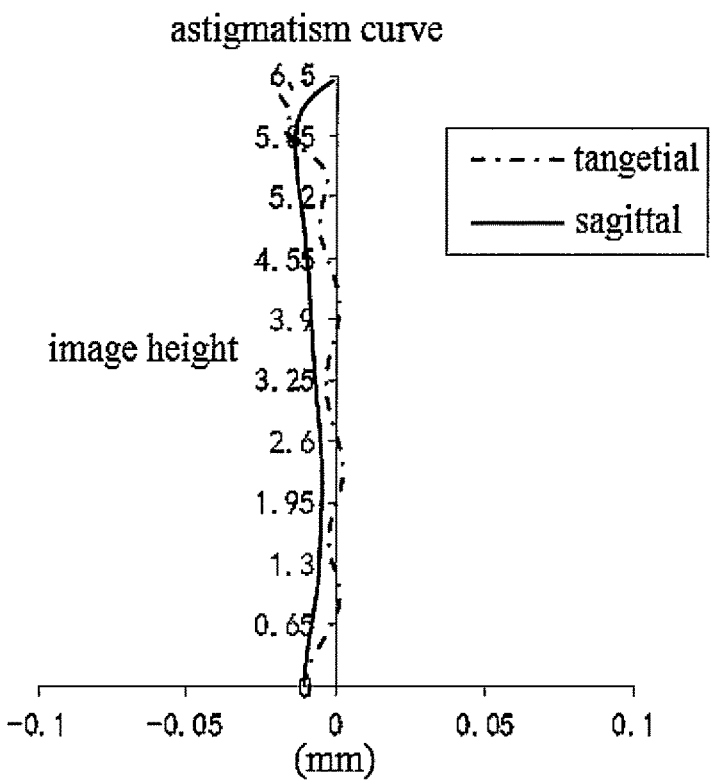
Figure 4:
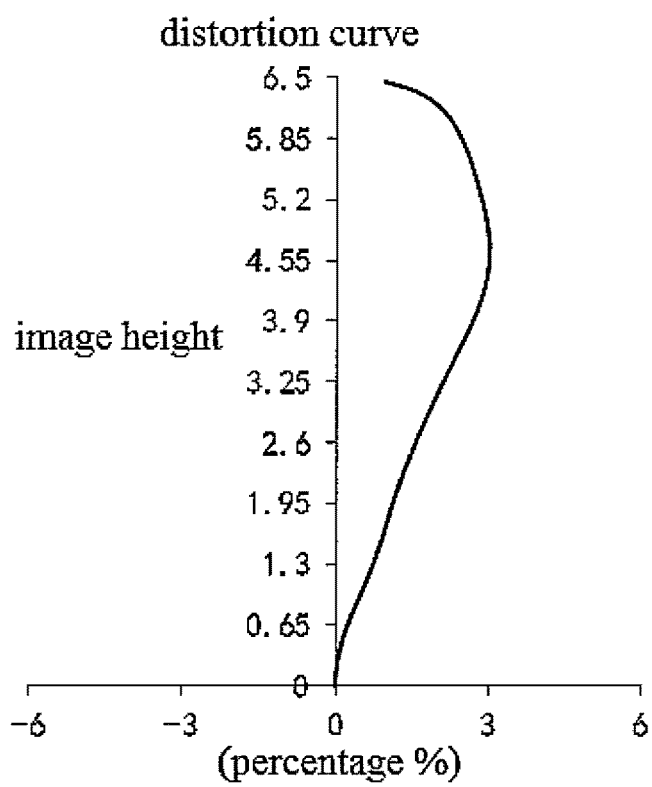
Figure 5:
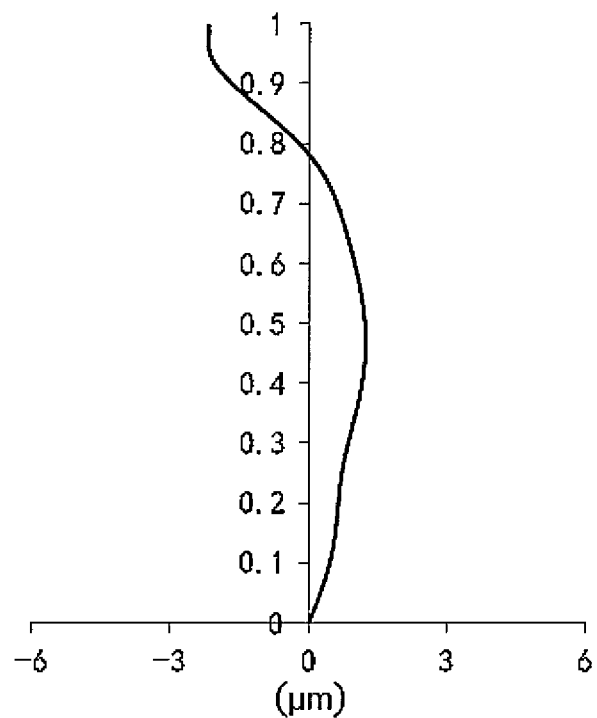

FIG. 2 shows a longitudinal aberration curve of the optical imaging lens assembly according to embodiment 1 to represent deviation of a convergence focal point after light with different wavelengths passes through the lens. FIG. 3 shows an astigmatism curve of the optical imaging lens assembly according to embodiment 1 to represent a tangential image surface curvature and a sagittal image surface curvature. FIG. 4 shows a distortion curve of the optical imaging lens assembly according to embodiment 2 to represent distortion values corresponding to different image heights. FIG. 5 shows a lateral color curve of the optical imaging lens assembly according to embodiment 1 to represent deviation of different image heights on the imaging surface after the light passes through the lens. According to FIG. 2 to FIG. 5, it can be seen that the optical imaging lens assembly provided in embodiment 1 achieves high imaging quality.

Embodiment 2

Figure 6:
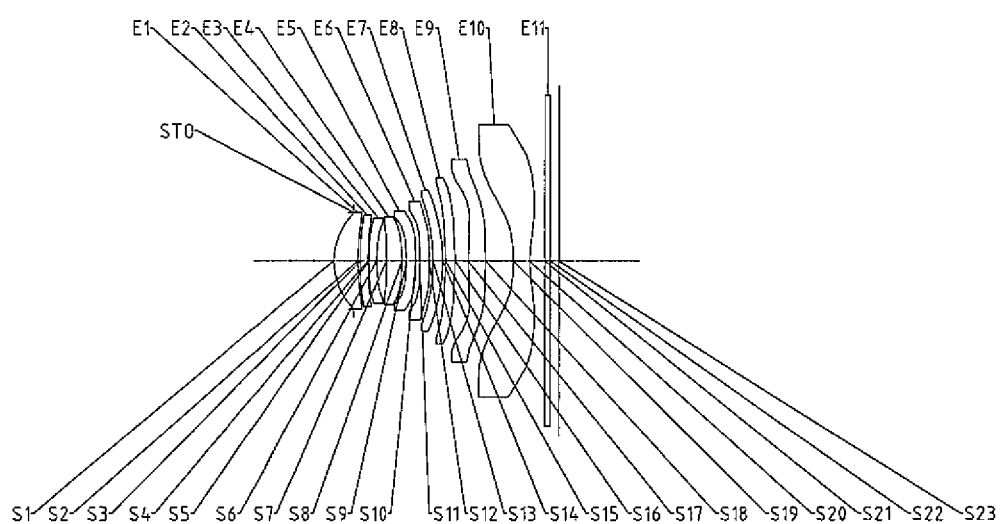
FIG. 6 illustrates a structure diagram of an optical imaging lens assembly according to embodiment 2 of the disclosure.

FIG. 6 illustrates a structure diagram of an optical imaging lens assembly according to embodiment 2 of the disclosure. As shown in FIG. 1, the camera lens component sequentially includes, from an object-side surface to an image-side surface, a diaphragm STO, a first lens E1, a

TABLE 2

| Surface number | A4 | A6 | A8 | A10 | A12 |
|---|---|---|---|---|---|
| S1 | 9.2735E−03 | 1.8620E−03 | −2.7448E−03 | 3.9007E−03 | −3.2552E−03 |
| S2 | −8.3620E−03 | 2.1554E−03 | −1.1083E−02 | 4.3012E−02 | −6.0339E−02 |
| S3 | 1.0707E−03 | −3.9062E−03 | −2.0169E−03 | 3.1719E−02 | −5.2040E−02 |
| S4 | 2.8352E−02 | −7.0069E−02 | 1.0977E−01 | −1.0450E−01 | 5.6251E−02 |
| S5 | 1.0979E−02 | −6.2991E−02 | 1.0135E−01 | −9.7365E−02 | 5.5659E−02 |
| S6 | −3.6710E−03 | 2.0643E−03 | −6.9162E−03 | 1.7340E−02 | −2.1279E−02 |
| S7 | −1.0731E−02 | 1.9480E−03 | −1.3155E−02 | 2.0735E−02 | −2.0780E−02 |
| S8 | −1.1397E−02 | −2.3411E−02 | 3.4247E−02 | −3.8123E−02 | 2.8441E−02 |
| S9 | −1.0913E−02 | −4.7229E−02 | 5.2080E−02 | −3.9784E−02 | 2.1512E−02 |
| S10 | −1.2862E−02 | −2.3408E−02 | 1.5578E−02 | −5.4487E−03 | −1.8998E−04 |
| S11 | −5.1739E−02 | 4.3757E−02 | −4.4204E−02 | 3.1055E−02 | −1.6321E−02 |
| S12 | −4.4864E−02 | 3.0960E−02 | −3.1091E−02 | 2.2148E−02 | −1.0063E−02 |
| S13 | 3.4252E−02 | −4.8781E−02 | 2.3065E−02 | 3.5592E−03 | −4.2018E−03 |
| S14 | 1.1015E−02 | −2.2318E−02 | 1.4282E−02 | −3.6704E−03 | 2.3366E−04 |
| S15 | −1.9930E−02 | 2.9204E−02 | −2.0119E−02 | 8.1919E−03 | −2.0811E−03 |
| S16 | 3.8974E−03 | 2.5481E−03 | −2.6237E−03 | 8.7792E−04 | −1.5066E−04 |
| S17 | 3.5709E−03 | −1.2878E−02 | 5.1054E−03 | −1.2082E−03 | 1.8848E−04 |
| S18 | 7.4644E−03 | −6.5539E−03 | 1.4202E−03 | −9.1430E−05 | −1.2924E−05 |
| S19 | −4.49903E−02 | 7.8026E−03 | −6.3411E−04 | 2.8674E−05 | −6.4150E−07 |
| S20 | −2.3951E−02 | 4.7166E−03 | −5.9210E−04 | 4.9885E−05 | −2.8746E−06 |

| Surface number | A14 | A16 | A18 | A20 |
|---|---|---|---|---|
| S1 | 1.6582E−03 | −5.0475E−04 | 8.3941E−05 | −5.8708E−06 |
| S2 | 4.3730E−02 | −1.7617E−02 | 3.7526E−03 | −3.3019E−04 |
| S3 | 4.0380E−02 | −1.6985E−02 | 3.7390E−03 | −3.3834E−04 |
| S4 | −1.3112E−02 | −1.5349E−03 | 1.4418E−03 | −2.1566E−04 |
| S5 | −1.6101E−02 | 6.3484E−04 | 8.0948E−04 | −1.4564E−04 |
| S6 | 1.5596E−02 | −6.7798E−03 | 1.6215E−03 | −1.6322E−04 |
| S7 | 1.3132E−02 | −5.0008E−03 | 1.0575E−03 | −9.4677E−05 |
| S8 | −1.3750E−02 | 4.1356E−03 | −6.9708E−04 | 4.9176E−05 |
| S9 | −8.2608E−03 | 2.1892E−03 | −3.7253E−04 | 3.0836E−05 |
| S10 | 9.4656E−04 | −3.5063E−04 | 5.3003E−05 | −2.5543E−06 |
| S11 | 5.9246E−03 | −1.3397E−03 | 1.6837E−04 | −9.0244E−06 |
| S12 | 2.8503E−03 | −4.8264E−04 | 4.4696E−05 | −1.7520E−06 |
| S13 | 1.6749E−03 | −3.1342E−04 | 3.0046E−05 | −1.2047E−06 |
| S14 | 7.3062E−05 | −1.6857E−05 | 1.3817E−06 | −4.1624E−08 |
| S15 | 3.3105E−04 | −3.2085E−05 | 1.7398E−06 | −4.0690E−08 |
| S16 | 1.3960E−05 | −6.5221E−07 | 1.1799E−08 | −4.8768E−12 |
| S17 | −2.0277E−05 | 1.4572E−06 | −6.1222E−08 | 1.1036E−09 |
| S18 | 2.8869E−06 | −2.2524E−07 | 8.2556E−09 | −1.1882E−10 |
| S19 | −3.0338E−10 | 3.8328E−10 | −8.5157E−12 | 6.2716E−14 |
| S20 | 1.1107E−07 | −2.7463E−09 | 3.9260E−11 | −2.4656E−13 | second lens E2, a third lens E3, a fourth lens E4, a fifth lens E5, a sixth lens E6, a seventh lens E7, an eighth lens E8, a ninth lens E9, a tenth lens E10, an optical filter E11 and an imaging surface S23.

The first lens E1 has positive refractive power, an object-side surface S1 thereof is a convex surface, while an image-side surface S2 is a concave surface. The second lens E2 has negative refractive power, an object-side surface S3 thereof is a convex surface, while an image-side surface S4 is a concave surface. The third lens E3 has negative refractive power, an object-side surface S5 thereof is a convex surface, while an image-side surface S6 is a concave surface. The fourth lens E4 has positive refractive power, an object-side surface S7 thereof is a convex surface, while an image-side surface S8 is a convex surface. The fifth lens E5 has negative refractive power, an object-side surface S9 thereof is a concave surface, while an image-side surface S10 is a convex surface. The sixth lens E6 has positive refractive power, an object-side surface S11 thereof is a convex surface, while an image-side surface S12 is a convex surface. The seventh lens E7 has positive refractive power, an object-side surface S13 thereof is a concave surface, while an image-side surface S14 is a convex surface. The eighth lens E8 has negative refractive power, an object-side surface S15 thereof is a concave surface, while an image-side surface S16 is a convex surface. The ninth lens E9 has positive refractive power, an object-side surface S17 thereof is a convex surface, while an image-side surface S18 is a convex surface. The tenth lens E10 has negative refractive power, an object-side surface S19 thereof is a concave surface, while an image-side surface S20 is a concave surface. The optical filter E11 has an object-side surface S21 and an image-side surface S22. Light from an object sequentially passes through each of the surfaces S1 to S22 and is finally imaged on the imaging surface S23.

In embodiment 2 of the disclosure, explanations about parameters of each relational expression are the same as those in embodiment 1, and numerical values of each relational expression are listed in the following Table 3.

TABLE 3

| Embodiment 2 | | | |
|---|---|---|---|
| f(mm) | 7.28 | TTL(mm) | 8.49 |
| ImgH(mm) | 6.25 | TTL/ImgH | 1.36 |
| f*tan(½FOV) (mm) | 6.24 | (f1 + f9)/f4 | 1.21 |
| f3/(f5 + f10) | 1.16 | R11/f6 | 0.77 |
| FOV(°) | 81.2 | (R8 + R9)/R10 | 0.38 |
| (CT3 + T34)/CT4 | 1.14 | CT9/CT10 | 1.08 |
| DT11/DT41 | 1.21 | f123/(CT1 + CT2 + CT3) | 5.50 |
| SAG42/SAG32 | −1.26 | SAG51/SAG52 | 1.11 |

Table 4 shows basic parameters of the optical imaging lens of embodiment 2 of the disclosure, and units of the radius of curvature, the thickness and the focal length are all millimeter.

TABLE 4

| Surface number | Surface type | Radius of curvature | Thickness | Focal length | Refractive index | Abbe number | Conic coefficient |
|---|---|---|---|---|---|---|---|
| OBJ | Spherical | Infinite | Infinite | | | | |
| STO | Spherical | Infinite | −0.7444 | | | | |
| S1 | Aspherical | 2.5703 | 0.9055 | 6.22 | 1.55 | 56.1 | −1.2890 |
| S2 | Aspherical | 9.2412 | 0.0946 | | | | −2.3469 |
| S3 | Aspherical | 18.9866 | 0.2800 | −205.03 | 1.67 | 20.4 | 90.0000 |
| S4 | Aspherical | 16.5699 | 0.0400 | | | | 80.1915 |
| S5 | Aspherical | 7.7743 | 0.2803 | −22.21 | 1.68 | 19.2 | 7.1570 |
| S6 | Aspherical | 5.0518 | 0.3767 | | | | −2.0260 |
| S7 | Aspherical | 1277.4121 | 0.5746 | 16.21 | 1.55 | 56.1 | 95.7783 |
| S8 | Aspherical | −8.9123 | 0.1824 | | | | −0.0765 |
| S9 | Aspherical | −7.6155 | 0.3400 | −13.90 | 1.67 | 20.4 | −4.4371 |
| S10 | Aspherical | −43.8403 | 0.1559 | | | | 17.6514 |
| S11 | Aspherical | 39.5751 | 0.3600 | 51.12 | 1.65 | 23.5 | 90.0000 |
| S12 | Aspherical | −194.1623 | 0.1500 | | | | 31.6360 |
| S13 | Aspherical | −6.6471 | 0.3600 | 64.38 | 1.65 | 23.5 | 2.8588 |
| S14 | Aspherical | −5.8495 | 0.1000 | | | | −2.8402 |
| S15 | Aspherical | −19.4966 | 0.3600 | −254.23 | 1.65 | 23.5 | 33.3356 |
| S16 | Aspherical | −22.2945 | 0.4868 | | | | 42.0540 |
| S17 | Aspherical | 8.4072 | 0.6615 | 13.40 | 1.55 | 56.1 | 3.8927 |
| S18 | Aspherical | −54.8111 | 1.0453 | | | | 54.0739 |
| S19 | Aspherical | −17.0602 | 0.6142 | −5.21 | 1.54 | 55.7 | 4.3543 |
| S20 | Aspherical | 3.3875 | 0.5851 | | | | −12.2478 |
| S21 | Spherical | Infinite | 0.2100 | | 1.52 | 64.2 | |
| S22 | Spherical | Infinite | 0.3248 | | | | |
| S23 | Spherical | Infinite | | | | | |

The following Table 5 shows higher-order coefficients A4, A6, A8, A10, A12, A14, A16, A18 and A20 applied to each of the aspherical mirror surfaces S1-S20 of the aspherical lenses in embodiment 2 of the disclosure.

TABLE 5

| Surface number | A4 | A6 | A8 | A10 | A12 |
|---|---|---|---|---|---|
| S1 | 9.9794E−03 | 5.3445E−04 | 2.5409E−04 | −1.8176E−04 | 1.0153E−04 |
| S2 | −6.2636E−03 | 3.3606E−03 | −1.4201E−03 | 1.1219E−03 | −5.2359E−04 |
| S3 | 3.7094E−04 | 4.5527E−03 | −6.5916E−03 | 8.2703E−03 | −6.9337E−03 |
| S4 | 1.0287E−02 | −4.4611E−03 | −9.4107E−03 | 2.4413E−02 | −2.8162E−02 |

TABLE 5-continued

| | | | | | |
|---|---|---|---|---|---|
| S5 | −9.2172E−03 | −3.8531E−04 | −1.1068E−02 | 3.0849E−02 | −3.5796E−02 |
| S6 | −8.3277E−03 | 2.5726E−03 | 4.7398E−03 | −8.0307E−03 | 1.1022E−02 |
| S7 | −8.9493E−03 | −2.9249E−03 | −9.1099E−04 | 1.6161E−03 | −1.8460E−03 |
| S8 | −7.7095E−03 | −1.3242E−02 | 1.1522E−02 | −1.1186E−02 | 7.7075E−03 |
| S9 | −1.6434E−02 | −2.1818E−02 | 2.1649E−02 | −2.1498E−02 | 1.6488E−02 |
| S10 | −2.6007E−02 | −5.0638E−04 | −1.0190E−02 | 1.5319E−02 | −1.2796E−02 |
| S11 | −4.9528E−02 | 2.4518E−02 | −3.2258E−02 | 3.0635E−02 | −2.0079E−02 |
| S12 | −4.1176E−02 | 1.7811E−02 | −1.5449E−02 | 1.0676E−02 | −4.8407E−03 |
| S13 | 0.0000E+00 | 0.0000E+00 | 0.0000E+00 | 0.0000E+00 | 0.0000E+00 |
| S14 | 4.8396E−03 | −1.0360E−02 | 7.9509E−03 | −2.6999E−03 | 4.1081E−04 |
| S15 | 7.5041E−03 | −1.4340E−02 | 9.0030E−03 | −2.8863E−03 | 5.1850E−04 |
| S16 | 2.8531E−03 | −5.9326E−03 | 3.3484E−03 | −9.6087E−04 | 1.4946E−04 |
| S17 | −1.4340E−02 | −9.3450E−04 | −1.8305E−04 | 3.9261E−04 | −1.6803E−04 |
| S18 | −5.2723E−03 | −1.5372E−04 | −6.8942E−04 | 3.3781E−04 | −6.7846E−05 |
| S19 | −5.8610E−02 | 2.1637E−02 | −6.1133E−03 | 1.2187E−03 | −1.5479E−04 |
| S20 | −3.0342E−02 | 1.1014E−02 | −2.9948E−03 | 5.9654E−04 | −8.7069E−05 |

| Surface number | A14 | A16 | A18 | A20 |
|---|---|---|---|---|
| S1 | −2.9625E−05 | 1.1127E−06 | 1.6031E−06 | −3.1693E−07 |
| S2 | −4.8049E−05 | 1.6338E−04 | −6.5026E−05 | 8.3760E−06 |
| S3 | 3.5072E−03 | −1.0027E−03 | 1.3806E−04 | −5.5855E−06 |
| S4 | 1.8329E−02 | −6.8028E−03 | 1.3246E−03 | −1.0311E−04 |
| S5 | 2.3619E−02 | −8.9248E−03 | 1.7804E−03 | −1.4383E−04 |
| S6 | −9.0577E−03 | 4.4859E−03 | −1.2009E−03 | 1.3371E−04 |
| S7 | 1.4493E−03 | −6.3511E−04 | 1.7457E−04 | −2.3670E−05 |
| S8 | −3.6487E−03 | 1.2381E−03 | −2.6206E−04 | 2.2615E−05 |
| S9 | −9.2744E−03 | 3.5957E−03 | −8.3762E−04 | 8.5076E−05 |
| S10 | 6.3543E−03 | −1.8662E−03 | 3.0069E−04 | −2.0255E−05 |
| S11 | 8.9149E−03 | −2.6862E−03 | 5.4244E−04 | −6.6539E−05 |
| S12 | 1.4307E−03 | −2.6170E−04 | 2.7886E−05 | −1.6135E−06 |
| S13 | 0.0000E+00 | 0.0000E+00 | 0.0000E+00 | 0.0000E+00 |
| S14 | −6.1502E−06 | −6.8743E−06 | 9.2031E−07 | −3.9541E−08 |
| S15 | −5.2024E−05 | 2.6004E−06 | −3.5303E−08 | −1.1013E−09 |
| S16 | −1.1900E−05 | 2.9693E−07 | 1.7700E−08 | −9.7637E−10 |
| S17 | 4.0664E−05 | −6.5525E−06 | 7.1217E−07 | −4.9196E−08 |
| S18 | 7.2891E−06 | −4.3765E−07 | 1.3852E−08 | −1.8024E−10 |
| S19 | 1.1517E−05 | −3.3909E−07 | −2.0957E−08 | 2.8337E−09 |
| S20 | 9.3367E−06 | −7.3588E−07 | 4.2391E−08 | −1.7590E−09 |

Figure 7:
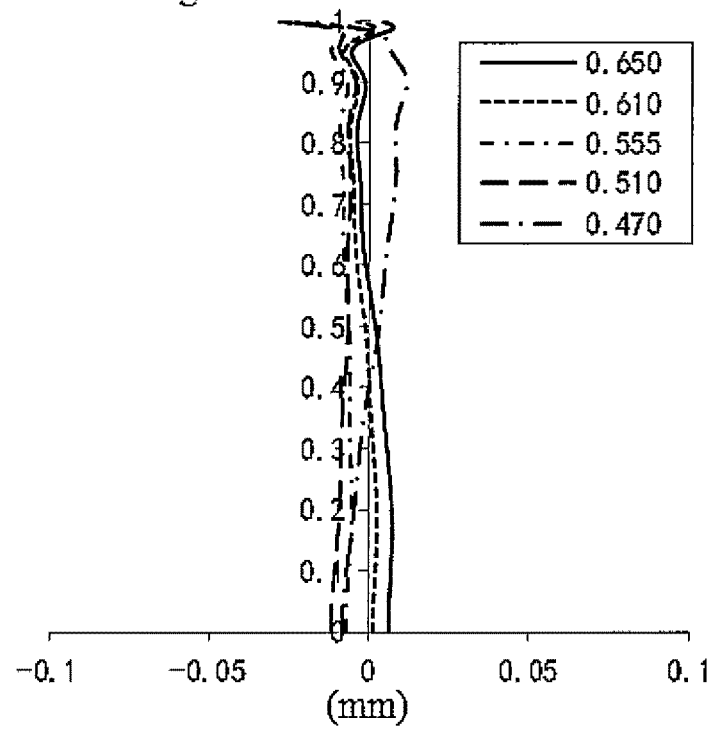
FIG. 7 to FIG. 10 illustrate a longitudinal aberration curve, astigmatism curve, distortion curve and lateral color curve of an optical imaging lens assembly according to embodiment 2 of the disclosure.
Figure 8:
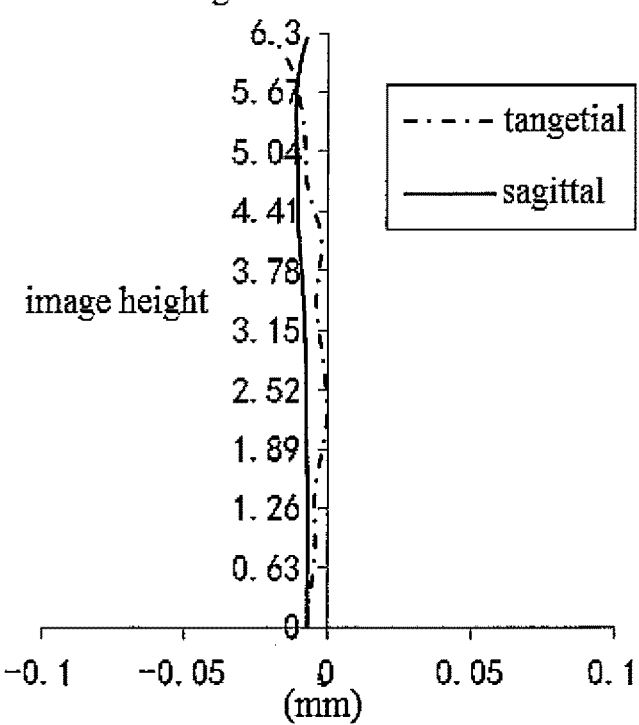
Figure 9:
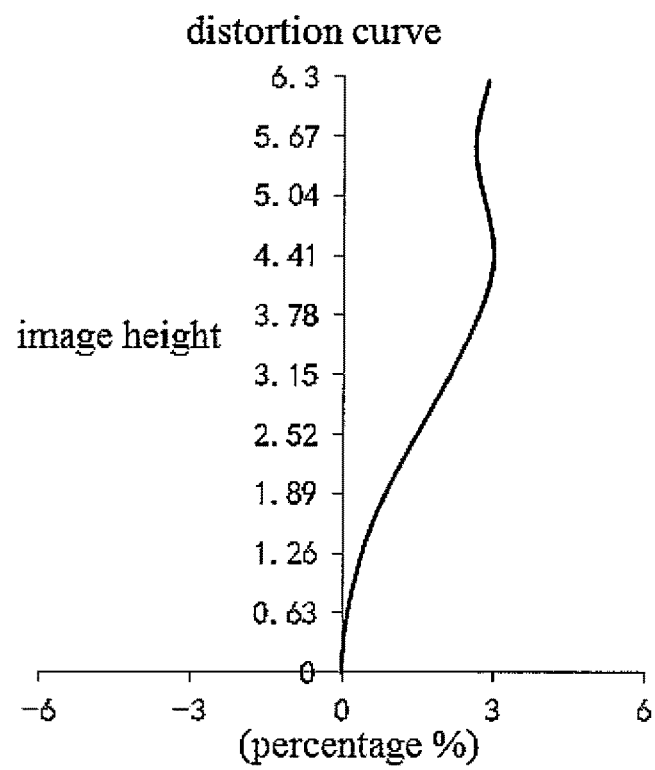
Figure 10:
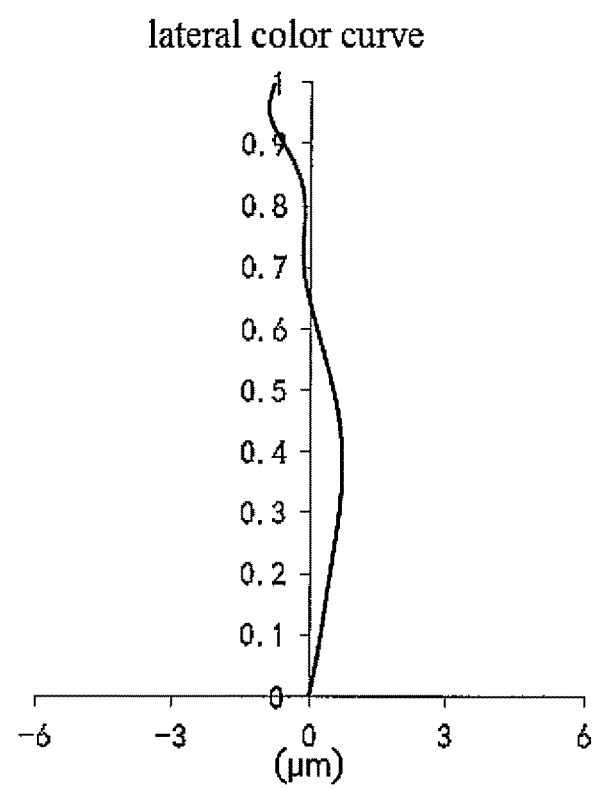

FIG. 7 shows a longitudinal aberration curve of the optical imaging lens assembly according to embodiment 2 of the disclosure to represent deviation of a convergence focal point after light with different wavelengths passes through the lens. FIG. 8 shows an astigmatism curve of the optical imaging lens according to embodiment 2 of the disclosure to represent a tangential image surface curvature and a sagittal image surface curvature. FIG. 9 shows a distortion curve of the optical imaging lens assembly according to embodiment 2 of the disclosure to represent distortion values corresponding to different image heights. FIG. 10 shows a lateral color curve of the optical imaging lens assembly according to embodiment 2 of the disclosure to represent deviation of different image heights on the imaging surface after the light passes through the lens. According to FIG. 7 to FIG. 10, it can be seen that the optical imaging lens assembly provided in embodiment 2 of the disclosure achieves high imaging quality.

Embodiment 3

Figure 11:
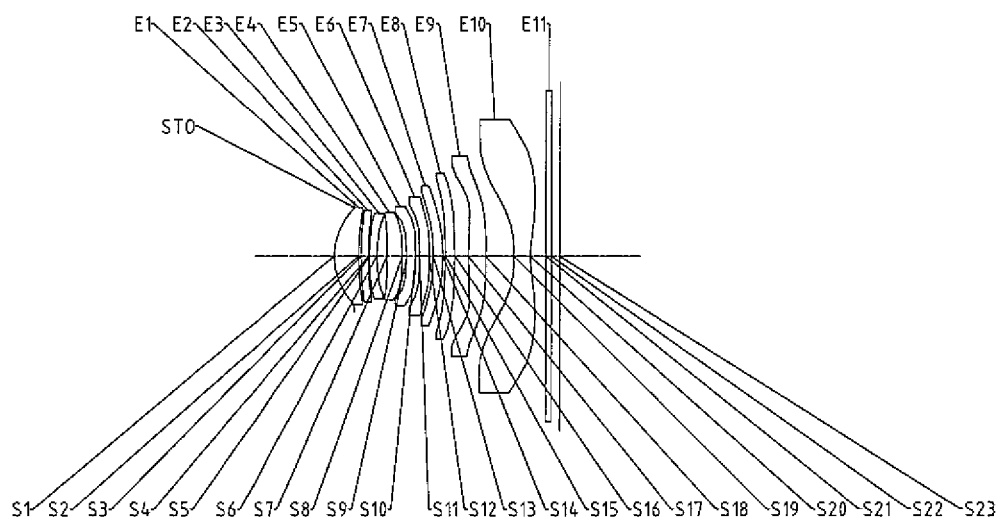
FIG. 11 illustrates a structure diagram of an optical imaging lens assembly according to embodiment 3 of the disclosure.

FIG. 11 is a structure diagram of an optical imaging lens assembly according to embodiment 3 of the disclosure. As shown in FIG. 11, the optical imaging lens assembly sequentially includes, from an object-side surface to an image-side surface, a diaphragm STO, a first lens E1, a second lens E2, a third lens E3, a fourth lens E4, a fifth lens E5, a sixth lens E6, a seventh lens E7, an eighth lens E8, a ninth lens E9, a tenth lens E10, an optical filter E11 and an imaging surface S23.

The first lens E1 has positive refractive power, an object-side surface S1 thereof is a convex surface, while an image-side surface S2 is a concave surface. The second lens E2 has negative refractive power, an object-side surface S3 thereof is a convex surface, while an image-side surface S4 is a concave surface. The third lens E3 has negative refractive power, an object-side surface S5 thereof is a convex surface, while an image-side surface S6 is a concave surface. The fourth lens E4 has positive refractive power, an object-side surface S7 thereof is a concave surface, while an image-side surface S8 is a convex surface. The fifth lens E5 has negative refractive power, an object-side surface S9 thereof is a concave surface, while an image-side surface S10 is a convex surface. The sixth lens E6 has positive refractive power, an object-side surface S11 thereof is a convex surface, while an image-side surface S12 is a convex surface. The seventh lens E7 has positive refractive power, an object-side surface S13 thereof is a concave surface, while an image-side surface S14 is a convex surface. The eighth lens E8 has negative refractive power, an object-side surface S15 thereof is a concave surface, while an image-side surface S16 is a convex surface. The ninth lens E9 has positive refractive power, an object-side surface S17 thereof is a convex surface, while an image-side surface S18 is a convex surface. The tenth lens E10 has negative refractive power, an object-side surface S19 thereof is a concave surface, while an image-side surface S20 is a concave surface. The optical filter E11 has an object-side surface S21 and an image-side surface S22. Light from an object sequentially passes through each of the surfaces S1 to S22 and is finally imaged on the imaging surface S23.

In embodiment 3 of the disclosure, explanations about parameters of each relational expression are the same as those in embodiment 1, and numerical values of each relational expression are listed in the following Table 6.

TABLE 6

Embodiment 3

| | | | |
|---|---|---|---|
| f(mm) | 7.29 | TTL(mm) | 8.51 |
| ImgH(mm) | 6.25 | TTL/ImgH | 1.36 |
| f*tan(½FOV) (mm) | 6.22 | (f1 + f9)/f4 | 1.19 |
| f3/(f5 + f10) | 1.20 | R11/f6 | 0.72 |
| FOV(°) | 80.9 | (R8 + R9)/R10 | 0.36 |
| (CT3 + T34)/CT4 | 1.16 | CT9/CT10 | 1.08 |
| DT11/DT41 | 1.21 | f123/(CT1 + CT2 + CT3) | 5.44 |
| SAG42/SAG32 | −1.29 | SAG51/SAG52 | 1.12 |

Table 7 shows basic parameters of the optical imaging lens of embodiment 3 of the application, and units of the radius of curvature, the thickness and the focal length are all millimeter.

TABLE 7

| Surface number | Surface type | Radius of curvature | Thickness | Focal length | Refractive index | Abbe number | Conic coefficient |
|---|---|---|---|---|---|---|---|
| OBJ | Spherical | Infinite | Infinite | | | | |
| STO | Spherical | Infinite | −0.7533 | | | | |
| S1 | Aspherical | 2.5811 | 0.9135 | 6.23 | 1.55 | 56.1 | −1.2986 |
| S2 | Aspherical | 9.3732 | 0.0950 | | | | −2.4344 |
| S3 | Aspherical | 19.4470 | 0.2800 | −215.32 | 1.67 | 20.4 | 90.0000 |
| S4 | Aspherical | 17.0254 | 0.0400 | | | | 79.7457 |
| S5 | Aspherical | 7.8811 | 0.2800 | −22.57 | 1.68 | 19.2 | 7.1151 |
| S6 | Aspherical | 5.1260 | 0.3842 | | | | −2.0438 |
| S7 | Aspherical | −200.0000 | 0.5717 | 16.41 | 1.55 | 56.1 | 95.7783 |
| S8 | Aspherical | −8.5813 | 0.1812 | | | | −0.4811 |
| S9 | Aspherical | −7.5375 | 0.3400 | −13.63 | 1.67 | 20.4 | −4.4111 |
| S10 | Aspherical | −45.2579 | 0.1532 | | | | 23.3314 |
| S11 | Aspherical | 37.1016 | 0.3600 | 51.52 | 1.65 | 23.5 | 90.0000 |
| S12 | Aspherical | −310.4879 | 0.1500 | | | | 90.0000 |
| S13 | Aspherical | −6.6981 | 0.3600 | 62.03 | 1.65 | 23.5 | 2.7576 |
| S14 | Aspherical | −5.8563 | 0.1003 | | | | −2.7978 |
| S15 | Aspherical | −19.4739 | 0.3600 | −247.97 | 1.65 | 23.5 | 33.3796 |
| S16 | Aspherical | −22.3415 | 0.4863 | | | | 42.0415 |
| S17 | Aspherical | 8.4033 | 0.6637 | 13.33 | 1.55 | 56.1 | 3.8905 |
| S18 | Aspherical | −52.7083 | 1.0581 | | | | 50.9911 |
| S19 | Aspherical | −17.0998 | 0.6165 | −5.24 | 1.54 | 55.7 | 4.3764 |
| S20 | Aspherical | 3.4078 | 0.5849 | | | | −12.1781 |
| S21 | Spherical | Infinite | 0.2100 | | 1.52 | 64.2 | |
| S22 | Spherical | Infinite | 0.3246 | | | | |
| S23 | Spherical | Infinite | | | | | |

The following Table 8 shows higher-order coefficients A4, A6, A8, A10, A12, A14, A16, A18 and A20 applied to each of the aspherical mirror surfaces S1-S20 of the aspherical lenses in embodiment 3 of the disclosure.

TABLE 8

| Surface number | A4 | A6 | A8 | A10 | A12 |
|---|---|---|---|---|---|
| S1 | 9.9798E−03 | 2.6121E−04 | 8.1962E−04 | −9.2595E−04 | 6.9714E−04 |
| S2 | −6.1756E−03 | 3.3297E−03 | −1.9820E−03 | 2.4248E−03 | −1.9500E−03 |
| S3 | 4.9291E−04 | 4.3174E−03 | −7.1060E−03 | 1.0126E−02 | −9.2253E−03 |
| S4 | 1.0676E−02 | −6.8436E−03 | −5.8306E−03 | 2.1792E−02 | −2.7396E−02 |
| S5 | −8.3562E−03 | −3.0350E−03 | −6.9858E−03 | 2.6953E−02 | −3.3392E−02 |
| S6 | −7.9104E−03 | 2.0348E−03 | 5.0613E−03 | −7.9156E−03 | 1.0447E−02 |
| S7 | −9.0204E−03 | −2.6050E−03 | −2.1424E−03 | 4.0425E−03 | −4.6397E−03 |
| S8 | −7.4379E−03 | −1.3827E−02 | 1.2067E−02 | −1.1380E−02 | 7.7049E−03 |
| S9 | −1.6084E−02 | −2.2287E−02 | 2.0964E−02 | −1.9304E−02 | 1.4038E−02 |
| S10 | −2.5900E−02 | −6.2841E−04 | −1.0620E−02 | 1.6191E−02 | −1.3492E−02 |

TABLE 8-continued

| | | | | | |
|---|---|---|---|---|---|
| S11 | −4.9834E−02 | 2.5446E−02 | −3.3643E−02 | 3.1803E−02 | −2.0592E−02 |
| S12 | −4.1278E−02 | 1.8462E−02 | −1.6568E−02 | 1.1829E−02 | −5.6449E−03 |
| S13 | 0.0000E+00 | 0.0000E+00 | 0.0000E+00 | 0.0000E+00 | 0.0000E+00 |
| S14 | 4.6375E−03 | −1.0240E−02 | 7.9726E−03 | −2.7243E−03 | 4.1075E−04 |
| S15 | 7.7683E−03 | −1.4984E−02 | 9.5882E−03 | −3.1633E−03 | 5.9379E−04 |
| S16 | 3.2994E−03 | −6.6244E−03 | 3.7988E−03 | −1.1235E−03 | 1.8523E−04 |
| S17 | −1.4299E−02 | −9.8837E−04 | −1.2412E−04 | 3.6876E−04 | −1.6308E−04 |
| S18 | −5.3815E−03 | −1.9596E−04 | −6.0656E−04 | 3.0416E−04 | −6.1220E−05 |
| S19 | −5.7676E−02 | 2.0790E−02 | −5.7361E−03 | 1.1228E−03 | −1.4015E−04 |
| S20 | −2.9665E−02 | 1.0522E−02 | −2.8047E−03 | 5.5007E−04 | −7.9354E−05 |

| Surface number | A14 | A16 | A18 | A20 |
|---|---|---|---|---|
| S1 | −3.2486E−04 | 8.9407E−05 | −1.3028E−05 | 7.2231E−07 |
| S2 | 8.3438E−04 | −1.5234E−04 | −3.7341E−06 | 3.3583E−06 |
| S3 | 5.0188E−03 | −1.5673E−03 | 2.5101E−04 | −1.5059E−05 |
| S4 | 1.8589E−02 | −7.0926E−03 | 1.4149E−03 | −1.1335E−04 |
| S5 | 2.2681E−02 | −8.7118E−03 | 1.7581E−03 | −1.4361E−04 |
| S6 | −8.4213E−03 | 4.1203E−03 | −1.0914E−03 | 1.2033E−04 |
| S7 | 3.4386E−03 | −1.4957E−03 | 3.8120E−04 | −4.4714E−05 |
| S8 | −3.5907E−03 | 1.1910E−03 | −2.4547E−04 | 2.0581E−05 |
| S9 | −7.7207E−03 | 2.9965E−03 | −7.0759E−04 | 7.3101E−05 |
| S10 | 6.6629E−03 | −1.9458E−03 | 3.1183E−04 | −2.0911E−05 |
| S11 | 8.9523E−03 | −2.6066E−03 | 5.0238E−04 | −5.8604E−05 |
| S12 | 1.7992E−03 | −3.6819E−04 | 4.6388E−05 | −3.3684E−06 |
| S13 | 0.0000E+00 | 0.0000E+00 | 0.0000E+00 | 0.0000E+00 |
| S14 | −3.0876E−06 | −7.7285E−06 | 1.0153E−06 | −4.3428E−08 |
| S15 | −6.4233E−05 | 3.7731E−06 | −9.7151E−08 | 2.8505E−10 |
| S16 | −1.6845E−05 | 7.2123E−07 | −3.1290E−09 | −5.2697E−10 |
| S17 | 4.0061E−05 | −6.4994E−06 | 7.0734E−07 | −4.8774E−08 |
| S18 | 6.5545E−06 | −3.9071E−07 | 1.2233E−08 | −1.5685E−10 |
| S19 | 1.0195E−05 | −2.8080E−07 | −2.0073E−08 | 2.5501E−09 |
| S20 | 8.4350E−06 | −6.6038E−07 | 3.7843E−08 | −1.5636E−09 |

Figure 12:
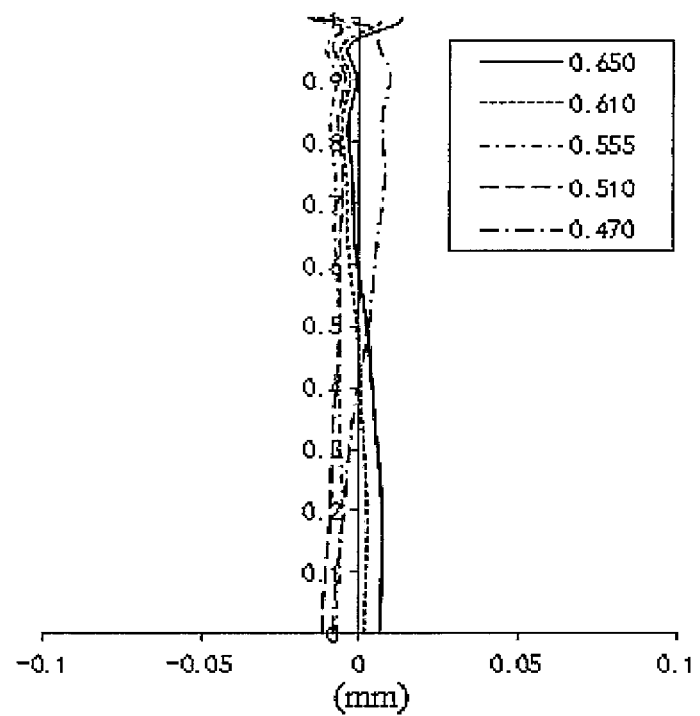
FIG. 12 to FIG. 15 illustrate a longitudinal aberration curve, astigmatism curve, distortion curve and lateral color curve of an optical imaging lens assembly according to embodiment 3 of the disclosure.
Figure 13:
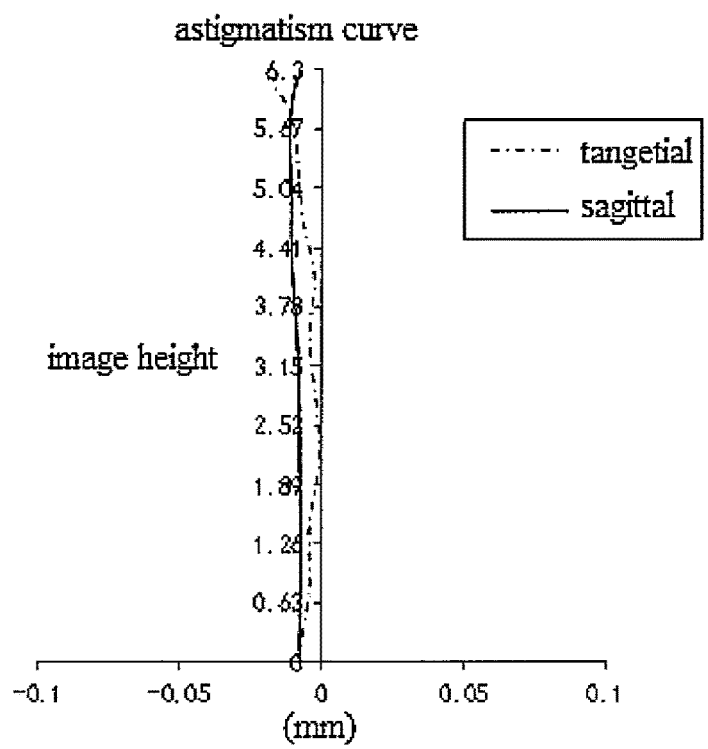
Figure 14:
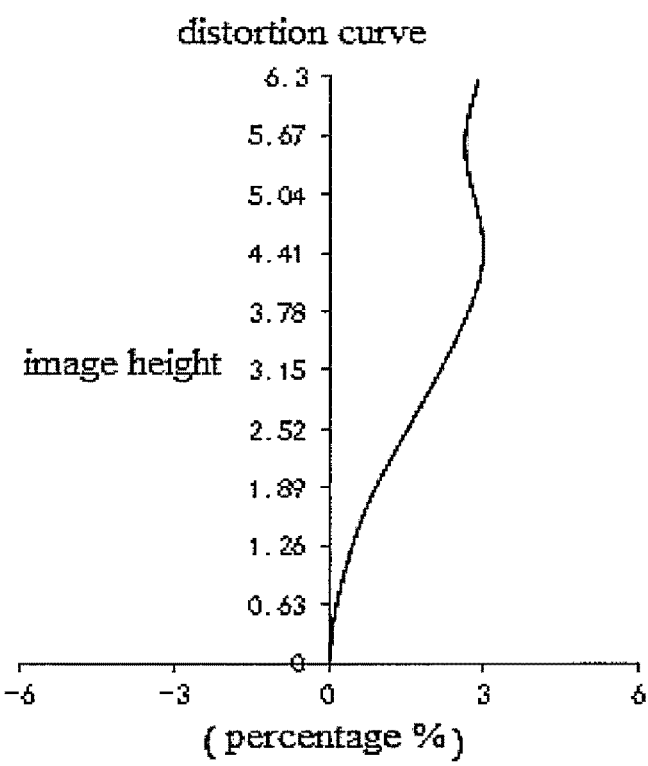
Figure 15:
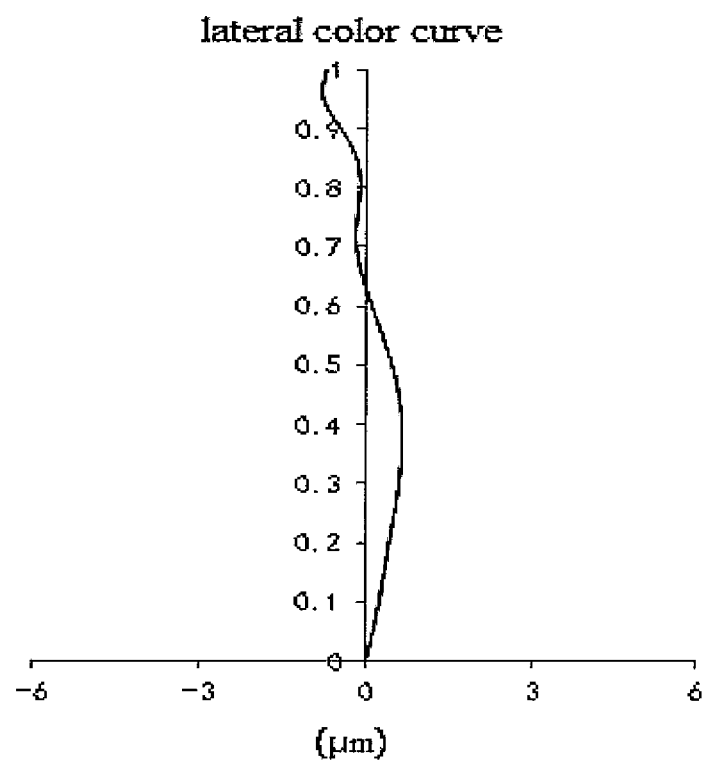

FIG. 12 shows a longitudinal aberration curve of the optical imaging lens assembly according to embodiment 3 of the disclosure to represent deviation of a convergence focal point after light with different wavelengths passes through the lens. FIG. 13 shows an astigmatism curve of the optical imaging lens assembly according to embodiment 3 of the disclosure to represent a tangential image surface curvature and a sagittal image surface curvature. FIG. 14 shows a distortion curve of the optical imaging lens assembly according to embodiment 3 of the disclosure to represent distortion values corresponding to different image heights. FIG. 15 shows a lateral color curve of the optical imaging lens assembly according to embodiment 3 of the disclosure to represent deviation of different image heights on the imaging surface after the light passes through the lens. According to FIG. 12 to FIG. 15, it can be seen that the optical imaging lens assembly provided in embodiment 3 of the disclosure achieves high imaging quality.

Embodiment 4

Figure 16:
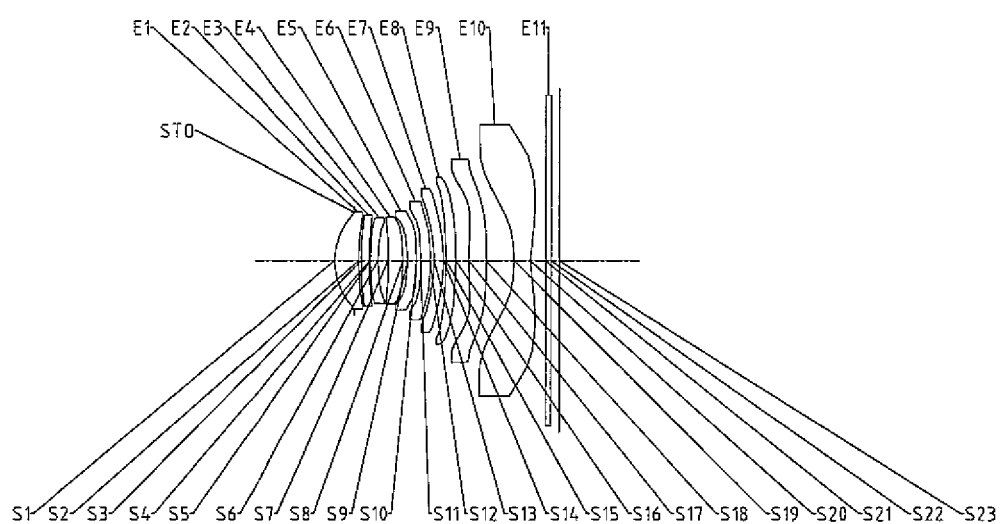
FIG. 16 illustrates a structure diagram of an optical imaging lens assembly according to embodiment 4 of the disclosure.

FIG. 16 illustrates a structure diagram of an optical imaging lens assembly according to embodiment 4 of the disclosure. As shown in FIG. 16, the camera lens component sequentially includes, from an object-side surface to an image-side surface, a diaphragm STO, a first lens E1, a second lens E2, a third lens E3, a fourth lens E4, a fifth lens E5, a sixth lens E6, a seventh lens E7, an eighth lens E8, a ninth lens E9, a tenth lens E10, an optical filter E11 and an imaging surface S23.

The first lens E1 has positive refractive power, an object-side surface S1 thereof is a convex surface, while an image-side surface S2 is a concave surface. The second lens E2 has positive refractive power, an object-side surface S3 thereof is a convex surface, while an image-side surface S4 is a concave surface. The third lens E3 has negative refractive power, an object-side surface S5 thereof is a convex surface, while an image-side surface S6 is a concave surface. The fourth lens E4 has positive refractive power, an object-side surface S7 thereof is a convex surface, while an image-side surface S8 is a convex surface. The fifth lens E5 has negative refractive power, an object-side surface S9 thereof is a concave surface, while an image-side surface S10 is a convex surface. The sixth lens E6 has positive refractive power, an object-side surface S11 thereof is a convex surface, while an image-side surface S12 is a convex surface. The seventh lens E7 has positive refractive power, an object-side surface S13 thereof is a concave surface, while an image-side surface S14 is a convex surface. The eighth lens E8 has positive refractive power, an object-side surface S15 thereof is a concave surface, while an image-side surface S16 is a convex surface. The ninth lens E9 has positive refractive power, an object-side surface S17 thereof is a convex surface, while an image-side surface S18 is a convex surface. The tenth lens E10 has negative refractive power, an object-side surface S19 thereof is a concave surface, while an image-side surface S20 is a concave surface. The optical filter E11 has an object-side surface S21 and an image-side surface S22. Light from an object sequentially passes through each of the surfaces S1 to S22 and is finally imaged on the imaging surface S23.

In embodiment 4 of the disclosure, explanations about parameters of each relational expression are the same as those in embodiment 1, and numerical values of each relational expression are listed in the following Table 9.

TABLE 9

Embodiment 4

| | | | |
|---|---|---|---|
| f(mm) | 7.27 | TTL(mm) | 8.47 |
| ImgH(mm) | 6.25 | TTL/ImgH | 1.36 |
| f*tan(½FOV) (mm) | 6.26 | (f1 + f9)/f4 | 1.31 |
| f3/(f5 + f10) | 0.99 | R11/f6 | 0.82 |
| FOV(°) | 81.5 | (R8 + R9)/R10 | 0.34 |
| (CT3 + T34)/CT4 | 1.16 | CT9/CT10 | 1.08 |
| DT11/DT41 | 1.20 | f123/(CT1 + CT2 + CT3) | 5.39 |
| SAG42/SAG32 | −1.35 | SAG51/SAG52 | 1.12 |

Table 10 shows basic parameters of the optical imaging lens assembly of embodiment 4 of the disclosure, and units of the radius of curvature, the thickness and the focal length are all millimeter.

TABLE 10

| Surface number | Surface type | Radius of curvature | Thickness | Focal length | Refractive index | Abbe number | Conic coefficient |
|---|---|---|---|---|---|---|---|
| OBJ | Spherical | Infinite | Infinite | | | | |
| STO | Spherical | Infinite | −0.7500 | | | | |
| S1 | Aspherical | 2.5659 | 0.9049 | 6.26 | 1.55 | 56.1 | −1.2887 |
| S2 | Aspherical | 8.9971 | 0.0975 | | | | −1.8560 |
| S3 | Aspherical | 18.2682 | 0.3108 | 221.96 | 1.67 | 20.4 | 89.8429 |
| S4 | Aspherical | 20.7036 | 0.0403 | | | | 82.4176 |
| S5 | Aspherical | 8.8480 | 0.2800 | −18.51 | 1.68 | 19.2 | 6.3038 |
| S6 | Aspherical | 5.1212 | 0.3792 | | | | −2.0901 |
| S7 | Aspherical | 252.8101 | 0.5695 | 15.56 | 1.55 | 56.1 | 95.7783 |
| S8 | Aspherical | −8.7839 | 0.1731 | | | | 1.4868 |
| S9 | Aspherical | −7.5677 | 0.3400 | −13.55 | 1.67 | 20.4 | −4.6879 |
| S10 | Aspherical | −47.9018 | 0.1547 | | | | 35.3836 |
| S11 | Aspherical | 36.8355 | 0.3600 | 44.98 | 1.65 | 23.5 | 90.0000 |
| S12 | Aspherical | −134.5105 | 0.1500 | | | | −90.0000 |
| S13 | Aspherical | −6.4221 | 0.3600 | 152.76 | 1.65 | 23.5 | 2.8752 |
| S14 | Aspherical | −6.1606 | 0.1000 | | | | −3.2223 |
| S15 | Aspherical | −23.3352 | 0.3600 | 201.94 | 1.65 | 23.5 | 40.6679 |
| S16 | Aspherical | −19.9022 | 0.4791 | | | | 39.0502 |
| S17 | Aspherical | 8.7038 | 0.6607 | 14.18 | 1.55 | 56.1 | 3.9906 |
| S18 | Aspherical | −67.9684 | 1.0420 | | | | 90.0000 |
| S19 | Aspherical | −17.0664 | 0.6129 | −5.22 | 1.54 | 55.7 | 4.2720 |
| S20 | Aspherical | 3.3968 | 0.5748 | | | | −12.4211 |
| S21 | Spherical | Infinite | 0.2100 | | 1.52 | 64.2 | |
| S22 | Spherical | Infinite | 0.3145 | | | | |
| S23 | Spherical | Infinite | | | | | |

The following Table 11 shows higher-order coefficients A4, A6, A8, A10, A12, A14, A16, A18 and A20 applied to each of the aspherical mirror surfaces S1-S20 of the aspherical lenses in embodiment 4 of the disclosure.

TABLE 11

| Surface number | A4 | A6 | A8 | A10 | A12 |
|---|---|---|---|---|---|
| S1 | 1.0016E−02 | 2.8294E−04 | 7.1752E−04 | −7.3725E−04 | 5.1354E−04 |
| S2 | −5.0041E−03 | 2.1493E−03 | −1.1425E−03 | 1.4817E−03 | −1.1355E−03 |
| S3 | 1.2102E−03 | 2.0615E−03 | −3.9676E−03 | 6.1681E−03 | −5.8989E−03 |
| S4 | 1.1484E−02 | −9.8949E−03 | 5.0819E−03 | 3.3652E−03 | −9.8246E−03 |
| S5 | −9.0966E−03 | −4.4005E−03 | 2.5449E−03 | 9.6687E−03 | −1.6979E−02 |
| S6 | −8.9639E−03 | 2.3744E−03 | 7.4570E−03 | −1.2254E−02 | 1.4435E−02 |
| S7 | −8.6090E−03 | −4.0339E−03 | 2.0513E−03 | −3.5835E−03 | 3.8305E−03 |
| S8 | −7.1309E−03 | −1.4297E−02 | 1.2873E−02 | −1.2538E−02 | 8.3606E−03 |
| S9 | −1.6423E−02 | −2.2431E−02 | 2.4856E−02 | −2.6472E−02 | 2.0860E−02 |
| S10 | −2.7700E−02 | 3.1189E−02 | −1.5085E−02 | 2.0209E−02 | −1.6038E−02 |
| S11 | −5.0937E−02 | 3.1163E−02 | −4.3127E−02 | 4.0609E−02 | −2.5606E−02 |
| S12 | −4.2571E−02 | 2.3154E−02 | −2.3175E−02 | 1.6805E−02 | −7.9175E−03 |
| S13 | 0.0000E+00 | 0.0000E+00 | 0.0000E+00 | 0.0000E+00 | 0.0000E+00 |
| S14 | 5.3577E−03 | −1.0404E−02 | 7.4107E−03 | −2.2005E−03 | 2.0580E−04 |
| S15 | 5.1320E−03 | −9.8737E−03 | 4.3153E−03 | −4.5431E−04 | −1.9447E−04 |
| S16 | 1.5620E−03 | −2.7837E−03 | 6.2915E−04 | 2.0219E−04 | −1.3252E−04 |
| S17 | −1.4309E−02 | −5.5225E−04 | −4.6692E−04 | 5.4481E−04 | −2.2585E−04 |
| S18 | −5.2383E−03 | −3.8588E−04 | −5.0813E−04 | 2.7831E−04 | −5.7360E−05 |
| S19 | −5.8475E−02 | 2.1733E−02 | −6.1692E−03 | 1.2350E−03 | −1.5884E−04 |
| S20 | −3.0443E−02 | 1.1188E−02 | −3.0677E−03 | 6.1503E−04 | −9.0342E−05 |

TABLE 11-continued

| Surface number | A14 | A16 | A18 | A20 |
|---|---|---|---|---|
| S1 | −2.2398E−04 | 5.7397E−05 | −7.5723E−06 | 3.3455E−07 |
| S2 | 4.1194E−04 | −1.9050E−05 | −2.7516E−05 | 5.1828E−06 |
| S3 | 3.2926E−03 | −1.0287E−03 | 1.5797E−04 | −8.2439E−06 |
| S4 | 8.5758E−03 | −3.7267E−03 | 8.0199E−04 | −6.6692E−05 |
| S5 | 1.3534E−02 | −5.7563E−03 | 1.2518E−03 | −1.0831E−04 |
| S6 | −1.0569E−02 | 4.7998E−03 | −1.2129E−03 | 1.3062E−04 |
| S7 | −2.3953E−03 | 9.4661E−04 | −1.9007E−04 | 1.2434E−05 |
| S8 | −3.7582E−03 | 1.2241E−03 | −2.5789E−04 | 2.2740E−05 |
| S9 | −1.1772E−02 | 4.5222E−03 | −1.0392E−03 | 1.0428E−04 |
| S10 | 7.7088E−03 | −2.2070E−03 | 3.4765E−04 | −2.2975E−05 |
| S11 | 1.0759E−02 | −3.0192E−03 | 5.6040E−04 | −6.3226E−05 |
| S12 | 2.4661E−03 | −4.9582E−04 | 6.1861E−05 | −4.4471E−06 |
| S13 | 0.0000E+00 | 0.0000E+00 | 0.0000E+00 | 0.0000E+00 |
| S14 | 3.9411E−05 | −1.2439E−05 | 1.2604E−06 | −4.7096E−08 |
| S15 | 7.2610E−05 | −1.0330E−05 | 7.0160E−07 | −1.8920E−08 |
| S16 | 2.8710E−05 | −3.1385E−06 | 1.7491E−07 | −3.9660E−09 |
| S17 | 5.5383E−05 | −9.0154E−06 | 9.7833E−07 | −6.7034E−08 |
| S18 | 6.2180E−06 | −3.7429E−07 | 1.1840E−08 | −1.5371E−10 |
| S19 | 1.2331E−05 | −4.5468E−07 | −9.8126E−09 | 2.1110E−09 |
| S20 | 9.7530E−06 | −7.7409E−07 | 4.4909E−08 | −1.8766E−09 |

Figure 17:
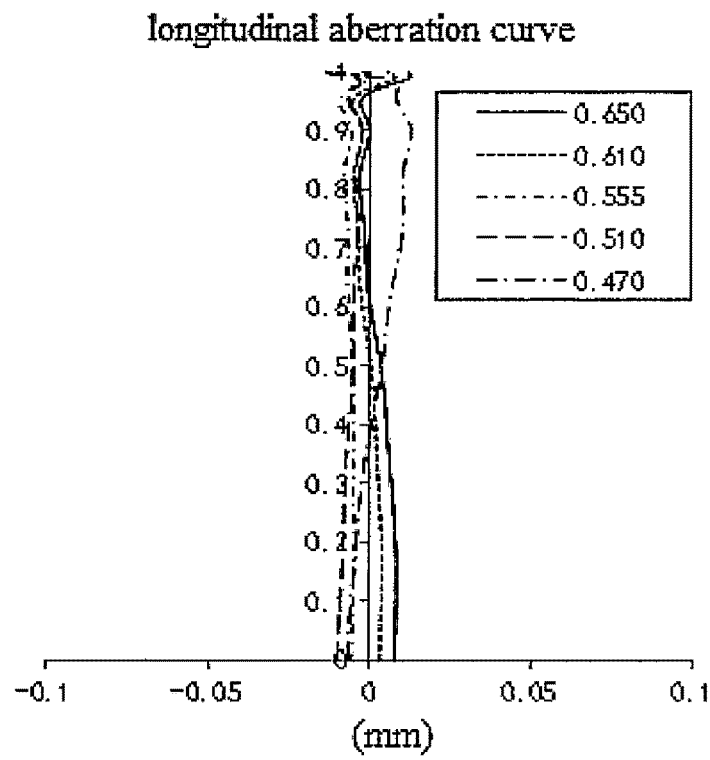
FIG. 17 to FIG. 20 illustrate a longitudinal aberration curve, astigmatism curve, distortion curve and lateral color curve of an optical imaging lens assembly according to embodiment 4 of the disclosure.
Figure 18:
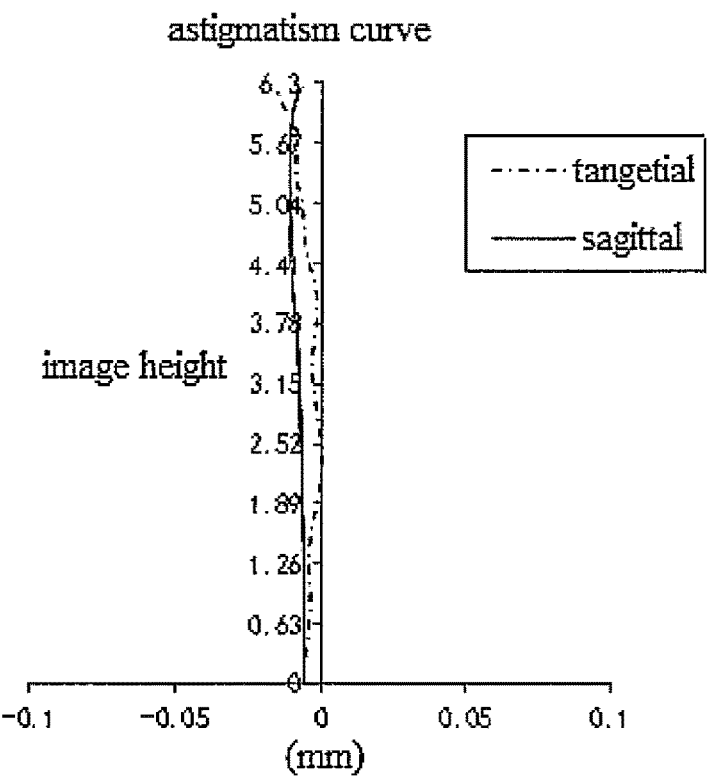
Figure 19:
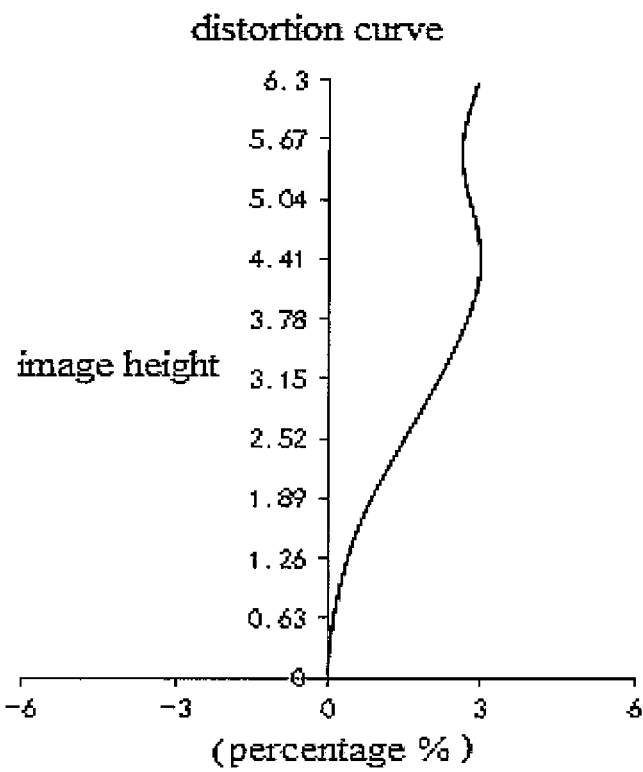
Figure 20:
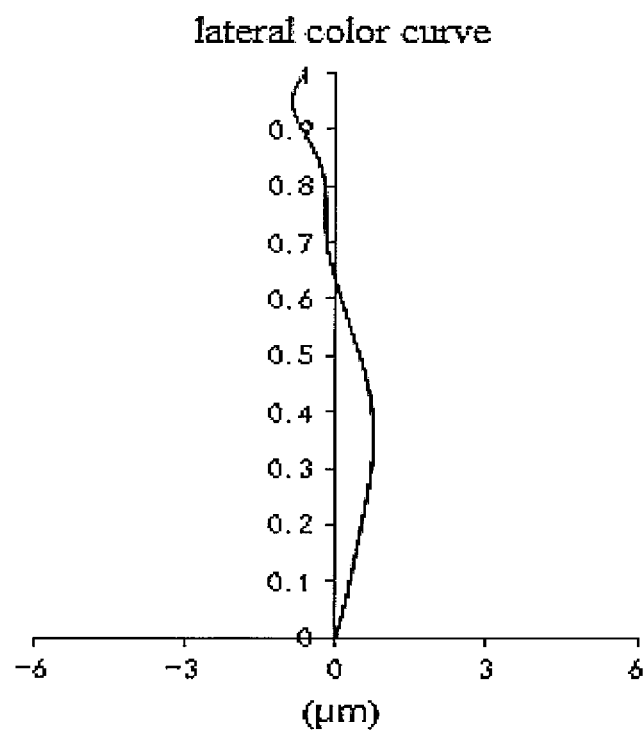

FIG. 17 shows a longitudinal aberration curve of the optical imaging lens assembly according to embodiment 4 of the disclosure to represent deviation of a convergence focal point after light with different wavelengths passes through the lens. FIG. 18 shows an astigmatism curve of the optical imaging lens assembly according to embodiment 4 of the disclosure to represent a tangential image surface curvature and a sagittal image surface curvature. FIG. 19 shows a distortion curve of the optical imaging lens assembly according to embodiment 4 of the disclosure to represent distortion values corresponding to different image heights. FIG. 20 shows a lateral color curve of the optical imaging lens assembly according to embodiment 4 of the disclosure to represent deviation of different image heights on the imaging surface after the light passes through the lens. According to FIG. 17 to FIG. 20, it can be seen that the optical imaging lens assembly provided in embodiment 4 of the disclosure achieves high imaging quality.

Embodiment 5

Figure 21:
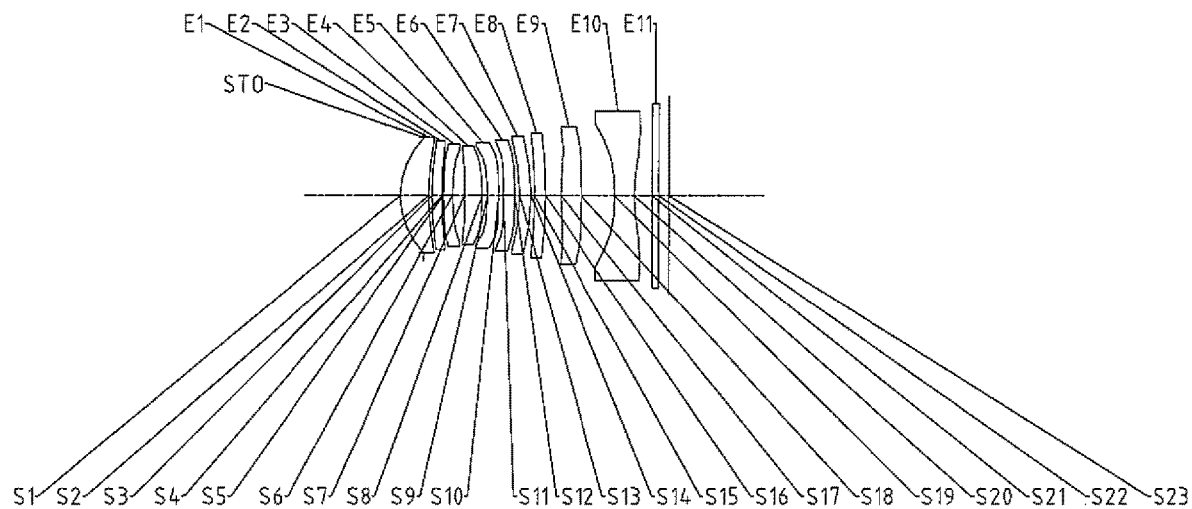
FIG. 21 illustrates a structure diagram of an optical imaging lens assembly according to embodiment 5 of the disclosure.

FIG. 21 illustrates a structure diagram of an optical imaging lens assembly according to embodiment 5 of the disclosure. As shown in FIG. 21, the camera lens component sequentially includes, from an object-side surface to an image-side surface, a diaphragm STO, a first lens E1, a second lens E2, a third lens E3, a fourth lens E4, a fifth lens E5, a sixth lens E6, a seventh lens E7, an eighth lens E8, a ninth lens E9, a tenth lens E10, an optical filter E11 and an imaging surface S23.

The first lens E1 has positive refractive power, an object-side surface S1 thereof is a convex surface, while an image-side surface S2 is a concave surface. The second lens E2 has positive refractive power, an object-side surface S3 thereof is a convex surface, while an image-side surface S4 is a concave surface. The third lens E3 has negative refractive power, an object-side surface S5 thereof is a convex surface, while an image-side surface S6 is a concave surface. The fourth lens E4 has positive refractive power, an object-side surface S7 thereof is a concave surface, while an image-side surface S8 is a convex surface. The fifth lens E5 has negative refractive power, an object-side surface S9 thereof is a concave surface, while an image-side surface S10 is a convex surface. The sixth lens E6 has positive refractive power, an object-side surface S11 thereof is a convex surface, while an image-side surface S12 is a convex surface. The seventh lens E7 has positive refractive power, an object-side surface S13 thereof is a concave surface, while an image-side surface S14 is a convex surface. The eighth lens E8 has positive refractive power, an object-side surface S15 thereof is a concave surface, while an image-side surface S16 is a convex surface. The ninth lens E9 has positive refractive power, an object-side surface S17 thereof is a convex surface, while an image-side surface S18 is a convex surface. The tenth lens E10 has negative refractive power, an object-side surface S19 thereof is a concave surface, while an image-side surface S20 is a concave surface. The optical filter E11 has an object-side surface S21 and an image-side surface S22. Light from an object sequentially passes through each of the surfaces S1 to S22 and is finally imaged on the imaging surface S23.

In embodiment 5 of the disclosure, explanations about parameters of each relational expression are the same as those in embodiment 1, and numerical values of each relational expression are listed in the following Table 12.

TABLE 12

| Embodiment 5 | | | |
|---|---|---|---|
| f(mm) | 7.29 | TTL(mm) | 8.50 |
| ImgH(mm) | 6.25 | TTL/ImgH | 1.36 |
| f*tan(½FOV) (mm) | 6.24 | (f1 + f9)/f4 | 1.28 |
| f3/(f5 + f10) | 1.02 | R11/f6 | 0.84 |
| FOV(°) | 81.2 | (R8 + R9)/R10 | 0.34 |
| (CT3 + T34)/CT4 | 1.20 | CT9/CT10 | 1.07 |
| DT11/DT41 | 1.20 | f123/(CT1 + CT2 + CT3) | 5.33 |
| SAG42/SAG32 | −1.11 | SAG51/SAG52 | 1.25 |

Table 13 shows basic parameters of the camera lens component of embodiment 5 of the disclosure, and units of the radius of curvature, the thickness and the focal length are all millimeter.

TABLE 13

| Surface number | Surface type | Radius of curvature | Thickness | Focal length | Refractive index | Abbe number | Conic coefficient |
|---|---|---|---|---|---|---|---|
| OBJ | Spherical | Infinite | Infinite | | | | |
| STO | Spherical | Infinite | −0.7534 | | | | |
| S1 | Aspherical | 2.5681 | 0.9098 | 6.26 | 1.55 | 56.1 | −1.2854 |
| S2 | Aspherical | 9.0273 | 0.0972 | | | | −2.2244 |
| S3 | Aspherical | 18.3766 | 0.3104 | 228.04 | 1.67 | 20.4 | 89.9769 |
| S4 | Aspherical | 20.7662 | 0.0400 | | | | 82.8348 |
| S5 | Aspherical | 8.8948 | 0.2800 | −19.04 | 1.68 | 19.2 | 6.1763 |
| S6 | Aspherical | 5.1978 | 0.3926 | | | | −2.0642 |
| S7 | Aspherical | −200.0000 | 0.5589 | 15.92 | 1.55 | 56.1 | 95.7783 |
| S8 | Aspherical | −8.3398 | 0.1719 | | | | 1.0210 |
| S9 | Aspherical | −7.4377 | 0.3400 | −13.35 | 1.67 | 20.4 | −4.4633 |
| S10 | Aspherical | −46.4477 | 0.1531 | | | | 36.5593 |
| S11 | Aspherical | 38.1704 | 0.3600 | 45.47 | 1.65 | 23.5 | 90.0000 |
| S12 | Aspherical | −124.8113 | 0.1522 | | | | 90.0000 |
| S13 | Aspherical | −6.4577 | 0.3600 | 145.36 | 1.65 | 23.5 | 2.7051 |
| S14 | Aspherical | −6.1725 | 0.1015 | | | | −3.0592 |
| S15 | Aspherical | −23.5403 | 0.3600 | 200.35 | 1.65 | 23.5 | 42.2529 |
| S16 | Aspherical | −20.0248 | 0.4812 | | | | 38.9180 |
| S17 | Aspherical | 8.6784 | 0.6583 | 14.11 | 1.55 | 56.1 | 3.9985 |
| S18 | Aspherical | −66.5820 | 1.0551 | | | | 82.2359 |
| S19 | Aspherical | −17.2303 | 0.6149 | −5.26 | 1.54 | 55.7 | 4.2098 |
| S20 | Aspherical | 3.4199 | 0.5754 | | | | −12.3010 |
| S21 | Spherical | Infinite | 0.2100 | | 1.52 | 64.2 | |
| S22 | Spherical | Infinite | 0.3151 | | | | |
| S23 | Spherical | Infinite | | | | | |

The following Table 14 shows higher-order coefficients A4, A6, A8, A10, A12, A14, A16, A18 and A20 applied to each of the aspherical mirror surfaces S1-S20 of the aspherical lenses in embodiment 5 of the disclosure.

TABLE 14

| Surface number | A4 | A6 | A8 | A10 | A12 |
|---|---|---|---|---|---|
| S1 | 1.0008E−02 | 2.8406E−04 | 8.2885E−04 | −9.9149E−04 | 7.8517E−04 |
| S2 | −4.7193E−03 | 1.3077E−03 | −2.8285E−04 | 1.1896E−03 | −1.3400E−03 |
| S3 | 1.4873E−03 | 1.0066E−03 | −3.0115E−03 | 6.3725E−03 | −6.8981E−03 |
| S4 | 1.2162E−02 | −1.3021E−02 | 9.9048E−03 | −2.9384E−04 | −8.6741E−03 |
| S5 | −8.1763E−03 | −7.1655E−03 | 6.3183E−03 | 6.9463E−03 | −1.6250E−02 |
| S6 | −8.5996E−03 | 2.0741E−03 | 7.1036E−03 | −1.1002E−02 | 1.2698E−02 |
| S7 | −8.8364E−03 | −3.4145E−03 | −1.8910E−04 | 8.2207E−04 | −1.2674E−03 |
| S8 | −7.0165E−03 | −1.3682E−02 | 9.8950E−03 | −7.5260E−03 | 3.9132E−03 |
| S9 | −1.6132E−02 | −2.1540E−02 | 1.9515E−02 | −1.7486E−02 | 1.2878E−02 |
| S10 | −2.7294E−02 | 3.2352E−03 | −1.7026E−02 | 2.2743E−02 | −1.7550E−02 |
| S11 | −5.1006E−02 | 3.1606E−02 | −4.3300E−02 | 3.9700E−02 | −2.4309E−02 |
| S12 | −4.2822E−02 | 2.3511E−02 | −2.3048E−02 | 1.6324E−02 | −7.5977E−03 |
| S13 | 0.0000E+00 | 0.0000E+00 | 0.0000E+00 | 0.0000E+00 | 0.0000E+00 |
| S14 | 5.5764E−03 | −1.1179E−02 | 8.2641E−03 | −2.6738E−03 | 3.5138E−04 |
| S15 | 5.9238E−03 | −1.2127E−02 | 6.5254E−03 | −1.5644E−03 | 1.2540E−04 |
| S16 | 2.5276E−03 | −4.6327E−03 | 2.0240E−03 | −3.5603E−04 | −2.0619E−06 |
| S17 | −1.3911E−02 | −1.0528E−03 | −7.4276E−05 | 3.4655E−04 | −1.5775E−04 |
| S18 | −5.4862E−03 | −2.0998E−04 | −5.6379E−04 | 2.8942E−04 | −5.8953E−05 |
| S19 | −5.7737E−02 | 2.1049E−02 | −5.8323E−03 | 1.1346E−03 | −1.3956E−04 |
| S20 | −2.9923E−02 | 1.0778E−02 | −2.8991E−03 | 5.7134E−04 | −8.2730E−05 |

| Surface number | A14 | A16 | A18 | A20 |
|---|---|---|---|---|
| S1 | −3.8351E−04 | 1.1060E−04 | −1.7048E−05 | 1.0379E−06 |
| S2 | 6.7322E−04 | −1.3657E−04 | −2.3437E−06 | 3.0519E−06 |
| S3 | 4.1130E−03 | −1.3568E−03 | 2.2439E−04 | −1.3698E−05 |
| S4 | 8.8347E−03 | −4.0546E−03 | 8.9894E−04 | −7.6633E−05 |
| S5 | 1.3860E−02 | −6.0644E−03 | 1.3386E−03 | −1.1697E−04 |
| S6 | −9.1907E−03 | 4.1579E−03 | −1.0505E−03 | 1.1340E−04 |
| S7 | 1.2409E−03 | −6.1946E−04 | 1.8257E−04 | −2.5199E−05 |
| S8 | −1.3578E−03 | 4.1809E−04 | −1.0245E−04 | 9.7213E−06 |
| S9 | −7.4676E−03 | 3.0811E−03 | −7.6279E−04 | 8.1259E−05 |
| S10 | 8.2038E−03 | −2.2981E−03 | 3.5632E−04 | −2.3298E−05 |
| S11 | 9.9538E−03 | −2.7317E−03 | 4.9794E−04 | −5.5490E−05 |
| S12 | 2.3747E−03 | −4.8684E−04 | 6.2919E−05 | −4.7510E−06 |
| S13 | 0.0000E+00 | 0.0000E+00 | 0.0000E+00 | 0.0000E+00 |
| S14 | 1.3947E−05 | −9.9952E−06 | 1.1475E−06 | −4.5449E−08 |
| S15 | 1.7465E−05 | −4.6931E−06 | 3.8579E−07 | −1.1431E−08 |
| S16 | 1.0335E−05 | −1.6027E−06 | 1.0481E−07 | −2.6218E−09 |

TABLE 14-continued

| | | | | |
|---|---|---|---|---|
| S17 | 3.9386E−05 | −6.4769E−06 | 7.1300E−07 | −4.9627E−08 |
| S18 | 6.3799E−06 | −3.8493E−07 | 1.2235E−08 | −1.5992E−10 |
| S19 | 9.8276E−06 | −2.2905E−07 | −2.4075E−08 | 2.7388E−09 |
| S20 | 8.8289E−06 | −6.9434E−07 | 3.9986E−08 | −1.6606E−09 |

Figure 22:
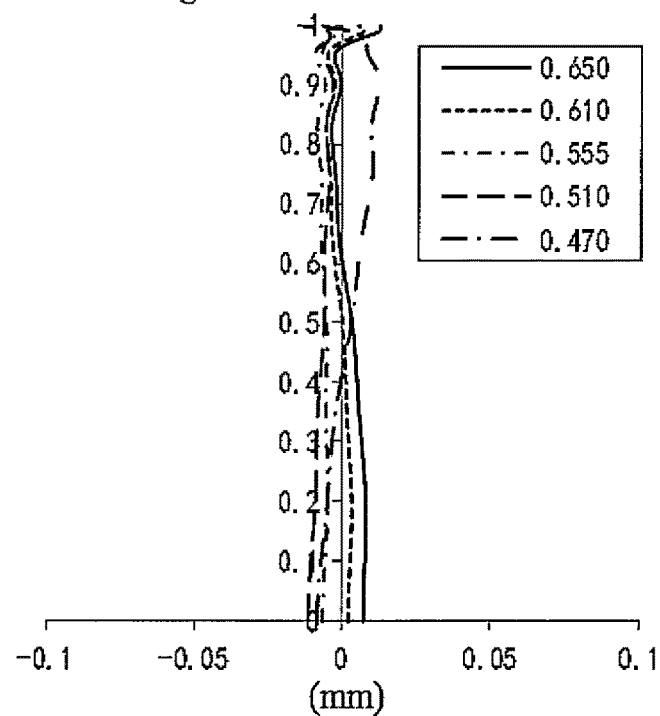
FIG. 22 to FIG. 25 illustrate a longitudinal aberration curve, astigmatism curve, distortion curve and lateral color curve of an optical imaging lens assembly according to embodiment 5 of the disclosure.
Figure 23:
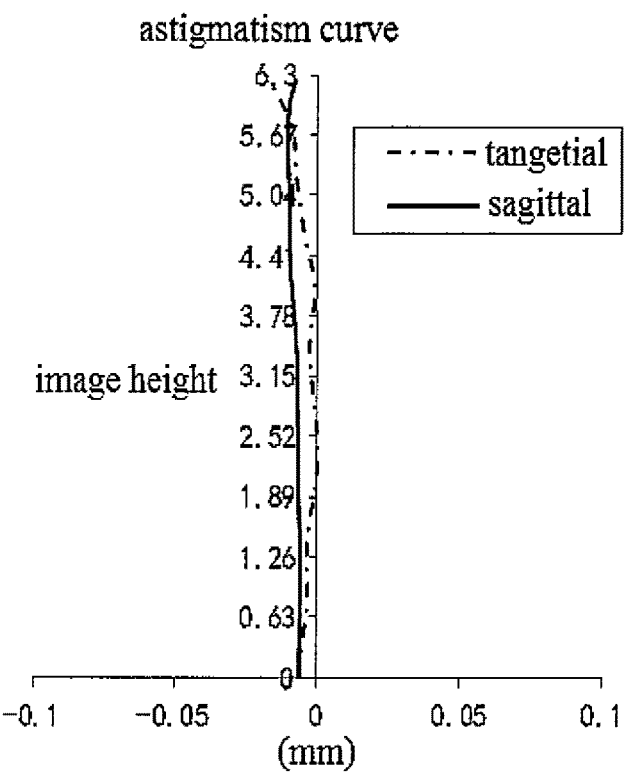
Figure 24:
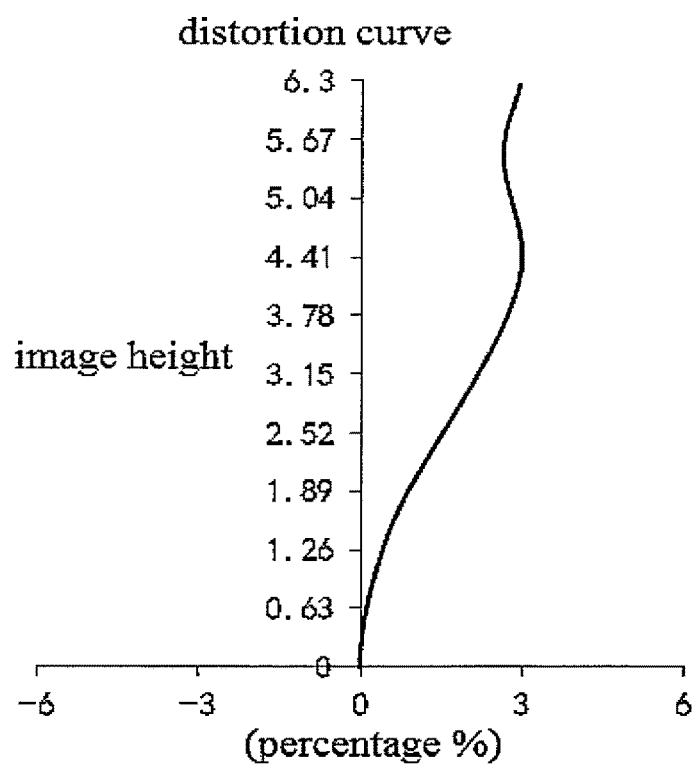
Figure 25:
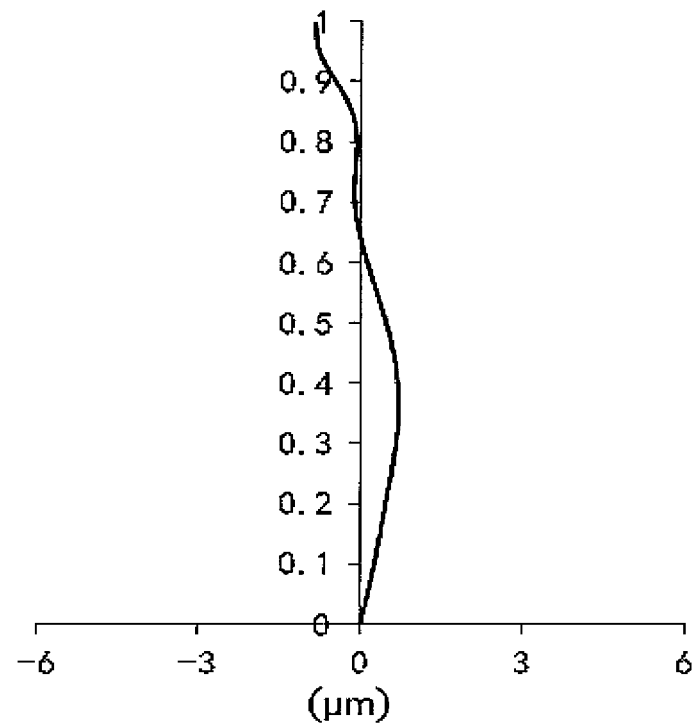

FIG. 22 shows a longitudinal aberration curve of the optical imaging lens assembly according to embodiment 5 of the disclosure to represent deviation of a convergence focal point after light with different wavelengths passes through the lens. FIG. 23 shows an astigmatism curve of the optical imaging lens assembly according to embodiment 5 of the disclosure to represent a tangential image surface curvature and a sagittal image surface curvature. FIG. 24 shows a distortion curve of the optical imaging lens assembly according to embodiment 5 of the disclosure to represent distortion values corresponding to different image heights. FIG. 25 shows a lateral color curve of the optical imaging lens assembly according to embodiment 5 of the disclosure to represent deviation of different image heights on the imaging surface after the light passes through the lens. According to FIG. 22 to FIG. 25, it can be seen that the optical imaging lens assembly provided in embodiment 5 of the disclosure achieves high imaging quality.

Embodiment 6

Figure 26:
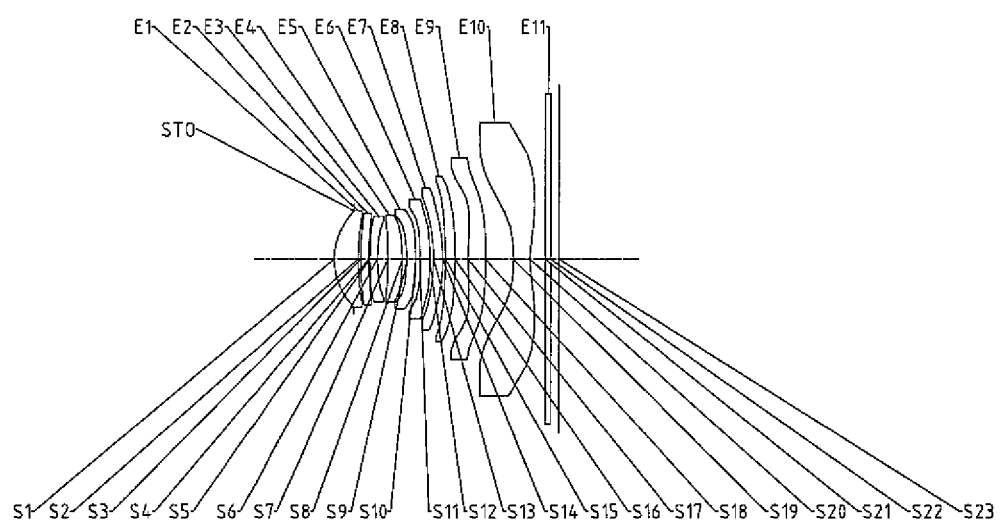
FIG. 26 illustrates a structure diagram of an optical imaging lens assembly according to embodiment 6 of the disclosure.

FIG. 26 illustrates a structure diagram of an optical imaging lens assembly according to embodiment 6 of the disclosure. As shown in FIG. 26, the camera lens component sequentially includes, from an object-side surface to an image-side surface, a diaphragm STO, a first lens E1, a second lens E2, a third lens E3, a fourth lens E4, a fifth lens E5, a sixth lens E6, a seventh lens E7, an eighth lens E8, a ninth lens E9, a tenth lens E10, an optical filter E11 and an imaging surface S23.

The first lens E1 has positive refractive power, an object-side surface S1 thereof is a convex surface, while an image-side surface S2 is a concave surface. The second lens E2 has positive refractive power, an object-side surface S3 thereof is a convex surface, while an image-side surface S4 is a concave surface. The third lens E3 has negative refractive power, an object-side surface S5 thereof is a convex surface, while an image-side surface S6 is a concave surface. The fourth lens E4 has positive refractive power, an object-side surface S7 thereof is a concave surface, while an image-side surface S8 is a convex surface. The fifth lens E5 has negative refractive power, an object-side surface S9 thereof is a concave surface, while an image-side surface S10 is a convex surface. The sixth lens E6 has positive refractive power, an object-side surface S11 thereof is a convex surface, while an image-side surface S12 is a concave surface. The seventh lens E7 has positive refractive power, an object-side surface S13 thereof is a concave surface, while an image-side surface S14 is a convex surface. The eighth lens E8 has positive refractive power, an object-side surface S15 thereof is a concave surface, while an image-side surface S16 is a convex surface. The ninth lens E9 has positive refractive power, an object-side surface S17 thereof is a convex surface, while an image-side surface S18 is a convex surface. The tenth lens E10 has negative refractive power, an object-side surface S19 thereof is a concave surface, while an image-side surface S20 is a concave surface. The optical filter E11 has an object-side surface S21 and an image-side surface S22. Light from an object sequentially passes through each of the surfaces S1 to S22 and is finally imaged on the imaging surface S23.

In embodiment 6 of the disclosure, explanations about parameters of each relational expression are the same as those in embodiment 1, and numerical values of each relational expression are listed in the following Table 15.

TABLE 15

| Embodiment 6 | | | |
|---|---|---|---|
| f(mm) | 7.29 | TTL(mm) | 8.50 |
| ImgH(mm) | 6.25 | TTL/ImgH | 1.36 |
| f*tan(½FOV) (mm) | 6.21 | (f1 + f9)/f4 | 1.26 |
| f3/(f5 + f10) | 1.01 | R11/f6 | 0.51 |
| FOV(°) | 80.9 | (R8 + R9)/R10 | 0.30 |
| (CT3 + T34)/CT4 | 1.21 | CT9/CT10 | 1.07 |
| DT11/DT41 | 1.20 | f123/(CT1 + CT2 + CT3) | 5.34 |
| SAG42/SAG32 | −1.37 | SAG51/SAG52 | 1.13 |

Table 16 shows basic parameters of the optical imaging lens of embodiment 6 of the disclosure, and units of the radius of curvature, the thickness and the focal length are all millimeter.

TABLE 16

| Surface number | Surface type | Radius of curvature | Thickness | Focal length | Refractive index | Abbe number | Conic coefficient |
|---|---|---|---|---|---|---|---|
| OBJ | Spherical | Infinite | Infinite | | | | |
| STO | Spherical | Infinite | −0.7522 | | | | |
| S1 | Aspherical | 2.5702 | 0.9091 | 6.26 | 1.55 | 56.1 | −1.2877 |
| S2 | Aspherical | 9.0566 | 0.0977 | | | | −2.2070 |
| S3 | Aspherical | 18.4751 | 0.3098 | 234.68 | 1.67 | 20.4 | 89.9947 |
| S4 | Aspherical | 20.8125 | 0.0402 | | | | 82.8955 |
| S5 | Aspherical | 8.9203 | 0.2800 | −19.04 | 1.68 | 19.2 | 6.2238 |
| S6 | Aspherical | 5.2066 | 0.3916 | | | | −2.1161 |
| S7 | Aspherical | −200.0000 | 0.5557 | 16.16 | 1.55 | 56.1 | 95.7783 |
| S8 | Aspherical | −8.4574 | 0.1731 | | | | 0.6699 |
| S9 | Aspherical | −7.6996 | 0.3411 | −13.56 | 1.67 | 20.4 | −4.5080 |
| S10 | Aspherical | −53.2393 | 0.1513 | | | | −18.4398 |
| S11 | Aspherical | 30.4481 | 0.3600 | 59.30 | 1.65 | 23.5 | 87.5914 |
| S12 | Aspherical | 150.0000 | 0.1500 | | | | −62.7085 |
| S13 | Aspherical | −6.7651 | 0.3600 | 87.21 | 1.65 | 23.5 | 2.6870 |

TABLE 16-continued

| Surface number | Surface type | Radius of curvature | Thickness | Focal length | Refractive index | Abbe number | Conic coefficient |
|---|---|---|---|---|---|---|---|
| S14 | Aspherical | −6.1631 | 0.1002 | | | | −3.0859 |
| S15 | Aspherical | −23.4056 | 0.3600 | 211.16 | 1.65 | 23.5 | 42.2092 |
| S16 | Aspherical | −20.0865 | 0.4783 | | | | 38.9016 |
| S17 | Aspherical | 8.6594 | 0.6638 | 14.04 | 1.55 | 56.1 | 4.0085 |
| S18 | Aspherical | −65.0405 | 1.0613 | | | | 86.5581 |
| S19 | Aspherical | −17.2254 | 0.6190 | −5.27 | 1.54 | 55.7 | 4.2045 |
| S20 | Aspherical | 3.4250 | 0.5740 | | | | −12.2931 |
| S21 | Spherical | Infinite | 0.2100 | | 1.52 | 64.2 | |
| S22 | Spherical | Infinite | 0.3135 | | | | |
| S23 | Spherical | Infinite | | | | | |

The following Table 17 shows higher-order coefficients A4, A6, A8, A10, A12, A14, A16, A18 and A20 applied to each of the aspherical mirror surfaces S1-S20 of the aspherical lenses in embodiment 6 of the disclosure.

TABLE 17

| Surface number | A4 | A6 | A8 | A10 | A12 |
|---|---|---|---|---|---|
| S1 | 9.9204E−03 | 5.0339E−04 | 3.7956E−04 | −4.5816E−04 | 3.9451E−04 |
| S2 | −4.7725E−03 | 8.5339E−04 | 8.8318E−04 | −4.1343E−04 | 9.5521E−05 |
| S3 | 1.3626E−03 | 8.4455E−04 | −2.3314E−03 | 5.2057E−03 | −5.6045E−03 |
| S4 | 1.1858E−02 | −1.1900E−02 | 7.2872E−03 | 3.0804E−03 | −1.1027E−02 |
| S5 | −8.5948E−03 | −5.2531E−03 | 2.0098E−03 | 1.2431E−02 | −2.0314E−02 |
| S6 | −8.7439E−03 | 2.7786E−03 | 5.7936E−03 | −9.7174E−03 | 1.2038E−02 |
| S7 | −8.3165E−03 | −5.0089E−03 | 3.7157E−03 | −4.9415E−03 | 4.0744E−03 |
| S8 | −7.0062E−03 | −1.4001E−02 | 1.0469E−02 | −7.7003E−03 | 3.6409E−03 |
| S9 | −1.6101E−02 | −2.2083E−02 | 2.0406E−02 | −1.7811E−02 | 1.2492E−02 |
| S10 | −2.6795E−02 | 1.5474E−03 | −1.4334E−02 | 2.0358E−02 | −1.6225E−02 |
| S11 | −5.0301E−02 | 2.8084E−02 | −3.7642E−02 | 3.4546E−02 | −2.1078E−02 |
| S12 | −4.2448E−02 | 2.2309E−02 | −2.1806E−02 | 1.5829E−02 | −7.5763E−03 |
| S13 | 0.0000E+00 | 0.0000E+00 | 0.0000E+00 | 0.0000E+00 | 0.0000E+00 |
| S14 | 5.5440E−03 | −1.1757E−02 | 9.1652E−03 | −3.2650E−03 | 5.6645E−04 |
| S15 | 6.6742E−03 | −1.3919E−02 | 8.2370E−03 | −2.4223E−03 | 3.7494E−04 |
| S16 | 2.9731E−03 | −5.7112E−03 | 2.8886E−03 | −7.1034E−04 | 8.1703E−05 |
| S17 | −1.3828E−02 | −1.4172E−03 | 2.2674E−04 | 2.1512E−04 | −1.2117E−04 |
| S18 | −5.3772E−03 | −4.1344E−04 | −4.2079E−04 | 2.4226E−04 | −5.0328E−05 |
| S19 | −5.7263E−02 | 2.0608E−02 | −5.6281E−03 | 1.0799E−03 | −1.3047E−04 |
| S20 | −2.9665E−02 | 1.0566E−02 | −2.8107E−03 | 5.4898E−04 | −7.9015E−05 |

| Surface number | A14 | A16 | A18 | A20 |
|---|---|---|---|---|
| S1 | −2.0497E−04 | 6.1134E−05 | −9.4689E−06 | 5.4798E−07 |
| S2 | −1.3860E−04 | 1.3729E−04 | −5.2210E−05 | 6.8054E−06 |
| S3 | 3.2422E−03 | −1.0203E−03 | 1.5609E−04 | −8.0691E−06 |
| S4 | 9.6629E−03 | −4.1515E−03 | 8.8234E−04 | −7.2735E−05 |
| S5 | 1.5576E−02 | −6.4376E−03 | 1.3681E−03 | −1.1617E−04 |
| S6 | −9.1150E−03 | 4.2434E−03 | −1.0897E−03 | 1.1849E−04 |
| S7 | −1.9325E−03 | 5.5533E−04 | −6.4177E−05 | −2.7186E−06 |
| S8 | −1.0444E−03 | 2.7361E−04 | −6.9953E−05 | 6.8365E−06 |
| S9 | −6.9583E−03 | 2.8215E−03 | −6.9792E−04 | 7.4712E−05 |
| S10 | 7.7150E−03 | −2.1782E−03 | 3.3866E−04 | −2.2143E−05 |
| S11 | 8.4680E−03 | −2.2430E−03 | 3.9203E−04 | −4.2258E−05 |
| S12 | 2.4209E−03 | −5.0258E−04 | 6.5028E−05 | −4.8441E−06 |
| S13 | 0.0000E+00 | 0.0000E+00 | 0.0000E+00 | 0.0000E+00 |
| S14 | −3.2319E−05 | −4.1922E−06 | 7.5891E−07 | −3.4830E−08 |
| S15 | −2.6322E−05 | −1.0936E−07 | 1.2156E−07 | −4.9642E−09 |
| S16 | −1.5268E−06 | −6.1207E−07 | 5.9948E−08 | −1.7747E−09 |
| S17 | 3.2345E−05 | −5.5211E−06 | 6.2365E−07 | −4.4200E−08 |
| S18 | 5.4482E−06 | −3.2568E−07 | 1.0180E−08 | −1.2992E−10 |
| S19 | 8.8569E−06 | −1.6246E−07 | −2.6811E−08 | 2.7848E−09 |
| S20 | 8.4050E−06 | −6.6041E−07 | 3.8067E−08 | −1.5846E−09 |

Figure 27:
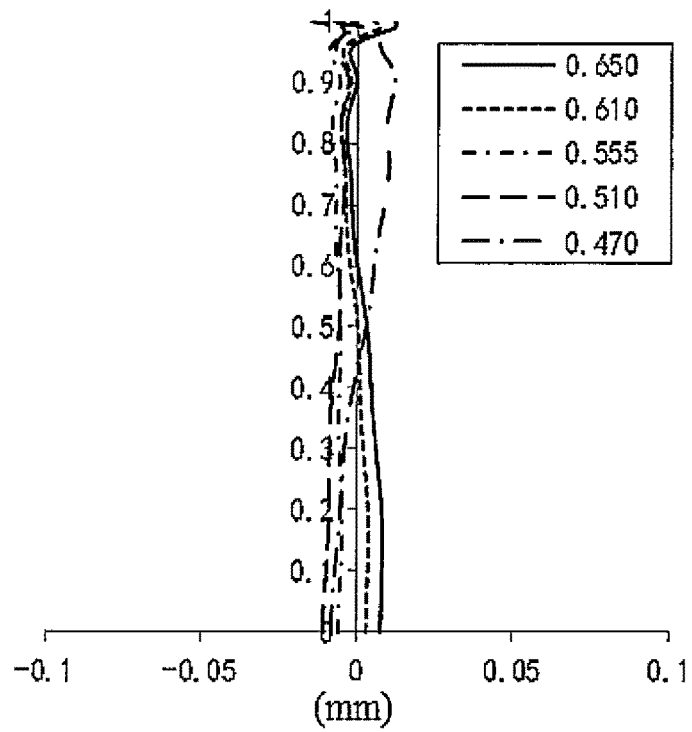
FIG. 27 to FIG. 30 illustrate a longitudinal aberration curve, astigmatism curve, distortion curve and lateral color curve of an optical imaging lens assembly according to embodiment 6 of the disclosure.
Figure 28:
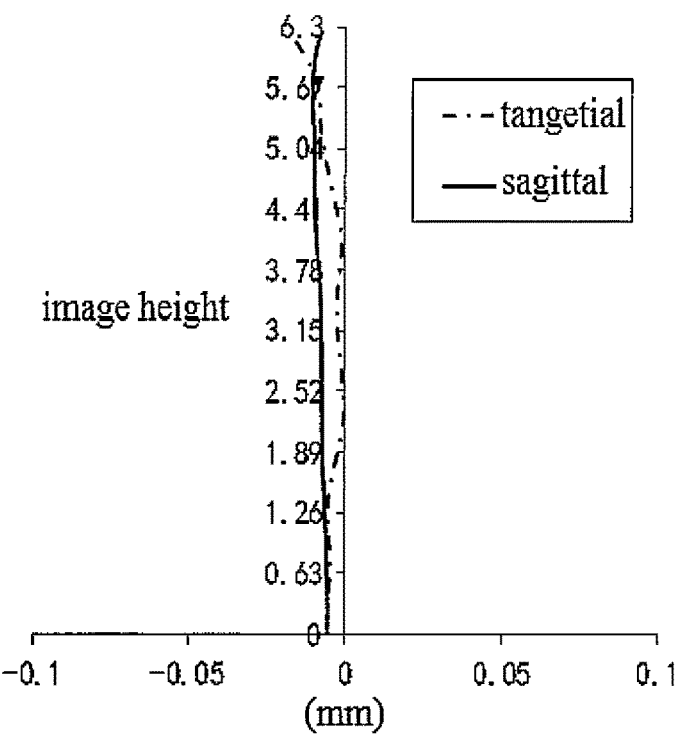
Figure 29:
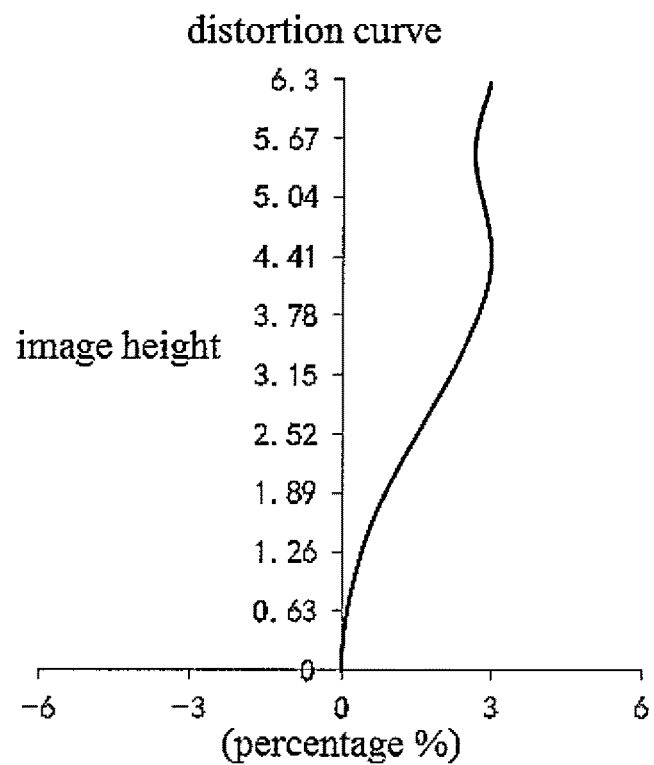
Figure 30:
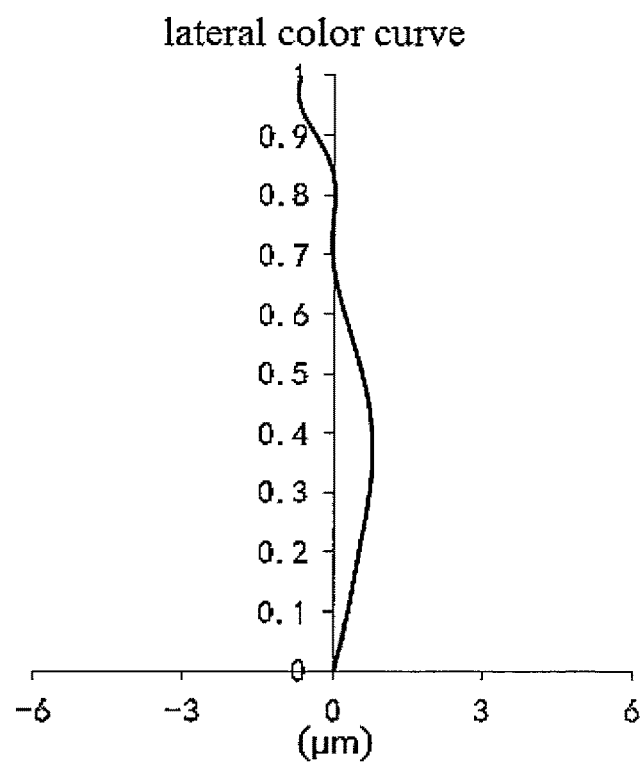

FIG. 27 shows a longitudinal aberration curve of the optical imaging lens assembly according to embodiment 6 of the disclosure to represent deviation of a convergence focal point after light with different wavelengths passes through the lens. FIG. 28 shows an astigmatism curve of the optical imaging lens assembly according to embodiment 6 of the disclosure to represent a tangential image surface curvature and a sagittal image surface curvature. FIG. 29 shows a distortion curve of the optical imaging lens assembly according to embodiment 6 of the disclosure to represent distortion values corresponding to different image heights. FIG. 30 shows a lateral color curve of the optical imaging lens assembly according to embodiment 6 of the disclosure to represent deviation of different image heights on the imaging surface after the light passes through the lens. According to FIG. 27 to FIG. 30, it can be seen that the optical imaging lens assembly provided in embodiment 6 of the disclosure achieves high imaging quality.

Embodiment 7

Figure 31:
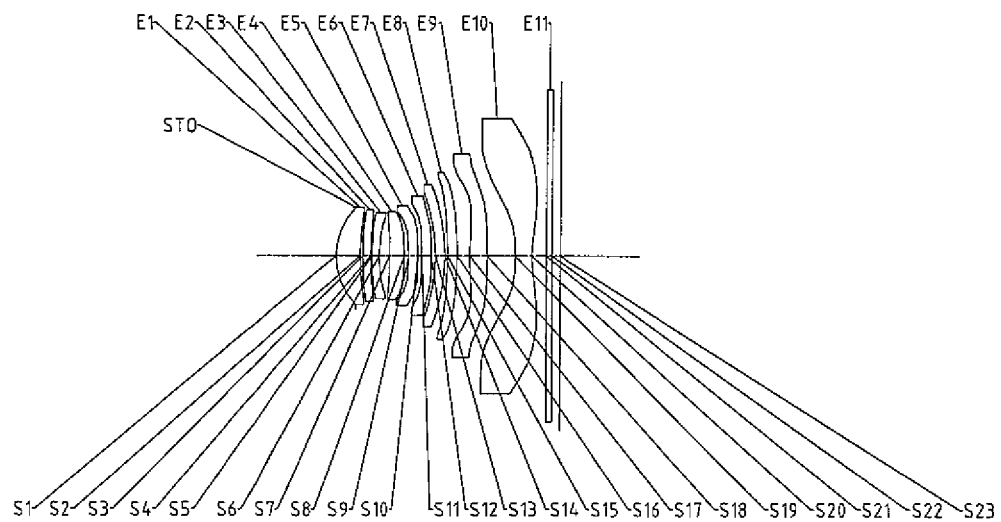
FIG. 31 illustrates a structure diagram of an optical imaging lens assembly according to embodiment 7 of the disclosure.

FIG. 31 illustrates a structure diagram of an optical imaging lens assembly according to embodiment 7 of the disclosure. As shown in FIG. 31, the camera lens component sequentially includes, from an object-side surface to an image-side surface, a diaphragm STO, a first lens E1, a second lens E2, a third lens E3, a fourth lens E4, a fifth lens E5, a sixth lens E6, a seventh lens E7, an eighth lens E8, a ninth lens E9, a tenth lens E10, an optical filter E11 and an imaging surface S23.

The first lens E1 has positive refractive power, an object-side surface S1 thereof is a convex surface, while an image-side surface S2 is a concave surface. The second lens E2 has positive refractive power, an object-side surface S3 thereof is a convex surface, while an image-side surface S4 is a concave surface. The third lens E3 has negative refractive power, an object-side surface S5 thereof is a convex surface, while an image-side surface S6 is a concave surface. The fourth lens E4 has positive refractive power, an object-side surface S7 thereof is a concave surface, while an image-side surface S8 is a convex surface. The fifth lens E5 has negative refractive power, an object-side surface S9 thereof is a concave surface, while an image-side surface S10 is a convex surface. The sixth lens E6 has positive refractive power, an object-side surface S11 thereof is a convex surface, while an image-side surface S12 is a concave surface. The seventh lens E7 has positive refractive power, an object-side surface S13 thereof is a concave surface, while an image-side surface S14 is a convex surface. The eighth lens E8 has positive refractive power, an object-side surface S15 thereof is a concave surface, while an image-side surface S16 is a convex surface. The ninth lens E9 has positive refractive power, an object-side surface S17 thereof is a convex surface, while an image-side surface S18 is a convex surface. The tenth lens E10 has negative refractive power, an object-side surface S19 thereof is a concave surface, while an image-side surface S20 is a concave surface. The optical filter E11 has an object-side surface S21 and an image-side surface S22. Light from an object sequentially passes through each of the surfaces S1 to S22 and is finally imaged on the imaging surface S23.

In embodiment 7 of the disclosure, explanations about parameters of each relational expression are the same as those in embodiment 1, and numerical values of each relational expression are listed in the following Table 18.

TABLE 18

| Embodiment 7 | | | |
|---|---|---|---|
| f(mm) | 7.25 | TTL(mm) | 8.48 |
| ImgH(mm) | 6.25 | TTL/ImgH | 1.36 |
| f*tan(½FOV) (mm) | 6.21 | (f1 + f9)/f4 | 1.29 |
| f3/(f5 + f10) | 0.99 | R11/f6 | 0.49 |
| FOV(°) | 81.1 | (R8 + R9)/R10 | 0.24 |
| (CT3 + T34)/CT4 | 1.21 | CT9/CT10 | 1.08 |
| DT11/DT41 | 1.19 | f123/(CT1 + CT2 + CT3) | 5.40 |
| SAG42/SAG32 | −1.34 | SAG51/SAG52 | 1.14 |

Table 19 shows basic parameters of the optical imaging lens assembly of embodiment 7 of the disclosure, and units of the radius of curvature, the thickness and the focal length are all millimeter.

TABLE 19

| Surface number | Surface type | Radius of curvature | Thickness | Focal length | Refractive index | Abbe number | Conic coefficient |
|---|---|---|---|---|---|---|---|
| OBJ | Spherical | Infinite | Infinite | | | | |
| STO | Spherical | Infinite | −0.7455 | | | | |
| S1 | Aspherical | 2.5699 | 0.9079 | 6.26 | 1.55 | 56.1 | −1.2901 |
| S2 | Aspherical | 9.0554 | 0.0974 | | | | −2.0940 |
| S3 | Aspherical | 18.4674 | 0.3085 | 240.87 | 1.67 | 20.4 | 89.5853 |
| S4 | Aspherical | 20.7317 | 0.0400 | | | | 83.1814 |
| S5 | Aspherical | 8.8775 | 0.2800 | −18.61 | 1.68 | 19.2 | 6.1739 |
| S6 | Aspherical | 5.1433 | 0.3904 | | | | −2.1150 |
| S7 | Aspherical | 200.0000 | 0.5546 | 15.72 | 1.55 | 56.1 | 95.7783 |
| S8 | Aspherical | −8.9572 | 0.1729 | | | | 0.7405 |
| S9 | Aspherical | −8.0215 | 0.3400 | −13.64 | 1.67 | 20.4 | −4.5899 |
| S10 | Aspherical | −69.8013 | 0.1519 | | | | 14.9999 |
| S11 | Aspherical | 27.1944 | 0.3601 | 55.47 | 1.65 | 23.5 | 86.9364 |
| S12 | Aspherical | 113.5889 | 0.1500 | | | | 90.0000 |
| S13 | Aspherical | −6.6898 | 0.3616 | 96.17 | 1.65 | 23.5 | 2.7130 |
| S14 | Aspherical | −6.1649 | 0.1000 | | | | −3.1583 |
| S15 | Aspherical | −23.4326 | 0.3601 | 209.56 | 1.65 | 23.5 | 42.4107 |
| S16 | Aspherical | −20.0836 | 0.4768 | | | | 38.9026 |
| S17 | Aspherical | 8.6606 | 0.6638 | 14.06 | 1.55 | 56.1 | 4.0078 |
| S18 | Aspherical | −65.6884 | 1.0577 | | | | 82.4714 |
| S19 | Aspherical | −17.2185 | 0.6154 | −5.13 | 1.54 | 55.7 | 4.2027 |
| S20 | Aspherical | 3.3181 | 0.5699 | | | | −12.7359 |
| S21 | Spherical | Infinite | 0.2100 | | 1.52 | 64.2 | |
| S22 | Spherical | Infinite | 0.3092 | | | | |
| S23 | Spherical | Infinite | | | | | |

The following Table 20 shows higher-order coefficients A4, A6, A8, A10, A12, A14, A16, A18 and A20 applied to each of the aspherical mirror surfaces S1-S20 of the aspherical lenses in embodiment 7 of the disclosure.

TABLE 20

| Surface number | A4 | A6 | A8 | A10 | A12 |
|---|---|---|---|---|---|
| S1 | 1.0092E−02 | 1.3480E−04 | 8.1332E−04 | −8.2605E−04 | 6.3674E−04 |
| S2 | −4.5120E−03 | −5.8083E−04 | 4.5818E−03 | −5.4516E−03 | 4.0894E−03 |
| S3 | 1.4537E−03 | −2.2694E−04 | 7.0420E−04 | 9.0835E−04 | −2.1059E−03 |
| S4 | 1.2584E−02 | −1.6723E−02 | 2.0660E−02 | −1.6692E−02 | 6.2923E−03 |
| S5 | −8.4992E−03 | −7.4976E−03 | 9.4548E−03 | 7.2321E−04 | −9.8124E−03 |
| S6 | −7.4879E−03 | −4.6441E−03 | 2.7022E−02 | −4.5068E−02 | 4.8271E−02 |
| S7 | −1.1416E−02 | 1.0035E−02 | −3.3036E−02 | 4.8424E−02 | −4.4153E−02 |
| S8 | −5.0100E−03 | −2.3796E−02 | 3.3669E−02 | −3.8939E−02 | 2.9152E−02 |
| S9 | −1.5552E−02 | −2.4999E−02 | 2.5944E−02 | −2.2628E−02 | 1.4139E−02 |
| S10 | −2.6204E−02 | −1.9285E−03 | −6.6611E−03 | 1.1645E−02 | −1.0493E−02 |
| S11 | −5.0835E−02 | 2.9813E−02 | −4.0446E−02 | 3.7800E−02 | −2.3801E−02 |
| S12 | −4.2394E−02 | 2.2055E−02 | −2.1236E−02 | 1.5093E−02 | −7.0228E−03 |
| S13 | 0.0000E+00 | 0.0000E+00 | 0.0000E+00 | 0.0000E+00 | 0.0000E+00 |
| S14 | 5.7981E−03 | −1.2486E−02 | 1.0089E−02 | −3.8875E−03 | 8.1108E−04 |
| S15 | 6.6850E−03 | −1.3932E−02 | 8.2351E−03 | −2.4143E−03 | 3.7082E−04 |
| S16 | 2.8570E−03 | −5.5282E−03 | 2.7772E−03 | −6.6487E−04 | 6.8942E−05 |
| S17 | −1.3784E−02 | −1.5918E−03 | 3.2003E−04 | 1.9775E−04 | −1.2241E−04 |
| S18 | −5.4428E−03 | −3.1355E−04 | −4.7961E−04 | 2.6021E−04 | −5.3475E−05 |
| S19 | −5.7061E−02 | 2.0197E−02 | −5.3079E−03 | 9.4596E−04 | −9.6038E−05 |
| S20 | −2.9490E−02 | 1.0507E−02 | −2.7355E−03 | 5.0975E−04 | −6.8342E−05 |

| Surface number | A14 | A16 | A18 | A20 |
|---|---|---|---|---|
| S1 | −3.2302E−04 | 9.8570E−05 | −1.6107E−05 | 1.0387E−06 |
| S2 | −2.0454E−03 | 6.7715E−04 | −1.3550E−04 | 1.2178E−05 |
| S3 | 1.5266E−03 | −5.1988E−04 | 7.6320E−05 | −2.7439E−06 |
| S4 | 3.6161E−04 | −1.1410E−03 | 3.4300E−04 | −3.1655E−05 |
| S5 | 9.9202E−03 | −4.6292E−03 | 1.0517E−03 | −9.2826E−05 |
| S6 | −3.2300E−02 | 1.3284E−02 | −3.0575E−03 | 3.0198E−04 |
| S7 | 2.5376E−02 | −8.8397E−03 | 1.7262E−03 | −1.4725E−04 |
| S8 | −1.3981E−02 | 4.2634E−03 | −7.5604E−04 | 5.7308E−05 |
| S9 | −6.6487E−03 | 2.3927E−03 | −5.7179E−04 | 6.1994E−05 |
| S10 | 5.4393E−03 | −1.6398E−03 | 2.6870E−04 | −1.8300E−05 |
| S11 | 9.9936E−03 | −2.7877E−03 | 5.1008E−04 | −5.6358E−05 |
| S12 | 2.1704E−03 | −4.3320E−04 | 5.3513E−05 | −3.7920E−06 |
| S13 | 0.0000E+00 | 0.0000E+00 | 0.0000E+00 | 0.0000E+00 |
| S14 | −9.0078E−05 | 3.8766E−06 | 1.4430E−07 | −1.5156E−08 |
| S15 | −2.5367E−05 | −2.2479E−07 | 1.2860E−07 | −5.1339E−09 |
| S16 | 7.7357E−07 | −8.6010E−07 | 7.4398E−08 | −2.1239E−09 |
| S17 | 3.3432E−05 | −5.7240E−06 | 6.4294E−07 | −4.5204E−08 |
| S18 | 5.7778E−06 | −3.4607E−07 | 1.0869E−08 | −1.3972E−10 |
| S19 | 3.0321E−06 | 5.1112E−07 | −8.0982E−08 | 5.8150E−09 |
| S20 | 6.6339E−06 | −4.6759E−07 | 2.3837E−08 | −8.6706E−10 |

Figure 32:
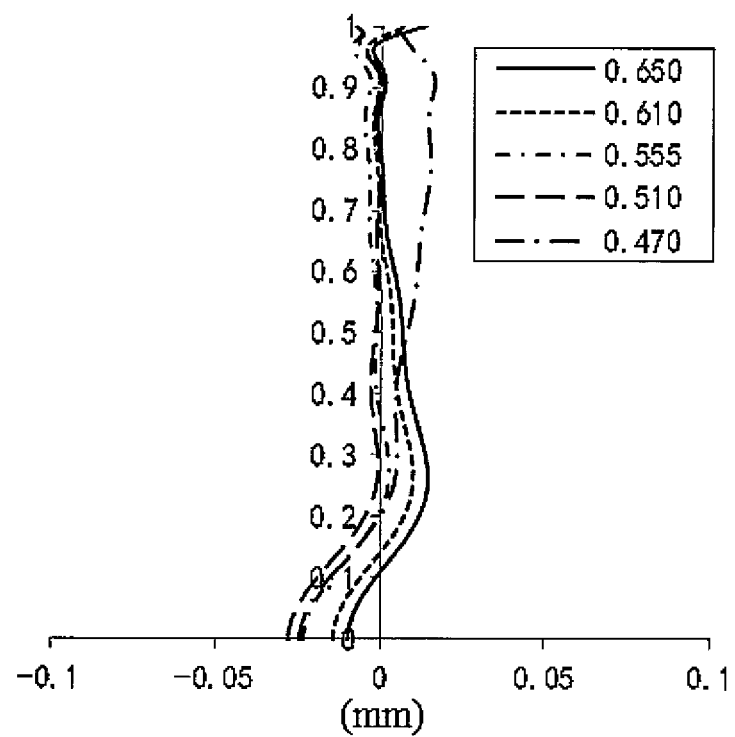
FIG. 32 to FIG. 35 illustrate a longitudinal aberration curve, astigmatism curve, distortion curve and lateral color curve of an optical imaging lens assembly according to embodiment 7 of the disclosure.
Figure 33:
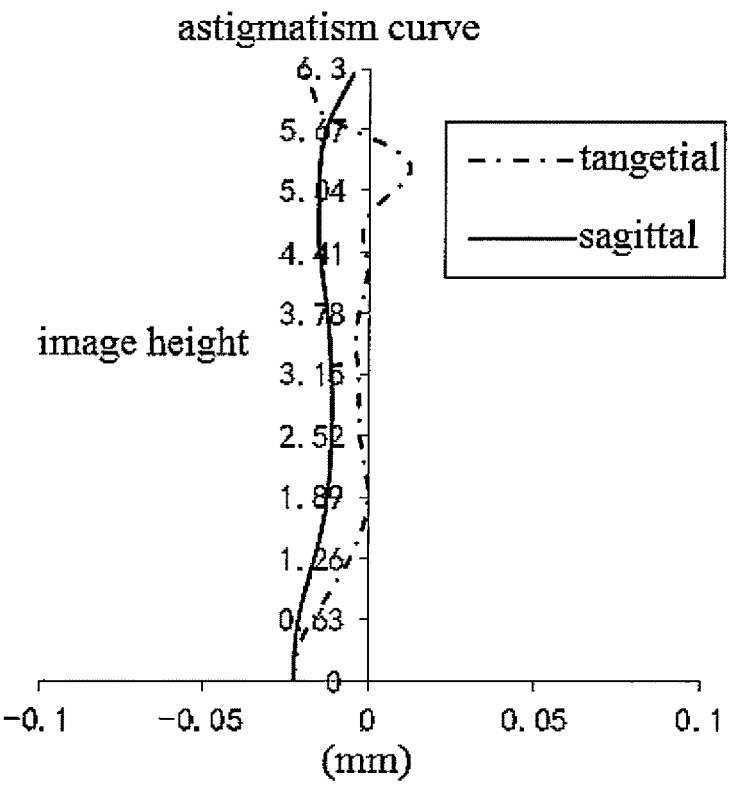
Figure 34:
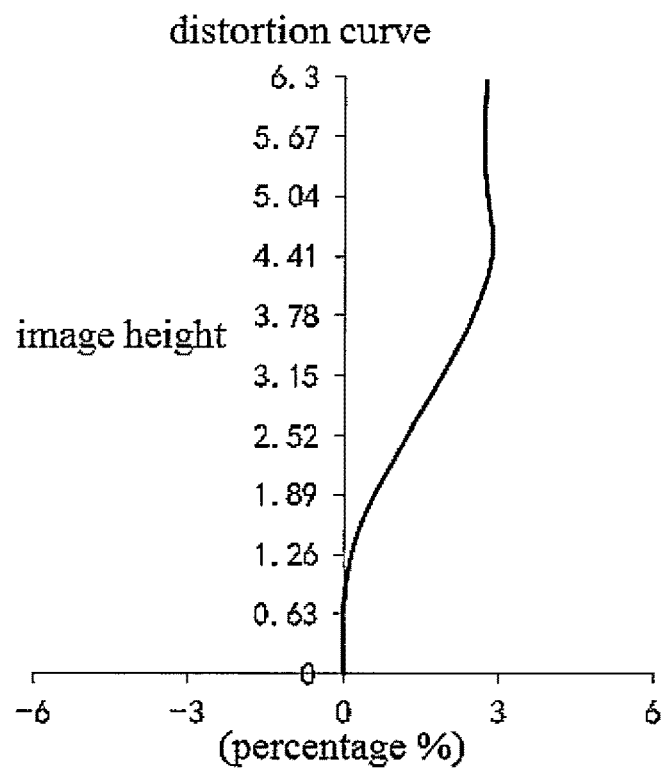
Figure 35:
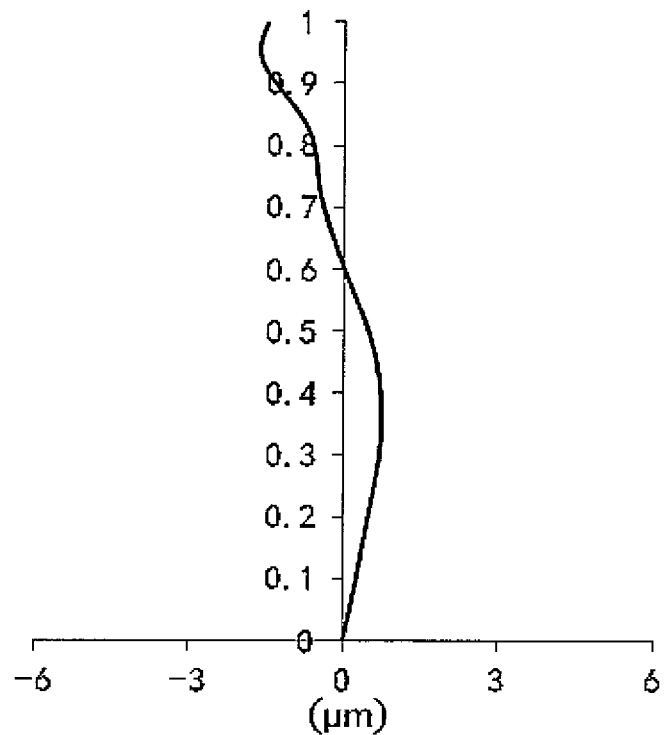

FIG. 32 shows a longitudinal aberration curve of the optical imaging lens assembly according to embodiment 7 of the disclosure to represent deviation of a convergence focal point after light with different wavelengths passes through the lens. FIG. 33 shows an astigmatism curve of the optical imaging lens assembly according to embodiment 7 of the disclosure to represent a tangential image surface curvature and a sagittal image surface curvature. FIG. 34 shows a distortion curve of the optical imaging lens assembly according to embodiment 7 of the disclosure to represent distortion values corresponding to different image heights. FIG. 35 shows a lateral color curve of the optical imaging lens assembly according to embodiment 7 of the disclosure to represent deviation of different image heights on the imaging surface after the light passes through the lens. According to FIG. 32 to FIG. 35, it can be seen that the optical imaging lens assembly provided in embodiment 7 of the disclosure achieves high imaging quality.

Embodiment 8

Figure 36:
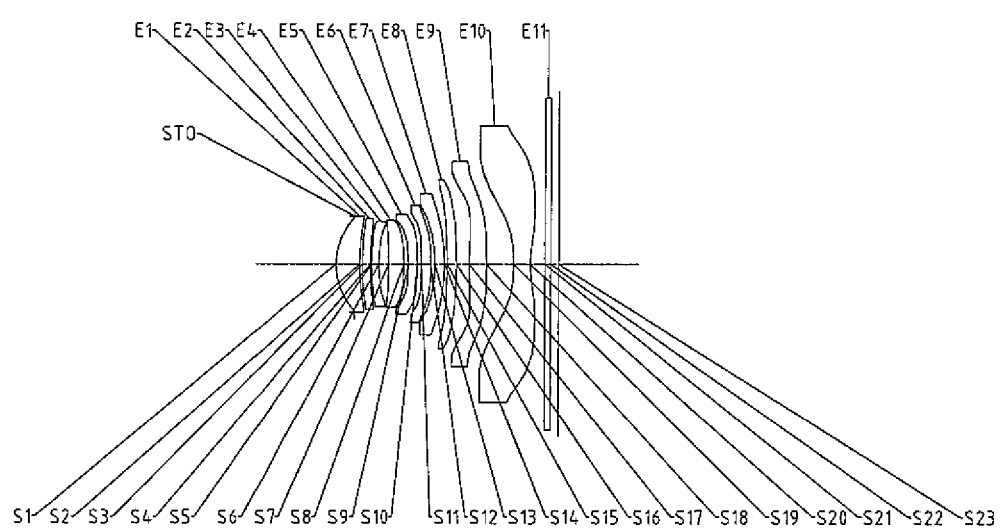
FIG. 36 illustrates a structure diagram of an optical imaging lens assembly according to embodiment 8 of the disclosure.

FIG. 36 illustrates a structure diagram of an optical imaging lens assembly according to embodiment 8 of the disclosure. As shown in FIG. 36, the camera lens component sequentially includes, from an object-side surface to an image-side surface, a diaphragm STO, a first lens E1, a second lens E2, a third lens E3, a fourth lens E4, a fifth lens E5, a sixth lens E6, a seventh lens E7, an eighth lens E8, a ninth lens E9, a tenth lens E10, an optical filter E11 and an imaging surface S23.

The first lens E1 has positive refractive power, an object-side surface S1 thereof is a convex surface, while an image-side surface S2 is a concave surface. The second lens E2 has positive refractive power, an object-side surface S3 thereof is a convex surface, while an image-side surface S4 is a concave surface. The third lens E3 has negative refractive power, an object-side surface S5 thereof is a convex surface, while an image-side surface S6 is a concave surface. The fourth lens E4 has positive refractive power, an object-side surface S7 thereof is a convex surface, while an image-side surface S8 is a convex surface. The fifth lens E5 has negative refractive power, an object-side surface S9 thereof is a concave surface, while an image-side surface S10 is a convex surface. The sixth lens E6 has positive refractive power, an object-side surface S11 thereof is a convex surface, while an image-side surface S12 is a convex surface. The seventh lens E7 has negative refractive power, an object-side surface S13 thereof is a concave surface, while an image-side surface S14 is a convex surface. The eighth lens E8 has positive refractive power, an object-side surface S15 thereof is a concave surface, while an image-side surface S16 is a convex surface. The ninth lens E9 has positive refractive power, an object-side surface S17 thereof is a convex surface, while an image-side surface S18 is a convex surface. The tenth lens E10 has negative refractive power, an object-side surface S19 thereof is a concave surface, while an image-side surface S20 is a concave surface. The optical filter E11 has an object-side surface S21 and an image-side surface S22. Light from an object sequentially passes through each of the surfaces S1 to S22 and is finally imaged on the imaging surface S23.

In embodiment 8 of the disclosure, explanations about parameters of each relational expression are the same as those in embodiment 1, and numerical values of each relational expression are listed in the following Table 21.

TABLE 21

| Embodiment 8 | | | |
|---|---|---|---|
| f(mm) | 7.20 | TTL(mm) | 8.44 |
| ImgH(mm) | 6.25 | TTL/ImgH | 1.35 |
| f*tan(½FOV) (mm) | 6.10 | (f1 + f9)/f4 | 1.24 |
| f3/(f5 + f10) | 0.97 | R11/f6 | 1.69 |
| FOV(°) | 80.5 | (R8 + R9)/R10 | 0.36 |
| (CT3 + T34)/CT4 | 1.15 | CT9/CT10 | 1.06 |
| DT11/DT41 | 1.19 | f123/(CT1 + CT2 + CT3) | 5.42 |
| SAG42/SAG32 | −1.33 | SAG51/SAG52 | 1.12 |

Table 22 shows basic parameters of the optical imaging lens assembly of embodiment 8 of the disclosure, and units of the radius of curvature, the thickness and the focal length are all millimeter.

TABLE 22

| Surface number | Surface type | Radius of curvature | Thickness | Focal length | Refractive index | Abbe number | Conic coefficient |
|---|---|---|---|---|---|---|---|
| OBJ | Spherical | Infinite | Infinite | | | | |
| STO | Spherical | Infinite | −0.7098 | | | | |
| S1 | Aspherical | 2.5540 | 0.8979 | 6.26 | 1.55 | 56.1 | −1.2806 |
| S2 | Aspherical | 8.8470 | 0.0969 | | | | −1.5951 |
| S3 | Aspherical | 17.6841 | 0.3100 | 232.02 | 1.67 | 20.4 | 89.2641 |
| S4 | Aspherical | 19.8306 | 0.0400 | | | | 87.6103 |
| S5 | Aspherical | 8.6301 | 0.2800 | −18.04 | 1.68 | 19.2 | 6.2896 |
| S6 | Aspherical | 5.0483 | 0.3777 | | | | −1.9478 |
| S7 | Aspherical | 251.5401 | 0.5703 | 15.92 | 1.55 | 56.1 | 95.7783 |
| S8 | Aspherical | −8.9949 | 0.1735 | | | | 1.6864 |
| S9 | Aspherical | −7.6451 | 0.3410 | −13.82 | 1.67 | 20.4 | −4.9421 |
| S10 | Aspherical | −46.0973 | 0.1580 | | | | 80.8756 |
| S11 | Aspherical | 37.6070 | 0.3632 | 22.21 | 1.65 | 23.5 | 89.8732 |
| S12 | Aspherical | −22.9680 | 0.1514 | | | | 41.4984 |
| S13 | Aspherical | −5.4197 | 0.3611 | −57.95 | 1.65 | 23.5 | 2.5827 |
| S14 | Aspherical | −6.5068 | 0.1050 | | | | −2.3941 |
| S15 | Aspherical | −25.9484 | 0.3600 | 205.87 | 1.65 | 23.5 | 39.2557 |
| S16 | Aspherical | −21.8161 | 0.4714 | | | | 41.6032 |
| S17 | Aspherical | 8.5430 | 0.6521 | 13.53 | 1.55 | 56.1 | 3.9084 |
| S18 | Aspherical | −53.2273 | 1.0333 | | | | 41.7202 |
| S19 | Aspherical | −17.1038 | 0.6146 | −5.20 | 1.54 | 55.7 | 4.3081 |
| S20 | Aspherical | 3.3745 | 0.5650 | | | | −12.0292 |
| S21 | Spherical | Infinite | 0.2100 | | 1.52 | 64.2 | |
| S22 | Spherical | Infinite | 0.3045 | | | | |
| S23 | Spherical | Infinite | | | | | |

The following Table 23 shows higher-order coefficients A4, A6, A8, A10, A12, A14, A16, A18 and A20 applied to each of the aspherical mirror surfaces S1-S20 of the aspherical lenses in embodiment 8 of the disclosure.

TABLE 23

| Surface number | A4 | A6 | A8 | A10 | A12 |
|---|---|---|---|---|---|
| S1 | 1.0235E−02 | −2.3439E−04 | 1.5776E−03 | −1.4176E−03 | 7.6925E−04 |
| S2 | −4.9767E−03 | 1.1763E−03 | 2.3638E−03 | −4.0961E−03 | 3.8001E−03 |
| S3 | 8.3657E−04 | 3.2879E−03 | −5.7111E−03 | 7.5814E−03 | −6.5583E−03 |
| S4 | 1.1825E−02 | −1.0754E−02 | 6.4093E−03 | 2.9761E−03 | −1.1131E−02 |
| S5 | −9.0515E−03 | −4.2827E−03 | 1.0332E−03 | 1.4230E−02 | −2.3811E−02 |
| S6 | −8.3204E−03 | −7.8541E−04 | 1.6588E−02 | −2.6952E−02 | 2.8781E−02 |
| S7 | −8.7127E−03 | −4.5638E−03 | 2.4453E−03 | −2.0167E−03 | 8.2017E−04 |
| S8 | −7.3521E−03 | −1.5995E−02 | 1.7852E−02 | −1.9831E−02 | 1.4704E−02 |
| S9 | −1.5478E−02 | −2.4479E−02 | 2.8971E−02 | −3.2137E−02 | 2.5525E−02 |
| S10 | −2.6190E−02 | −6.0791E−04 | −1.1227E−02 | 1.8882E−02 | −1.6865E−02 |
| S11 | −4.8116E−02 | 2.2866E−02 | −2.9910E−02 | 2.6015E−02 | −1.4301E−02 |
| S12 | −4.1984E−02 | 2.3021E−02 | −2.6195E−02 | 2.0973E−02 | −1.0337E−02 |
| S13 | −5.6809E−04 | 2.3436E−03 | −4.2923E−03 | 4.2884E−03 | −2.4811E−03 |

TABLE 23-continued

| | | | | | |
|---|---|---|---|---|---|
| S14 | 7.8110E−03 | −1.4541E−02 | 1.0939E−02 | −4.2348E−03 | 9.6277E−04 |
| S15 | 7.8645E−03 | −1.5902E−02 | 9.3365E−03 | −2.7851E−03 | 4.6754E−04 |
| S16 | 3.0691E−03 | −5.8666E−03 | 3.2153E−03 | −9.4292E−04 | 1.6202E−04 |
| S17 | −1.4077E−02 | −1.1698E−03 | 1.0545E−04 | 1.9673E−04 | −8.9939E−05 |
| S18 | −5.5976E−03 | 3.5004E−04 | −1.0176E−03 | 4.4216E−04 | −8.6349E−05 |
| S19 | −6.0297E−02 | 2.3471E−02 | −7.0580E−03 | 1.5036E−03 | −2.1023E−04 |
| S20 | −3.2190E−02 | 1.2541E−02 | −3.6364E−03 | 7.6479E−04 | −1.1671E−04 |

| Surface number | A14 | A16 | A18 | A20 |
|---|---|---|---|---|
| S1 | −2.4454E−04 | 4.1307E−05 | −2.3974E−06 | −1.5193E−07 |
| S2 | −2.1495E−03 | 7.5732E−04 | −1.5559E−04 | 1.4139E−05 |
| S3 | 3.4873E−03 | −1.0771E−03 | 1.6787E−04 | −9.1864E−06 |
| S4 | 1.0343E−02 | −4.7056E−03 | 1.0594E−03 | −9.2812E−05 |
| S5 | 1.9178E−02 | −8.3652E−03 | 1.8825E−03 | −1.7016E−04 |
| S6 | −1.9239E−02 | 8.0138E−03 | −1.8912E−03 | 1.9382E−04 |
| S7 | −6.3206E−05 | 5.1023E−05 | −2.9320E−05 | 2.6527E−06 |
| S8 | −7.2529E−03 | 2.4525E−03 | −5.1093E−04 | 4.5551E−05 |
| S9 | −1.4358E−02 | 5.5223E−03 | −1.2768E−03 | 1.2908E−04 |
| S10 | 8.6786E−03 | −2.5899E−03 | 4.1826E−04 | −2.8071E−05 |
| S11 | 4.8778E−03 | −1.0656E−03 | 1.6824E−04 | −2.0139E−05 |
| S12 | 3.1737E−03 | −5.9597E−04 | 6.6289E−05 | −4.1598E−06 |
| S13 | 8.5820E−04 | −1.7534E−04 | 1.9523E−05 | −9.1305E−07 |
| S14 | −1.3584E−04 | 1.1895E−05 | −5.9690E−07 | 1.2888E−08 |
| S15 | −4.4347E−05 | 2.1792E−06 | −3.9208E−08 | −2.6896E−10 |
| S16 | −1.6859E−05 | 1.0390E−06 | −3.3958E−08 | 4.1613E−10 |
| S17 | 2.1063E−05 | −3.3538E−06 | 3.7313E−07 | −2.6715E−08 |
| S18 | 9.2280E−06 | −5.5735E−07 | 1.7883E−08 | −2.3744E−10 |
| S19 | 1.8896E−05 | −1.0350E−06 | 2.6406E−08 | 5.0615E−10 |
| S20 | 1.2980E−05 | −1.0543E−06 | 6.2307E−08 | −2.6439E−09 |

Figure 37:
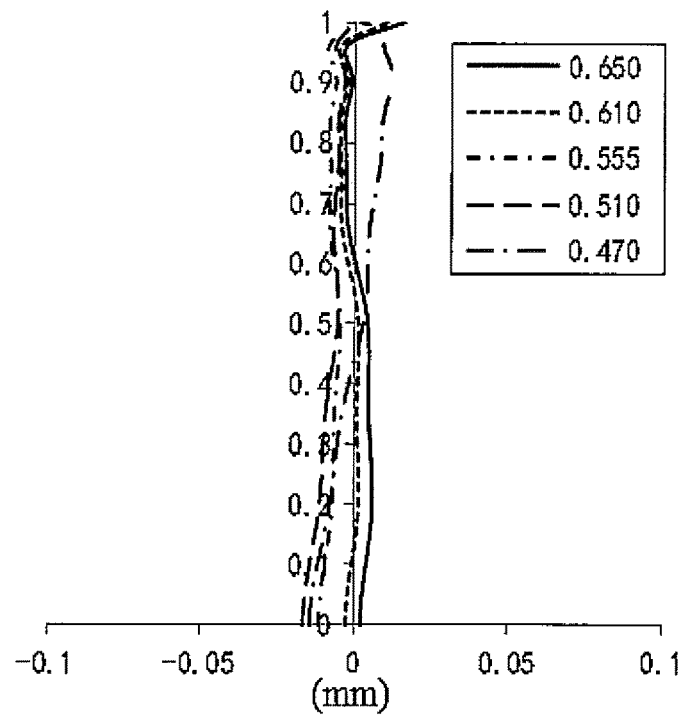
FIG. 37 to FIG. 40 illustrate a longitudinal aberration curve, astigmatism curve, distortion curve and lateral color curve of an optical imaging lens assembly according to embodiment 7 of the disclosure.
Figure 38:
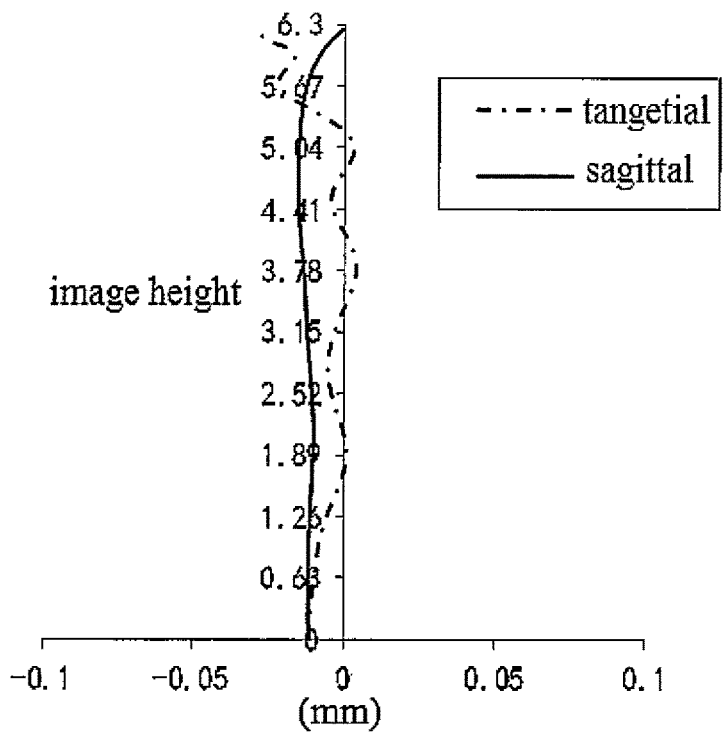
Figure 39:
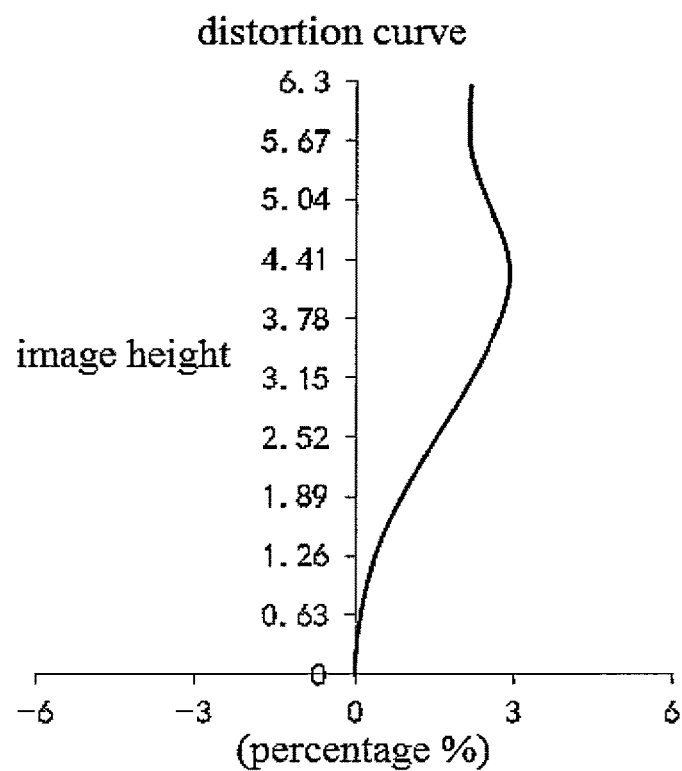
Figure 40:
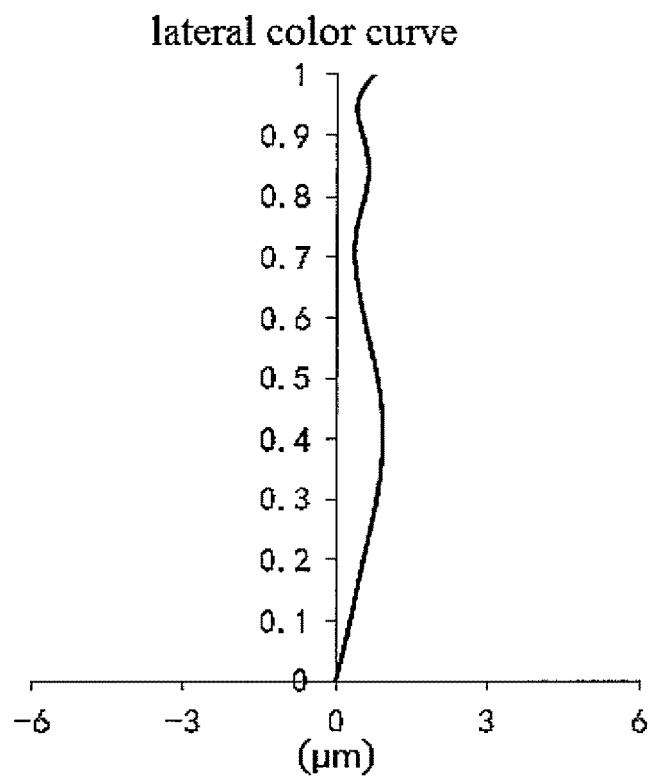

FIG. 37 shows a longitudinal aberration curve of the optical imaging lens assembly according to embodiment 8 of the disclosure to represent deviation of a convergence focal point after light with different wavelengths passes through the lens. FIG. 38 shows an astigmatism curve of the optical imaging lens assembly according to embodiment 8 of the disclosure to represent a tangential image surface curvature and a sagittal image surface curvature. FIG. 39 shows a distortion curve of the optical imaging lens assembly according to embodiment 8 of the disclosure to represent distortion values corresponding to different image heights. FIG. 40 shows a lateral color curve of the optical imaging lens assembly according to embodiment 8 of the disclosure to represent deviation of different image heights on the imaging surface after the light passes through the lens. According to FIG. 37 to FIG. 40, it can be seen that the optical imaging lens assembly provided in embodiment 8 of the disclosure achieves high imaging quality.

Embodiment 9

Figure 41:
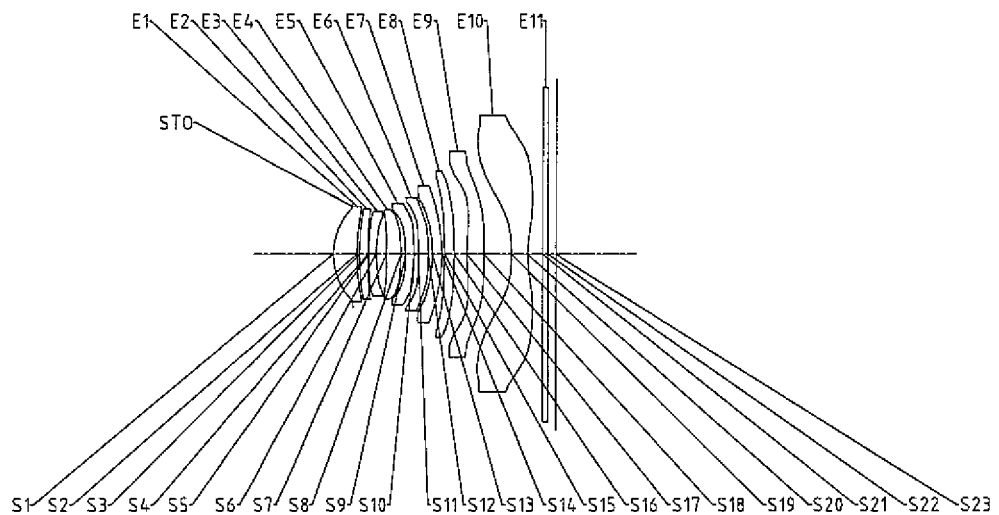
FIG. 41 illustrates a structure diagram of an optical imaging lens assembly according to embodiment 9 of the disclosure.

FIG. 41 illustrates a structure diagram of an optical imaging lens assembly according to embodiment 9 of the disclosure. As shown in FIG. 41, the camera lens component sequentially includes, from an object-side surface to an image-side surface, a diaphragm STO, a first lens E1, a second lens E2, a third lens E3, a fourth lens E4, a fifth lens E5, a sixth lens E6, a seventh lens E7, an eighth lens E8, a ninth lens E9, a tenth lens E10, an optical filter E11 and an imaging surface S23.

The first lens E1 has positive refractive power, an object-side surface S1 thereof is a convex surface, while an image-side surface S2 is a concave surface. The second lens E2 has positive refractive power, an object-side surface S3 thereof is a convex surface, while an image-side surface S4 is a concave surface. The third lens E3 has negative refractive power, an object-side surface S5 thereof is a convex surface, while an image-side surface S6 is a concave surface. The fourth lens E4 has positive refractive power, an object-side surface S7 thereof is a concave surface, while an image-side surface S8 is a convex surface. The fifth lens E5 has negative refractive power, an object-side surface S9 thereof is a concave surface, while an image-side surface S10 is a convex surface. The sixth lens E6 has positive refractive power, an object-side surface S11 thereof is a convex surface, while an image-side surface S12 is a convex surface. The seventh lens E7 has negative refractive power, an object-side surface S13 thereof is a concave surface, while an image-side surface S14 is a convex surface. The eighth lens E8 has positive refractive power, an object-side surface S15 thereof is a concave surface, while an image-side surface S16 is a convex surface. The ninth lens E9 has positive refractive power, an object-side surface S17 thereof is a convex surface, while an image-side surface S18 is a convex surface. The tenth lens E10 has negative refractive power, an object-side surface S19 thereof is a concave surface, while an image-side surface S20 is a concave surface. The optical filter E11 has an object-side surface S21 and an image-side surface S22. Light from an object sequentially passes through each of the surfaces S1 to S22 and is finally imaged on the imaging surface S23.

In embodiment 9 of the disclosure, explanations about parameters of each relational expression are the same as those in embodiment 1, and numerical values of each relational expression are listed in the following Table 24.

TABLE 24

| Embodiment 9 | | | |
|---|---|---|---|
| f(mm) | 7.23 | TTL(mm) | 8.45 |
| ImgH(mm) | 6.25 | TTL/ImgH | 1.35 |
| f*tan(½FOV) (mm) | 6.06 | (f1 + f9)/f4 | 1.22 |
| f3/(f5 + f10) | 1.02 | R11/f6 | 1.67 |
| FOV(°) | 79.9 | (R8 + R9)/R10 | 0.37 |
| (CT3 + T34)/CT4 | 1.19 | CT9/CT10 | 1.05 |
| DT11/DT41 | 1.19 | f123/(CT1 + CT2 + CT3) | 5.35 |
| SAG42/SAG32 | −1.53 | SAG51/SAG52 | 1.16 |

Table 25 shows basic parameters of the optical imaging lens assembly of embodiment 9 of the disclosure, and units of the radius of curvature, the thickness and the focal length are all millimeter.

TABLE 25

| Surface number | Surface type | Radius of curvature | Thickness | Focal length | Refractive index | Abbe number | Conic coefficient |
|---|---|---|---|---|---|---|---|
| OBJ | Spherical | Infinite | Infinite | | | | |
| STO | Spherical | Infinite | −0.7482 | | | | |
| S1 | Aspherical | 2.5557 | 0.9030 | 6.26 | 1.55 | 56.1 | −1.2770 |
| S2 | Aspherical | 8.8709 | 0.0962 | | | | −2.0158 |
| S3 | Aspherical | 17.7752 | 0.3104 | 228.86 | 1.67 | 20.4 | 89.3629 |
| S4 | Aspherical | 19.9824 | 0.0400 | | | | 87.5741 |
| S5 | Aspherical | 8.7372 | 0.2800 | −19.02 | 1.68 | 19.2 | 6.1731 |
| S6 | Aspherical | 5.1397 | 0.3846 | | | | −1.9457 |
| S7 | Aspherical | −200.0000 | 0.5587 | 16.12 | 1.55 | 56.1 | 95.7783 |
| S8 | Aspherical | −8.4369 | 0.1724 | | | | 1.1180 |
| S9 | Aspherical | −7.3747 | 0.3400 | −13.41 | 1.67 | 20.4 | −4.7355 |
| S10 | Aspherical | −43.2354 | 0.1582 | | | | 72.4292 |
| S11 | Aspherical | 38.2831 | 0.3600 | 22.86 | 1.65 | 23.5 | 90.0000 |
| S12 | Aspherical | −23.8083 | 0.1544 | | | | 43.9714 |
| S13 | Aspherical | −5.5381 | 0.3600 | −72.00 | 1.65 | 23.5 | 2.5336 |
| S14 | Aspherical | −6.4500 | 0.1070 | | | | −2.3094 |
| S15 | Aspherical | −25.0934 | 0.3600 | 288.04 | 1.65 | 23.5 | 40.1937 |
| S16 | Aspherical | −22.2254 | 0.4729 | | | | 41.4512 |
| S17 | Aspherical | 8.4990 | 0.6480 | 13.46 | 1.55 | 56.1 | 3.9046 |
| S18 | Aspherical | −52.8850 | 1.0415 | | | | 35.7874 |
| S19 | Aspherical | −17.1539 | 0.6188 | −5.18 | 1.54 | 55.7 | 4.3046 |
| S20 | Aspherical | 3.3631 | 0.5679 | | | | −11.8629 |
| S21 | Spherical | Infinite | 0.2100 | | 1.52 | 64.2 | |
| S22 | Spherical | Infinite | 0.3074 | | | | |
| S23 | Spherical | Infinite | | | | | |

The following Table 26 shows higher-order coefficients A4, A6, A8, A10, A12, A14, A16, A18 and A20 applied to each of the aspherical mirror surfaces S1-S20 of the aspherical lenses in embodiment 9 of the disclosure.

TABLE 26

| Surface number | A4 | A6 | A8 | A10 | A12 |
|---|---|---|---|---|---|
| S1 | 1.0071E−02 | 3.5600E−04 | 7.1191E−04 | −8.3866E−04 | 6.8114E−04 |
| S2 | −4.9687E−03 | 1.8809E−03 | −8.7139E−04 | 2.0650E−03 | −2.5271E−03 |
| S3 | 1.1645E−03 | 1.7244E−03 | −3.1848E−03 | 6.2331E−03 | −7.2785E−03 |
| S4 | 1.2064E−02 | −1.3415E−02 | 1.4082E−02 | −8.5901E−03 | −1.0182E−03 |
| S5 | −8.0046E−03 | −8.8609E−03 | 1.2837E−02 | −4.5994E−03 | −5.3859E−03 |
| S6 | −8.1846E−03 | 5.8618E−04 | 1.1142E−02 | −1.7340E−02 | 1.8839E−02 |
| S7 | −8.9683E−03 | −4.3797E−03 | 3.2506E−03 | −5.3800E−03 | 5.6743E−03 |
| S8 | −7.1253E−03 | −1.4899E−02 | 1.2918E−02 | −1.1494E−02 | 7.0367E−03 |
| S9 | −1.5029E−02 | −2.4937E−02 | 2.7241E−02 | −2.8276E−02 | 2.2033E−02 |
| S10 | −2.5586E−02 | −2.5591E−03 | −7.3888E−03 | 1.3790E−02 | −1.2593E−02 |
| S11 | −4.7955E−02 | 2.3899E−02 | −3.4297E−02 | 3.4182E−02 | −2.2820E−02 |
| S12 | −4.1493E−02 | 1.9468E−02 | −1.8695E−02 | 1.3411E−02 | −6.0263E−03 |
| S13 | −5.0535E−06 | 5.3478E−04 | −1.2704E−03 | 1.2875E−03 | −6.7475E−04 |
| S14 | 8.2866E−03 | −1.5380E−02 | 1.1504E−02 | −4.3827E−03 | 9.4849E−04 |
| S15 | 8.1620E−03 | −1.7106E−02 | 1.0564E−02 | −3.3774E−03 | 6.2510E−04 |
| S16 | 3.3876E−03 | −6.0085E−03 | 3.0751E−03 | −7.9855E−04 | 1 0796E−04 |
| S17 | −1.4150E−02 | −7.6527E−04 | −2.8915E−04 | 4.1675E−04 | −1.6955E−04 |
| S18 | −5.7386E−03 | 3.2021E−04 | −9.4685E−04 | 4.1392E−04 | −8.0927E−05 |
| S19 | −5.9726E−02 | 2.3038E−02 | −6.8743E−03 | 1.4577E−03 | −2.0339E−04 |
| S20 | −3.1634E−02 | 1.2119E−02 | −3.4471E−03 | 7.1031E−04 | −1.0619E−04 |

| Surface number | A14 | A16 | A18 | A20 |
|---|---|---|---|---|
| S1 | −3.4683E−04 | 1.0506E−04 | −1.7052E−05 | 1.0944E−06 |
| S2 | 1.5985E−03 | −5.2494E−04 | 7.9778E−05 | −3.7945E−06 |
| S3 | 4.7886E−03 | −1.7530E−03 | 3.2647E−04 | −2.3511E−05 |
| S4 | 5.1237E−03 | −3.1463E−03 | 8.1087E−04 | −7.6559E−05 |
| S5 | 8.1266E−03 | −4.4004E−03 | 1.1004E−03 | −1.0485E−04 |
| S6 | −1.2871E−02 | 5.5035E−03 | −1.3282E−03 | 1.3863E−04 |
| S7 | −3.5989E−03 | 1.4284E−03 | −2.9736E−04 | 2.2470E−05 |
| S8 | −2.9423E−03 | 9.4501E−04 | −2.0755E−04 | 1.8932E−05 |
| S9 | −1.2490E−02 | 4.8539E−03 | −1.1279E−03 | 1.1421E−04 |

TABLE 26-continued

| | | | | |
|---|---|---|---|---|
| S10 | 6.5106E−03 | −1.9461E−03 | 3.1533E−04 | −2.1237E−05 |
| S11 | 1.0151E−02 | −3.0402E−03 | 6.0775E−04 | −7.3759E−05 |
| S12 | 1.6885E−03 | −2.8306E−04 | 2.7467E−05 | −1.6289E−06 |
| S13 | 2.0159E−04 | −3.4874E−05 | 3.2655E−06 | −1.2835E−07 |
| S14 | −1.1808E−04 | 7.6716E−06 | −1.5872E−07 | −4.4231E−09 |
| S15 | −6.8692E−05 | 4.3458E−06 | −1.4142E−07 | 1.6846E−09 |
| S16 | −6.2362E−06 | −1.2138E−07 | 3.2724E−08 | −1.1561E−09 |
| S17 | 4.0271E−05 | −6.4364E−06 | 6.9633E−07 | −4.7918E−08 |
| S18 | 8.6430E−06 | −5.2100E−07 | 1.6666E−08 | −2.2037E−10 |
| S19 | 1.8314E−05 | −1.0145E−06 | 2.7359E−08 | 3.5547E−10 |
| S20 | 1.1573E−05 | −9.2166E−07 | 5.3424E−08 | −2.2241E−09 |

Figure 42:
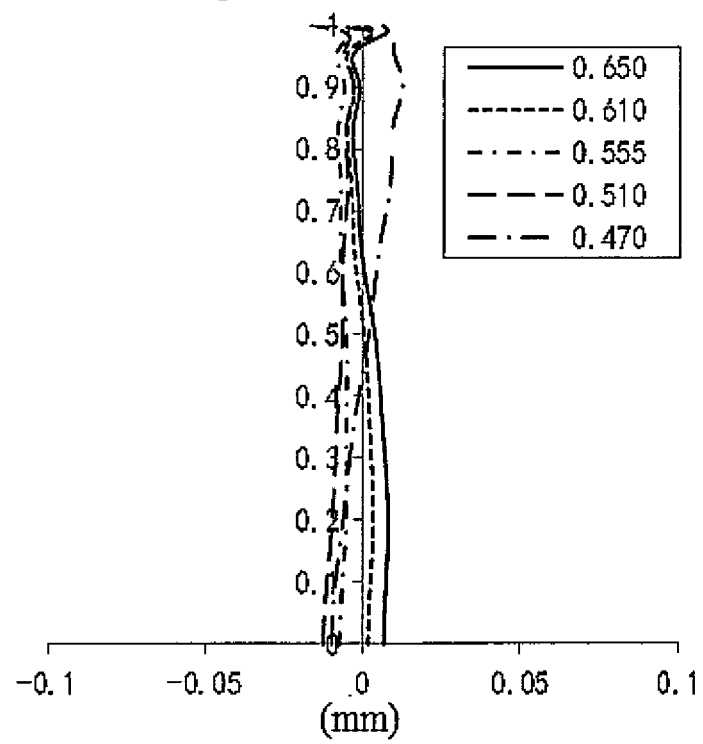
FIG. 42 to FIG. 45 illustrate a longitudinal aberration curve, astigmatism curve, distortion curve and lateral color curve of an optical imaging lens assembly according to embodiment 9 of the disclosure.
Figure 43:
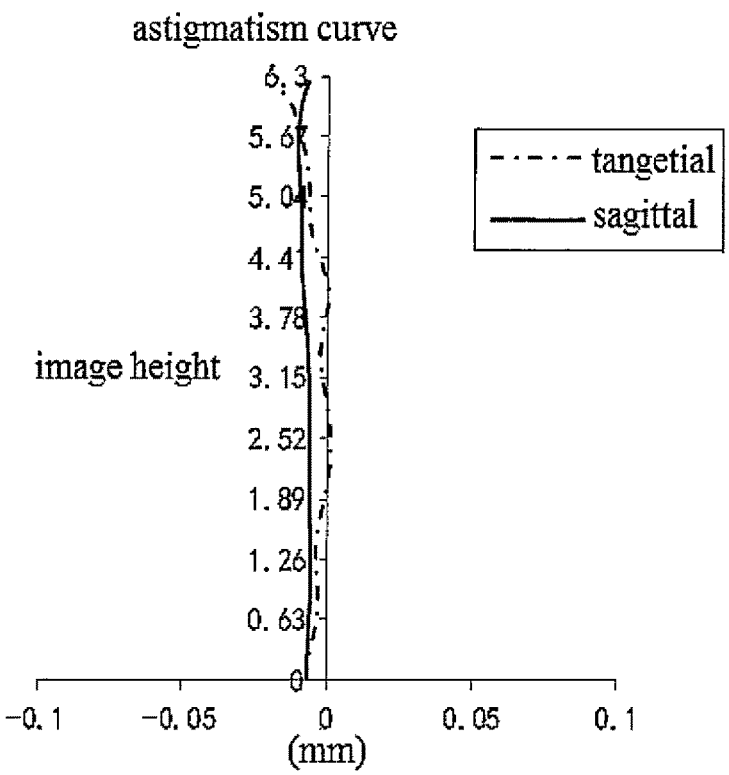
Figure 44:
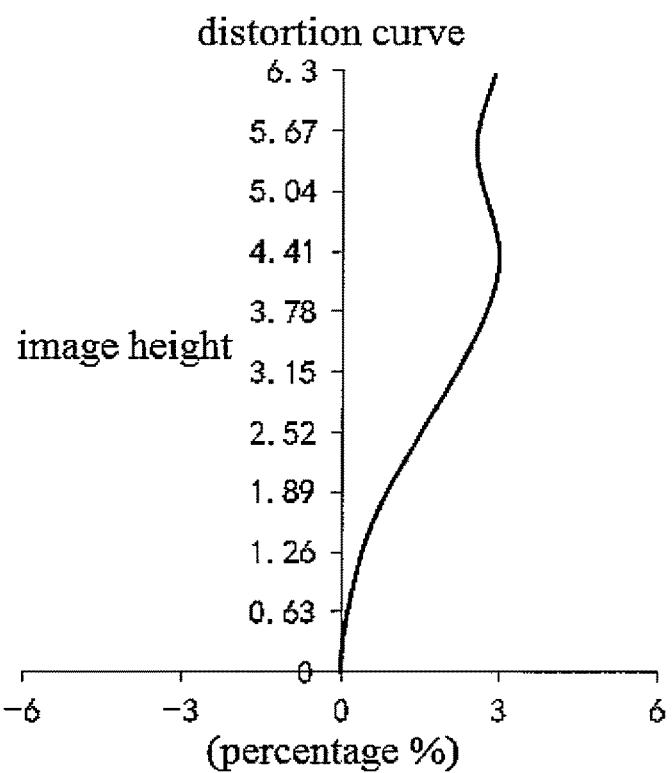
Figure 45:
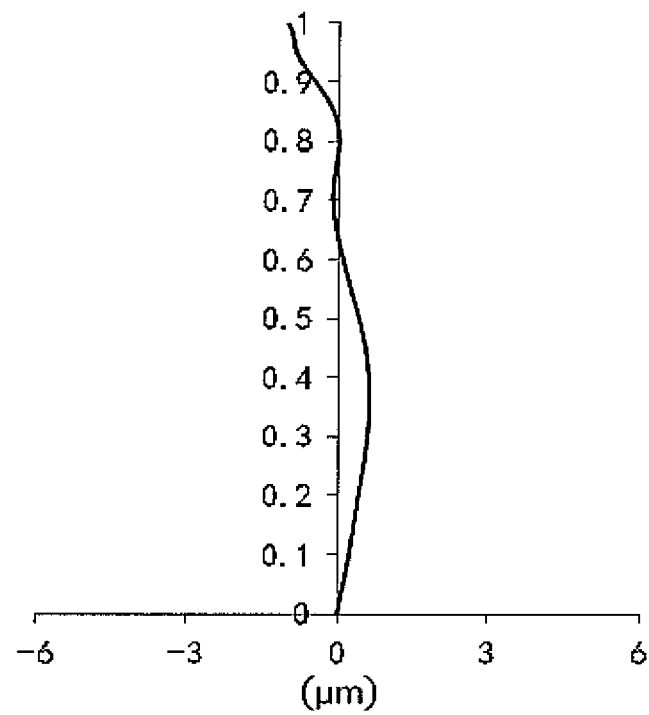

FIG. 42 shows a longitudinal aberration curve of the optical imaging lens assembly according to embodiment 9 of the disclosure to represent deviation of a convergence focal point after light with different wavelengths passes through the lens. FIG. 43 shows an astigmatism curve of the optical imaging lens assembly according to embodiment 9 of the disclosure to represent a tangential image surface curvature and a sagittal image surface curvature. FIG. 44 shows a distortion curve of the optical imaging lens assembly according to embodiment 9 of the disclosure to represent distortion values corresponding to different image heights. FIG. 45 shows a lateral color curve of the optical imaging lens assembly according to embodiment 9 of the disclosure to represent deviation of different image heights on the imaging surface after the light passes through the lens. According to FIG. 42 to FIG. 45, it can be seen that the optical imaging lens assembly provided in embodiment 9 of the disclosure achieves high imaging quality.

Embodiment 10

Figure 46:
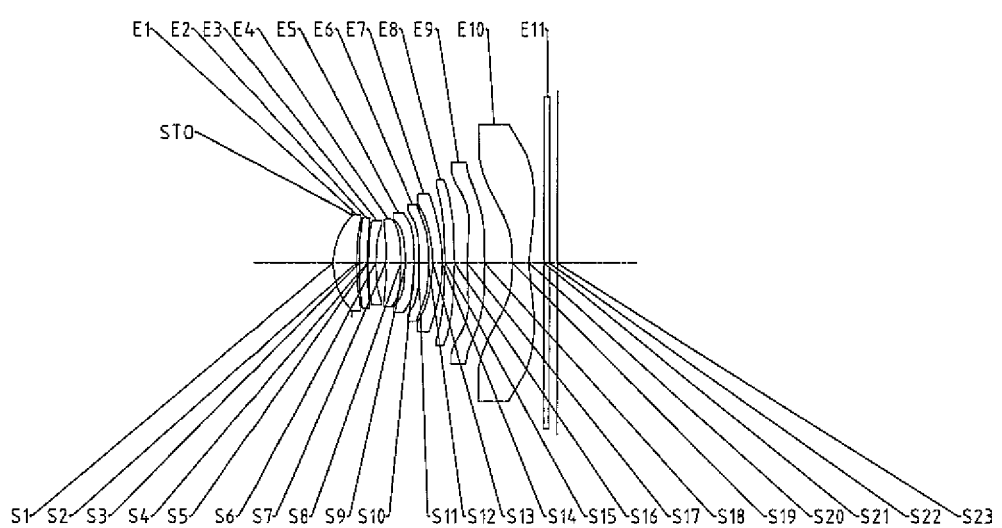
FIG. 46 illustrates a structure diagram of an optical imaging lens assembly according to embodiment 10 of the disclosure.

FIG. 46 illustrates a structure diagram of an optical imaging lens assembly according to embodiment 10 of the disclosure. As shown in FIG. 46, the camera lens component sequentially includes, from an object-side surface to an image-side surface, a diaphragm STO, a first lens E1, a second lens E2, a third lens E3, a fourth lens E4, a fifth lens E5, a sixth lens E6, a seventh lens E7, an eighth lens E8, a ninth lens E9, a tenth lens E10, an optical filter E11 and an imaging surface S23.

The first lens E1 has positive refractive power, an object-side surface S1 thereof is a convex surface, while an image-side surface S2 is a concave surface. The second lens E2 has positive refractive power, an object-side surface S3 thereof is a convex surface, while an image-side surface S4 is a concave surface. The third lens E3 has negative refractive power, an object-side surface S5 thereof is a convex surface, while an image-side surface S6 is a concave surface. The fourth lens E4 has positive refractive power, an object-side surface S7 thereof is a concave surface, while an image-side surface S8 is a convex surface. The fifth lens E5 has negative refractive power, an object-side surface S9 thereof is a concave surface, while an image-side surface S10 is a convex surface. The sixth lens E6 has positive refractive power, an object-side surface S11 of the sixth lens E6 is a convex surface, and an image-side surface S12 of the sixth lens E6 is a convex surface. The seventh lens E7 has negative refractive power, an object-side surface S13 thereof is a concave surface, while an image-side surface S14 is a convex surface. The eighth lens E8 has negative refractive power, an object-side surface S15 thereof is a concave surface, while an image-side surface S16 is a convex surface. The ninth lens E9 has positive refractive power, an object-side surface S17 thereof is a convex surface, while an image-side surface S18 is a convex surface. The tenth lens E10 has negative refractive power, an object-side surface S19 thereof is a concave surface, while an image-side surface S20 is a concave-convex surface. The optical filter E11 has an object-side surface S21 and an image-side surface S22. Light from an object sequentially passes through each of the surfaces S1 to S22 and is finally imaged on the imaging surface S23.

In embodiment 10 of the disclosure, explanations about parameters of each relational expression are the same as those in embodiment 1, and numerical values of each relational expression are listed in the following Table 27.

TABLE 27

| Embodiment 10 | | | |
|---|---|---|---|
| f(mm) | 7.23 | TTL(mm) | 8.47 |
| ImgH(mm) | 6.25 | TTL/ImgH | 1.36 |
| f*tan(½FOV) (mm) | 6.06 | (f1 + f9)/f4 | 1.22 |
| f3/(f5 + f10) | 1.00 | R11/f6 | 1.52 |
| FOV(°) | 79.9 | (R8 + R9)/R10 | 0.34 |
| (CT3 + T34)/CT4 | 1.17 | CT9/CT10 | 1.04 |
| DT11/DT41 | 1.20 | f123/(CT1 + CT2 + CT3) | 5.43 |
| SAG42/SAG32 | −1.47 | SAG51/SAG52 | 1.12 |

Table 28 shows basic parameters of the optical imaging lens assembly of embodiment 10 of the disclosure, and units of the radius of curvature, the thickness and the focal length are all millimeter.

TABLE 28

| Surface number | Surface type | Radius of curvature | Thickness | Focal length | Refractive index | Abbe number | Conic coefficient |
|---|---|---|---|---|---|---|---|
| OBJ | Spherical | Infinite | Infinite | | | | |
| STO | Spherical | Infinite | −0.7338 | | | | |
| S1 | Aspherical | 2.5658 | 0.8973 | 6.27 | 1.55 | 56.1 | −1.2857 |
| S2 | Aspherical | 9.0001 | 0.0958 | | | | −2.2068 |
| S3 | Aspherical | 18.1861 | 0.3091 | 241.35 | 1.67 | 20.4 | 89.9238 |
| S4 | Aspherical | 20.3680 | 0.0400 | | | | 85.4044 |
| S5 | Aspherical | 8.8962 | 0.2800 | −18.71 | 1.68 | 19.2 | 6.2031 |
| S6 | Aspherical | 5.1617 | 0.3834 | | | | −2.0562 |

TABLE 28-continued

| Surface number | Surface type | Radius of curvature | Thickness | Focal length | Refractive index | Abbe number | Conic coefficient |
|---|---|---|---|---|---|---|---|
| S7 | Aspherical | −200.0000 | 0.5656 | 16.08 | 1.55 | 56.1 | 95.7783 |
| S8 | Aspherical | −8.4169 | 0.1719 | | | | 0.0800 |
| S9 | Aspherical | −7.4839 | 0.3400 | −13.43 | 1.67 | 20.4 | −4.9671 |
| S10 | Aspherical | −46.7209 | 0.1626 | | | | 86.8247 |
| S11 | Aspherical | 32.1777 | 0.3600 | 21.14 | 1.65 | 23.5 | 90.0000 |
| S12 | Aspherical | −23.4579 | 0.1558 | | | | 37.3711 |
| S13 | Aspherical | −5.4717 | 0.3600 | −100.14 | 1.65 | 23.5 | 2.5085 |
| S14 | Aspherical | −6.1334 | 0.1115 | | | | −2.3771 |
| S15 | Aspherical | −21.5000 | 0.3600 | −220.78 | 1.65 | 23.5 | 32.5992 |
| S16 | Aspherical | −25.5000 | 0.4703 | | | | 45.0940 |
| S17 | Aspherical | 8.3784 | 0.6519 | 13.33 | 1.55 | 56.1 | 3.8839 |
| S18 | Aspherical | −53.7719 | 1.0559 | | | | 30.6571 |
| S19 | Aspherical | −17.3392 | 0.6274 | −5.20 | 1.54 | 55.7 | 4.2406 |
| S20 | Aspherical | 3.3719 | 0.5611 | | | | −11.7517 |
| S21 | Spherical | Infinite | 0.2100 | | 1.52 | 64.2 | |
| S22 | Spherical | Infinite | 0.3006 | | | | |
| S23 | Spherical | Infinite | | | | | |

The following Table 29 shows higher-order coefficients A4, A6, A8, A10, A12, A14, A16, A18 and A20 applied to each of the aspherical mirror surfaces S1-S20 of the aspherical lenses in embodiment 10 of the disclosure.

TABLE 29

| Surface number | A4 | A6 | A8 | A10 | A12 |
|---|---|---|---|---|---|
| S1 | 9.9791E−03 | 5.4591E−04 | 2.1185E−04 | −1.6801E−04 | 1.2640E−04 |
| S2 | −5.4259E−03 | 2.3188E−03 | −3.0387E−04 | −7.2360E−04 | 1.5340E−03 |
| S3 | 3.1475E−04 | 3.9836E−03 | −6.5617E−03 | 8.5864E−03 | −7.0908E−03 |
| S4 | 9.9671E−03 | −3.2614E−03 | −1.0918E−02 | 2.6912E−02 | −3.1274E−02 |
| S5 | −9.7558E−03 | 1.7068E−03 | −1.5495E−02 | 3.8077E−02 | −4.4156E−02 |
| S6 | −8.4485E−03 | 3.2531E−03 | 3.2591E−03 | −5.1232E−03 | 7.3067E−03 |
| S7 | −9.0355E−03 | −2.7899E−03 | −1.9208E−03 | 4.2293E−03 | −5.2892E−03 |
| S8 | −6.7771E−03 | −1.5642E−02 | 1.4406E−02 | −1.3637E−02 | 9.1155E−03 |
| S9 | −1.5091E−02 | −2.4358E−02 | 2.5453E−02 | −2.5538E−02 | 1.9531E−02 |
| S10 | −2.6666E−02 | −8.5942E−04 | −9.3375E−03 | 1.5600E−02 | −1.3778E−02 |
| S11 | −4.8320E−02 | 2.3817E−02 | −3.2004E−02 | 3.0325E−02 | −1.9134E−02 |
| S12 | −4.1003E−02 | 1.8916E−02 | −1.7815E−02 | 1.2304E−02 | −5.2007E−03 |
| S13 | 4.8153E−04 | −4.9302E−04 | −7.6297E−05 | 2.0572E−05 | 1.6282E−04 |
| S14 | 8.4668E−03 | −1.6062E−02 | 1.2446E−02 | −4.9941E−03 | 1.1794E−03 |
| S15 | 8.5444E−03 | −1.8120E−02 | 1.1694E−02 | −3.9478E−03 | 7.8164E−04 |
| S16 | 3.2114E−03 | −6.5091E−03 | 3.4677E−03 | −9.6571E−04 | 1.4762E−04 |
| S17 | −1.4473E−02 | −6.5134E−04 | −1.1145E−04 | 2.6506E−04 | −1.1164E−04 |
| S18 | −6.2061E−03 | 4.1991E−04 | −8.3778E−04 | 3.5505E−04 | −6.8180E−05 |
| S19 | −5.8029E−02 | 2.1683E−02 | −6.2527E−03 | 1.2813E−03 | −1.7110E−04 |
| S20 | −3.0300E−02 | 1.1299E−02 | −3.1325E−03 | 6.3138E−04 | −9.2674E−05 |

| Surface number | A14 | A16 | A18 | A20 |
|---|---|---|---|---|
| S1 | −6.4016E−05 | 1.8843E−05 | −2.7670E−06 | 1.1773E−07 |
| S2 | −1.4001E−03 | 6.8507E−04 | −1.7431E−04 | 1.7968E−05 |
| S3 | 3.4530E−03 | −9.2215E−04 | 1.0857E−04 | −1.9513E−06 |
| S4 | 2.0758E−02 | −7.9170E−03 | 1.5967E−03 | −1.3010E−04 |
| S5 | 2.9720E−02 | −1.1598E−02 | 2.4175E−03 | −2.0663E−04 |
| S6 | −6.1381E−03 | 3.1331E−03 | −8.6778E−04 | 1.0065E−04 |
| S7 | 4.1301E−03 | −1.8500E−03 | 4.6828E−04 | −5.3434E−05 |
| S8 | −4.1747E−03 | 1.3883E−03 | −2.9911E−04 | 2.7290E−05 |
| S9 | −1.1013E−02 | 4.3217E−03 | −1.0244E−03 | 1.0597E−04 |
| S10 | 7.0262E−03 | −2.0851E−03 | 3.3595E−04 | −2.2510E−05 |
| S11 | 7.8968E−03 | −2.1618E−03 | 3.9853E−04 | −4.6085E−05 |
| S12 | 1.3169E−03 | −1.8001E−04 | 1.0234E−05 | −3.5872E−08 |
| S13 | −1.0755E−04 | 2.8270E−05 | −3.4597E−06 | 1.6516E−07 |
| S14 | −1.7225E−04 | 1.5388E−05 | −7.6359E−07 | 1.5462E−08 |
| S15 | −9.3742E−05 | 6.6980E−06 | −2.6243E−07 | 4.3382E−09 |
| S16 | −1.1622E−05 | 2.9514E−07 | 1.5547E−08 | −8.5853E−10 |
| S17 | 2.6545E−05 | −4.2662E−06 | 4.6875E−07 | −3.2841E−08 |
| S18 | 7.1567E−06 | −4.2287E−07 | 1.3203E−08 | −1.6948E−10 |
| S19 | 1.4326E−05 | −6.7218E−07 | 6.6636E−09 | 1.2337E−09 |
| S20 | 9.9481E−06 | −7.8240E−07 | 4.4882E−08 | −1.8522E−09 |

Figure 47:
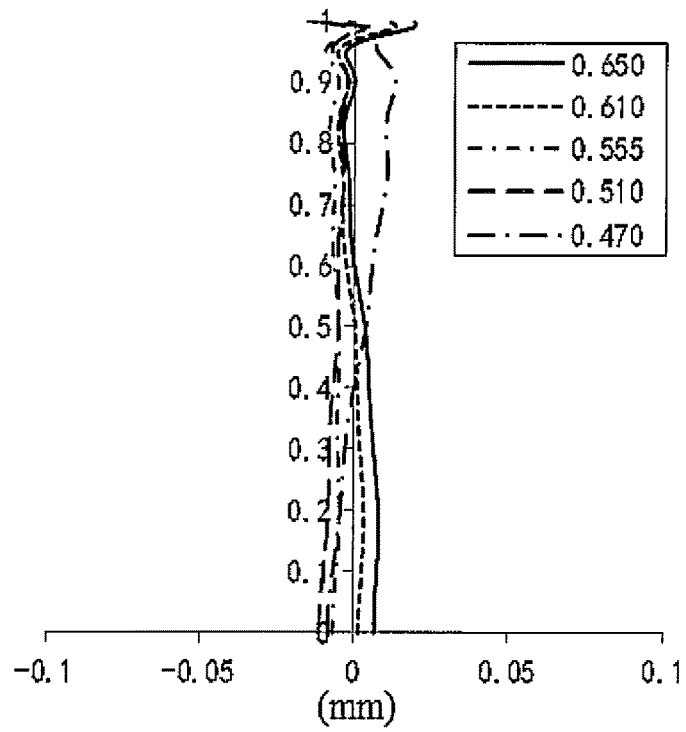
FIG. 47 to FIG. 50 illustrate a longitudinal aberration curve, astigmatism curve, distortion curve and lateral color curve of an optical imaging lens assembly according to embodiment 10 of the disclosure.
Figure 48:
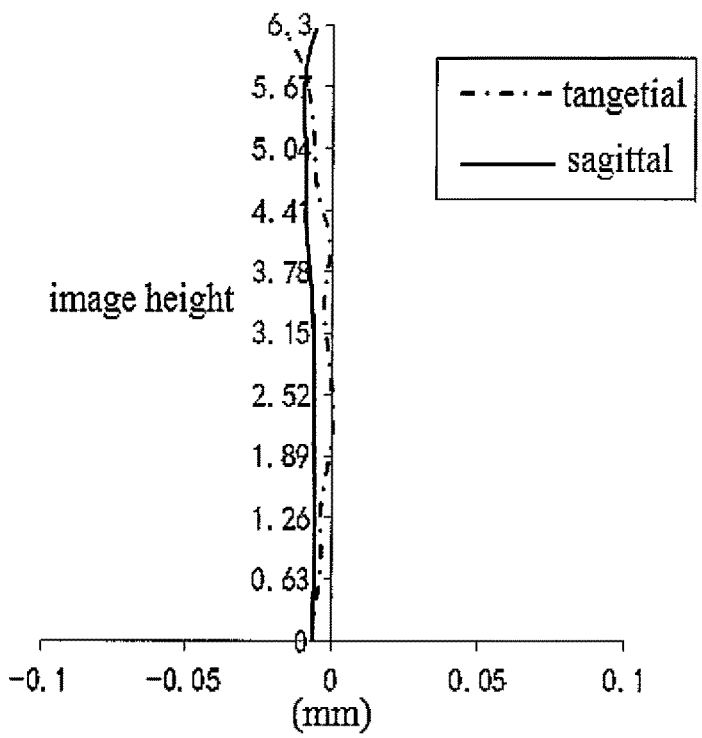
Figure 49:
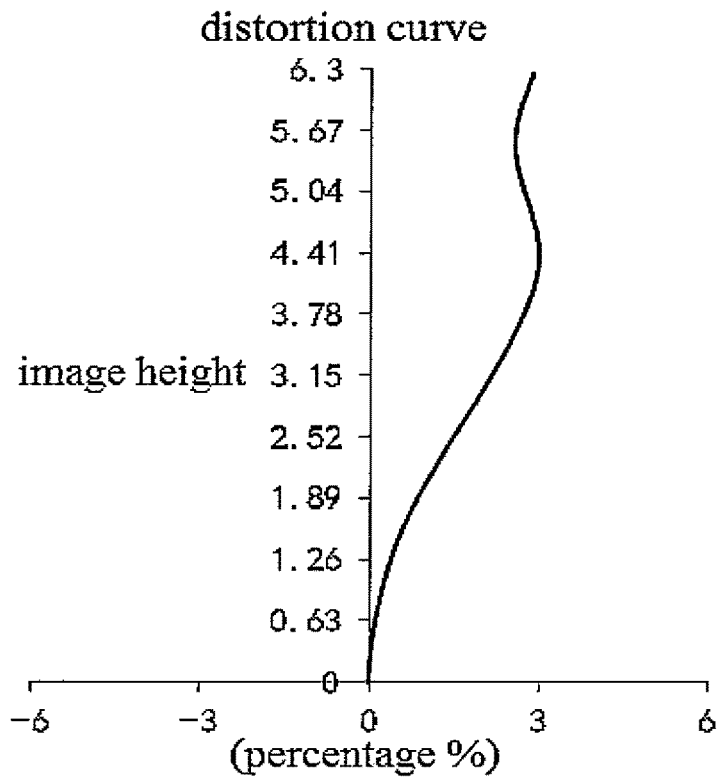
Figure 50:
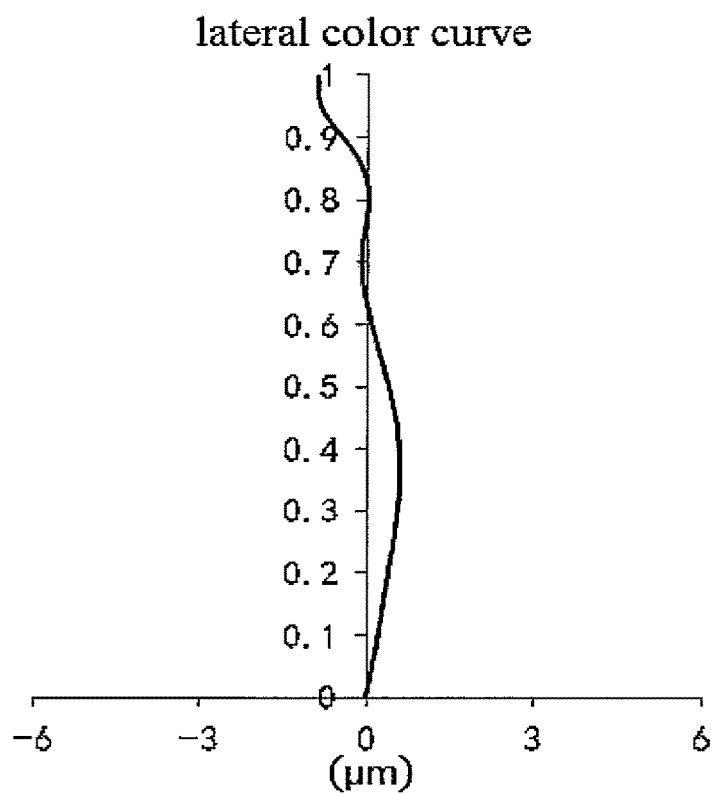

FIG. 47 shows a longitudinal aberration curve of the optical imaging lens assembly according to embodiment 10 of the disclosure to represent deviation of a convergence focal point after light with different wavelengths passes through the lens. FIG. 48 shows an astigmatism curve of the optical imaging lens assembly according to embodiment 10 of the disclosure to represent a tangential image surface curvature and a sagittal image surface curvature. FIG. 49 shows a distortion curve of the optical imaging lens assembly according to embodiment 10 of the disclosure to represent distortion values corresponding to different image heights. FIG. 50 shows a lateral color curve of the optical imaging lens assembly according to embodiment 10 of the disclosure to represent deviation of different image heights on the imaging surface after the light passes through the lens. According to FIG. 47 to FIG. 50, it can be seen that the optical imaging lens assembly provided in embodiment 10 of the disclosure achieves high imaging quality.

To sum up, in embodiments 1 to 10 of the disclosure, each conditional expression satisfies the conditions in the following Table 30.

TABLE 30

| Conditional expression | embodiment | | | | | | | | | |
|---|---|---|---|---|---|---|---|---|---|---|
| | 1 | 2 | 3 | 4 | 5 | 6 | 7 | 8 | 9 | 10 |
| TTL/ImgH | 1.31 | 1.36 | 1.36 | 1.36 | 1.36 | 1.36 | 1.36 | 1.35 | 1.35 | 1.36 |
| f*tan(½FOV) (mm) | 6.37 | 6.24 | 6.22 | 6.26 | 6.24 | 6.21 | 6.21 | 6.10 | 6.06 | 6.06 |
| (f1 + f9)/f4 | 0.94 | 1.21 | 1.19 | 1.31 | 1.28 | 1.26 | 1.29 | 1.24 | 1.22 | 1.22 |
| f3/(f5 + f10) | 1.32 | 1.16 | 1.20 | 0.99 | 1.02 | 1.01 | 0.99 | 0.97 | 1.02 | 1.00 |
| R11/F6 | 0.51 | 0.77 | 0.72 | 0.82 | 0.84 | 0.51 | 0.49 | 1.69 | 1.67 | 1.52 |
| FOV(°) | 85.4 | 81.2 | 80.9 | 81.5 | 81.2 | 80.9 | 81.1 | 80.5 | 79.9 | 79.9 |
| (R8 + R9)/R10 | 0.51 | 0.38 | 0.36 | 0.34 | 0.34 | 0.30 | 0.24 | 0.36 | 0.37 | 0.34 |
| (CT3 + T34)/CT4 | 1.54 | 1.14 | 1.16 | 1.16 | 1.20 | 1.21 | 1.21 | 1.15 | 1.19 | 1.17 |
| CT9/CT10 | 1.55 | 1.08 | 1.08 | 1.08 | 1.07 | 1.07 | 1.08 | 1.06 | 1.05 | 1.04 |
| DT11/DT41 | 1.06 | 1.21 | 1.21 | 1.20 | 1.20 | 1.20 | 1.19 | 1.19 | 1.19 | 1.20 |
| f123/(CT1 + CT2 + CT3) | 5.70 | 5.50 | 5.44 | 5.39 | 5.33 | 5.34 | 5.40 | 5.42 | 5.35 | 5.43 |
| SAG42/SAG32 | −1.66 | −1.26 | −1.29 | −1.35 | −1.11 | −1.37 | −1.34 | −1.33 | −1.53 | −1.47 |
| SAG51/SAG52 | 1.20 | 1.11 | 1.12 | 1.12 | 1.25 | 1.13 | 1.14 | 1.12 | 1.16 | 1.12 |

The above description is only description about some embodiments of the disclosure and adopted technical principles. It is understood by those skilled in the art that the scope of disclosure involved in the disclosure is not limited to the technical solutions formed by specifically combining the technical characteristics and should also cover other technical solutions formed by freely combining the technical characteristics or equivalent characteristics thereof without departing from the inventive concept, for example, technical solutions formed by mutually replacing the characteristics and (but not limited to) the technical characteristics with similar functions disclosed in the disclosure.

We claim:

1. An optical imaging lens assembly, comprising ten lenses, wherein, from an object side to an image side, the ten lenses sequentially comprises:
a first lens with positive refractive power,
a second lens with positive or negative refractive power,
a third lens with negative refractive power,
a fourth lens with positive refractive power,
a fifth lens with negative refractive power,
a sixth lens with positive refractive power, a seventh lens with positive or negative refractive power,
an eighth lens with positive or negative refractive power,
a ninth lens with positive refractive power and
a tenth lens with negative refractive power;
among the ten lenses, any two adjacent lenses are spaced apart on an optical axis; and
at least three lenses in the first to tenth lenses are made of a plastic material;
wherein an on-axis distance TTL from an object-side surface of the first lens to an imaging surface and an ImgH satisfy TTL/ImgH<1.4, the ImgH is a half of a diagonal length of an effective pixel region on the imaging surface.

2. The optical imaging lens assembly according to claim 1, wherein an effective focal length f of the optical imaging lens assembly and a maximum field of view (FOV) of the optical imaging lens assembly satisfy 6.0 mm<f*tan(0.5FOV)<8.0 mm.

3. The optical imaging lens assembly according to claim 1, wherein an effective focal length f1 of the first lens, an effective focal length f9 of the ninth lens and an effective focal length f4 of the fourth lens satisfy 0.8<(f1+f9)/f4<1.5.

4. The optical imaging lens assembly according to claim 1, wherein an effective focal length f3 of the third lens, an effective focal length f5 of the fifth lens and an effective focal length f10 of the tenth lens satisfy 0.9<f3/(f5+f10)<1.4.

5. The optical imaging lens assembly according to claim 1, wherein a radius of curvature R11 of an object-side surface of the sixth lens and an effective focal length f6 of the sixth lens satisfy 0.4<R11/f6<1.7.

6. The optical imaging lens assembly according to claim 1, wherein the maximum FOV of the optical imaging lens assembly satisfies 76°<FOV<86°.

7. The optical imaging lens assembly according to claim 1, wherein a radius of curvature R8 of an image-side surface of the fourth lens, a radius of curvature R9 of an object-side surface of the fifth lens and a radius of curvature R10 of an image-side surface of the fifth lens satisfy 0.2<(R8+R9)/R10<0.6.

8. The optical imaging lens assembly according to claim 1, wherein a center thickness CT3 of the third lens on the optical axis, an air space T34 between the third lens and the fourth lens on the optical axis and a center thickness CT4 of the fourth lens on the optical axis satisfy 1.0<(CT3+T34)/CT4<1.6.

9. The optical imaging lens assembly according to claim 1, wherein a center thickness CT9 of the ninth lens on the optical axis and a center thickness CT10 of the tenth lens on the optical axis satisfy 1.0<CT9/CT10<1.6.

10. The optical imaging lens assembly according to claim 1, wherein a combined focal length f123 of the first lens, the second lens and the third lens, a center thickness CT1 of the first lens on the optical axis, a center thickness CT2 of the second lens on the optical axis and a center thickness CT3 of the third lens on the optical axis satisfy $5.0 < f123/(CT1+CT2+CT3) < 6.0$.

* * * * *